United States Patent
Shin et al.

(10) Patent No.: US 11,418,551 B2
(45) Date of Patent: Aug. 16, 2022

(54) METHOD AND SYSTEM FOR PROVIDING VIRTUAL WHITEBOARD BASED COLLABORATION SERVICE

(71) Applicant: SAMSUNG SDS CO., LTD., Seoul (KR)

(72) Inventors: Hwang Kyu Shin, Seoul (KR); Du Hwan Lim, Seoul (KR); Ju Yeon Ma, Seoul (KR); Ki Hoon Kim, Seoul (KR); Ki Yung Lee, Seoul (KR); Jee Hea Lee, Seoul (KR); Jae Sung Jo, Seoul (KR); Cho Roke Kim, Seoul (KR); Eun Byul Park, Seoul (KR); Mingtian Yu, Seoul (KR); Ik Jun Han, Seoul (KR); Sung Hee Kim, Seoul (KR); Su Ryeon Lee, Seoul (KR); Hyun Ah Bae, Seoul (KR); Jae Dong Chang, Seoul (KR); Dong Gyu Lee, Seoul (KR); Jae Pyo Son, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 0 days.

(21) Appl. No.: 17/009,077

(22) Filed: Sep. 1, 2020

(65) Prior Publication Data
US 2021/0120053 A1  Apr. 22, 2021

(30) Foreign Application Priority Data

Oct. 18, 2019 (KR) .................. 10-2019-0129739
May 22, 2020 (KR) .................. 10-2020-0061293
(Continued)

(51) Int. Cl.
*H04L 12/00* (2006.01)
*H04L 65/401* (2022.01)
(Continued)

(52) U.S. Cl.
CPC ...... *H04L 65/4015* (2013.01); *H04L 65/4053* (2013.01); *H04L 67/104* (2013.01); *H04L 67/38* (2013.01)

(58) Field of Classification Search
CPC . H04L 67/1068; H04L 67/38; H04L 67/1095; H04L 67/02; H04L 65/4053;
(Continued)

(56) References Cited

U.S. PATENT DOCUMENTS 5,008,853 A * 4/1991 Bly .................. G06F 16/1774
715/751
5,220,657 A * 6/1993 Bly .................. G06F 16/1774
711/152
(Continued)

FOREIGN PATENT DOCUMENTS

KR  10-2015-0134637 A  12/2015

*Primary Examiner* — Frantz Coby
(74) *Attorney, Agent, or Firm* — The PL Law Group PLLC

(57) ABSTRACT

A content joint editing method according to an embodiment of the inventive concept may preserve the real-time property of update of edits as much as possible even if the number of editors increases when multiple editors simultaneously edit content. A content editing method can share and edit various contents without calling a separate external application in an online collaboration service. A content sharing method can manage each user's access rights to a content in individual
(Continued)

content units in collaboration service that displays a plurality of contents at the same time in the collaboration space for sharing contents among multiple users.

19 Claims, 51 Drawing Sheets

(30) Foreign Application Priority Data

| Jul. 2, 2020 | (KR) | 10-2020-0081454 |
| Jul. 2, 2020 | (KR) | 10-2020-0081753 |
| Jul. 2, 2020 | (KR) | 10-2020-0081762 |

(51) Int. Cl.
*H04L 67/131* (2022.01)
*H04L 67/104* (2022.01)
*H04L 65/4053* (2022.01)

(58) Field of Classification Search
CPC . H04L 65/4015; H04L 65/403; H04L 67/104; H04L 65/1089; H04L 67/1044
USPC .................................................. 709/204, 205
See application file for complete search history.

(56) References Cited

U.S. PATENT DOCUMENTS

| 5,944,030 | A | * | 8/1999 | Kelsey | A45D 2/24 |
| | | | | | 132/252 |
| 6,088,702 | A | * | 7/2000 | Plantz | G06F 40/166 |
| 6,789,105 | B2 | * | 9/2004 | Ludwig | G06F 15/16 |
| | | | | | 709/204 |
| 8,635,317 | B2 | * | 1/2014 | Ylinen | G06F 9/451 |
| | | | | | 709/223 |
| 9,224,129 | B2 | * | 12/2015 | Sitrick | G06Q 10/101 |
| 10,387,836 | B2 | * | 8/2019 | Sitrick | G06F 9/542 |
| 2002/0129106 | A1 | * | 9/2002 | Gutfreund | G06Q 10/10 |
| | | | | | 709/205 |
| 2010/0274622 | A1 | * | 10/2010 | Kennedy | G06Q 10/06313 |
| | | | | | 705/7.23 |
| 2011/0010635 | A1 | | 1/2011 | Fox et al. | |
| 2012/0233555 | A1 | * | 9/2012 | Psistakis | G06T 19/00 |
| | | | | | 715/751 |
| 2015/0213158 | A1 | * | 7/2015 | Terrill | G06Q 10/101 |
| | | | | | 703/1 |

* cited by examiner

```
{
  UserCursors: [
     {user1: {x: 100, y: 220}},
     {user2: {x: 200, y: 230}},
     {user3: {x: 300, y: 240}},
     {user4: {x: 400, y: 250}},
     {user5: {x: 500, y: 250}},
     {user6: {x: 600, y: 260}},
     {user7: {x: 700, y: 270}},
     {user8: {x: 800, y: 280}},
     {user9: {x: 900, y: 290}},
     {user10: {x: 1000, y: 300}},
     {user11: {x: 1100, y: 310}},
     {user12: {x: 1200, y: 320}}
  ]
}
```

⇩ CURSOR GROUPING

```
{
  UserClusters: [
     {cluster1: [user1, user2, user3, user4]},
     {cluster2: [user5, user6, user7, user8]},
     {cluster3: [user9, user10, user11, user12]},
  ]
}
```

```
Item:{
    id:      "85JnxUbgu5PgtgsQpK8Kjw" ,                 — 308a type:    "pad" ,
    x:       3145.4893845222887 ,
    y:       -580.1647931410282 ,
       absoluteX: 3145.4893845222887 ,
       absoluteY: -580.1647931410282 ,
       children: (14) [BlockItem]
       scaleX: 1 ,
       scaleY: 1 ,
    title:   "<p>Stormboard</p>" ,
    width:   506.17474628058267 ,
    height:  1921.1192832428721 ,
       zIndex: 1592271455606 ,
       isFixedAspectRatio: false ,
       createdTimestamp: 1592271455606 ,
       updateTimestamp: 1592271455606 , History: {
        202003161214123 :{
    type:    delete,
    by:      user1
        }
        202003161214123 :{
    type:    modify,
           preValue: 'test1',
           afterValue: 'test123',
    by:      user2
        }
        202003150912456 :{
    type:    create,
    by:      user3
        }
    }
```

FIG. 33

(a) CALCULATE FIRST COORDINATES    (b) CALCULATE SECOND COORDINATES

METHOD AND SYSTEM FOR PROVIDING
VIRTUAL WHITEBOARD BASED
COLLABORATION SERVICE

CROSS REFERENCE TO RELATED
APPLICATIONS AND CLAIM OF PRIORITY

This application claims the benefit of Korean Patent Application Nos. 10-2019-0129739 filed on Oct. 18, 2019, 10-2020-0061293 filed on May 22, 2020, 10-2020-0081454 filed on Jul. 2, 2020, 10-2020-0081753 filed on Jul. 2, 2020 and 10-2020-0081762 filed on Jul. 2, 2020 in the Korean Intellectual Property Office, the disclosure of which is incorporated herein by reference in its entirety.

BACKGROUND

1. Technical Field

The inventive concept relates to a method and apparatus for providing a remote collaboration support service. More specifically, a method of facilitating non-verbal communication between a plurality of participants participating in a teleconference, a method of realizing real-time work collaboration regardless of the number of participants by minimizing the latency that occurs as the number of participants increases, a method of sharing a content among multiple users and jointly editing it, and a method of sharing contents of a collaboration space with other terminals in a content unit.

2. Background Art

Due to advances in ICT technology, traditional offline meetings, group training, seminars, and conference events are rapidly being replaced by teleconference. In particular, as companies adopting smart work systems that can work and collaborate anytime, anywhere, regardless of time and place, increase, the importance of technology that facilitates communication and collaboration between remote locations is receiving great attention.

Types of frequent remote multi-party communication include audio conferences, video conferences using cameras, or video/web conference where collaboration or multi-party communication is made while providing computer screens manipulated by some of the conference participants or specific content to other participants in real-time.

Compared to traditional offline meetings, teleconferences have the advantage of significantly reducing the cost of securing a place for meetings and the time and cost required for moving of participants. However, various non-verbal communication methods used in offline face-to-face meetings are not yet easy in teleconferences based on limited audio and video.

Specifically, in offline face-to-face meetings, in addition to communication through voice language, opinions and emotions are communicated through non-verbal means such as facial expressions, gestures, and attitudes. A lot of information is exchanged within a short time even by actions such as a show of hands of participants and the presenter's pointing to a specific part of the material projected on the large screen.

On the other hand, such non-verbal communication is very limited in teleconferences. Unlike offline face-to-face meetings, in teleconferences, communication is more severely restricted when multiple participants speak at the same time, so it is difficult for participants in multi-party teleconferences, where most of the communication is communicated primarily through voice, to express smoothly the degree of understanding, sympathy or feeling of the content being discussed.

On the other hand, it is difficult for a person who makes a presentation to other participants or leads a discussion on a specific topic to efficiently deliver the information he or she wants to deliver through a teleconference where non-verbal communication is limited.

Online collaboration services such as the teleconferencing technology are based on a server-client architecture. That is, when a user edits the content through each client terminal, the editing information is transmitted to the server, and the server updates the content to the latest state by reflecting the editing information collected from each client terminal, and then distributes the updated content to each client terminal.

However, such a conventional online collaboration service had to open the content by calling separate external applications suitable for the data format for each content in order to edit the content, and in the case of the content, of which original is stored in a cloud server, since editing information is sent to the cloud server through a API transaction whenever edit occurs, the load and latency on the server increase when multiple users edit simultaneously.

Further, in the conventional online collaboration service, the editing of the content itself was completely reflected as the editing contents, but the drawing object added externally during the content discussion process was not reflected as the editing contents. Therefore, various ideas related to the content created in the form of additional objects such as drawings, memos, or stickers during online collaboration process are not properly reflected in the contents and disappear.

With regard to an online collaboration service, a simultaneous editing technology for jointly and simultaneously editing a content is provided. The simultaneous editing technology is based on a server-client architecture. That is, when the user's editing occurs, each editor terminal transmits the editing information to the server, and the server generates updated contents by reflecting the editing information collected from each editor terminal to the latest contents, and then distributes the updated content to each editor terminal.

The above described simultaneous editing technology has the advantage of stably managing the latest content by the server, but since the amount of computation applied to the server increases as the number of editor terminals increases, it has the limitation of damaging the real-time property of simultaneous editing due to an increase of the resulting latency.

SUMMARY

The technical problem to be solved by some embodiments of the inventive concept is to provide a method and apparatus for facilitating non-verbal communication among a plurality of participants participating in a teleconference.

Another technical problem to be solved by some embodiments of the inventive concept is to provide a method and apparatus for allowing a plurality of participants participating in a teleconference to intuitively express their opinions and emotions without interfering with the progress of the conference.

Another technical problem to be solved by some embodiments of the inventive concept is to provide a method and apparatus for allowing the presenter to indicate the part that the presenter wants to emphasize on the content shared to the participants in a teleconference in a way that participants can intuitively recognize.

Another technical problem to be solved by some embodiments of the inventive concept is to provide a content joint editing method, in which the real-time property of the update of edits is preserved as much as possible even if the number of editors increases when multiple editors simultaneously edit content, and a content joint editing system, to which the method is applied.

Another technical problem to be solved by some embodiments of the inventive concept is to provide a content joint editing method, which prioritizes the real-time property of update of edits between editor terminals where content parts being displayed on a screen overlap when the content is difficult to be displayed on one screen of the editor terminal when multiple editors simultaneously edit the content, and a content joint editing system, to which the method is applied.

Another technical problem to be solved by some embodiments of the inventive concept is to provide a content joint editing method, in which even if editor terminals are distributed in different global regions when multiple editors simultaneously edit a content, the real-time property of update of edits is preserved as much as possible by suppressing occurrence of the corresponding latency, and a content joint editing system, to which the method is applied.

Another technical problem to be solved by some embodiments of the inventive concept is to provides a content joint editing method, in which even if an exception occurs, such as an application used for content joint editing abruptly terminates or a network connection of the editor terminal is disconnected, data during a period, in which service access is disconnected, is automatically provided when reconnection is made, and a content joint editing system, to which the method is applied.

Another technical problem to be solved by some embodiments of the inventive concept is to provide a content editing method capable of sharing and editing various contents without calling a separate external application in an online collaboration service, and a service server for the same.

Another technical problem to be solved by some embodiments of the inventive concept is to provide a content editing method to minimize the load and latency on the server even when multiple users edit simultaneously by minimizing the API transaction for the cloud server in the online collaboration service, and a service server for the same.

Another technical problem to be solved by some embodiments of the inventive concept is to provide a content editing method that can reflect objects such as drawings, memos, or stickers externally added in relation to the content in the online collaboration service as the editing contents of the content, and a service server for the same.

Another technical problem to be solved by some embodiments of the inventive concept is to provide a content sharing method and system.

Another technical problem to be solved by some embodiments of the inventive concept is to provide a content sharing method and system that allow the context and flow of the content to be maintained in the entire collaboration space even when the content in the collaboration space is only partially shared.

Another technical problem to be solved by some embodiments of the inventive concept is to provide a content sharing method and system capable of automatically managing access rights to individual content through context analysis of a content.

The technical problems of the inventive concept are not limited to the technical problems mentioned above, and other technical problems that are not mentioned can be clearly understood by those skilled in the art of the inventive concept from the following description.

In order to solve the above technical problem, a method for providing a teleconference according to an embodiment of the inventive concept comprises displaying a plurality of first graphic elements each corresponding to a plurality of online conference participants in a first area on a display of a computing device, obtaining an input regarding opinion expression from a user of the computing device, and in response to obtaining the input, displaying a second graphic element corresponding to the opinion expression at a position of a first graphic element corresponding to the user among the plurality of participants. In this case, the plurality of first graphic elements may be fixed and arranged at different positions in the first area.

In one embodiment, the first graphic elements may be arranged to be spaced apart from each other by the same distance from the virtual point in the first area. In some embodiments, in response to adding a participant to the online conference, the plurality of first graphic elements may be rearranged.

In an embodiment, the step of obtaining an input regarding the opinion expression from the user may comprise displaying an interface for selecting one of a plurality of opinion expression elements on the second area of the display. The method of providing a teleconference according to some embodiments of the inventive concept may further comprise rearranging the plurality of first graphic elements based on inputs respectively obtained from the plurality of online conference participants.

The method for providing a teleconference according to an embodiment of the inventive concept may further comprise removing the displayed second graphic element when a preset display time elapses after displaying the second graphic element. A method for providing a teleconference according to some embodiments of the inventive concept may further comprise reducing the size of the displayed second graphic element or increasing transparency of the second graphic element as time elapses after displaying the second graphic element.

In one embodiment, the step of displaying the second graphic element may comprise at least one of displaying an emoji corresponding to the opinion expression so as to at least partially overlap with the first graphic element, displaying a translucent layer of a color corresponding to the opinion expression to overlapping with a position of the first graphic element, and displaying a text corresponding to the opinion expression so as to at least partially overlap with the first graphic element.

The method for providing a teleconference according to an embodiment of the inventive concept may further comprise displaying an active state determined based on a final opinion expression input time point of the of each of the plurality of participants.

In order to solve the above technical problem, a method for providing a teleconference according to another embodiment of the inventive concept may comprise displaying a content on a display of a computing device, obtaining a first user input from a user of the computing device, in response to determining that the first user input corresponds to the first gesture, changing a display attribute of a pointing element for indicating portions of the content from a first state to a second state, and transmitting data instructing the display attribute change of the pointing element to at least one of a computing device of the second participant of the online conference and a server that manages the online conference.

In one embodiment, the first gesture is a gesture of reciprocating the pointing element in a horizontal direction more than a preset number of times within a preset time or a gesture of reciprocating the pointing element in a vertical direction more than a preset number of times within a preset time.

In an embodiment, changing the display attribute of the pointing element may comprise changing at least one of a shape, a size, and a color of the pointing element. In some embodiments, the step of changing the display attribute of the pointing element may comprise enlarging the pointing element when the size of the pointing element is less than a threshold value, and reducing the pointing element when the size of the pointing element is equal to or greater than the threshold value.

The method for providing a teleconference according to an embodiment of the inventive concept may further comprise, after the transmitting step, obtaining a second user input from a user of the computing device and changing the display attribute of the pointing element from a second state to a first state in response to the determination that the second user input corresponds to a second gesture. In some embodiments, the first gesture is a gesture of reciprocating the pointing element in a horizontal direction within a threshold distance, and the second gesture is a gesture of reciprocating the pointing element in a horizontal direction beyond the threshold distance.

In order to solve the above technical problem, a method for providing a teleconference according to another embodiment of the inventive concept may comprise extracting text by analyzing a voice signal obtained from a user of a computing device, determining a position in the content that matches the text by analyzing the content displayed on a display of the computing device, moving a pointing element to the matching position in the content, and transmitting data instructing the movement of the pointing element to at least one of the computing device of the second participant of the online conference and the server managing the online conference.

A method for providing a teleconference according to an embodiment of the inventive concept may further comprise moving the content so that the matching position is displayed on the display. In some embodiments, the determining step may further comprise determining a position closest to the position in the content displayed on the display as the matching position when two or more positions match the text. In some other embodiments, the method may further comprise transmitting data instructing the movement of the content to at least one of a computing device of the second participant and a server managing the online conference.

In one embodiment, the determining step is based on a result of natural language analysis of text included in the content.

A content joint editing method according to another embodiment of the inventive concept may comprise configuring a p2p (peer-to-peer) network by at least some of a plurality of editor terminals of the editing target content, when the first editor terminal among the editor terminals configuring the p2p network receives a user input for editing the editing target content, broadcasting the editing information corresponding to the user input to the p2p network in a peer-to-peer manner, and automatically updating the editing target content by reflecting the editing information by a second editor terminal receiving the editing information as a result of the broadcasting among the editor terminals configuring the p2p network.

In one embodiment, the step of broadcasting the editing information corresponding to the user input to the p2p network in a peer-to-peer manner may comprise broadcasting the editing information to the p2p network, and after performing the broadcasting, updating the editing target content on the screen of the first editor terminal by reflecting the editing information.

In one embodiment, the step of configuring the p2p network may comprise grouping some of the plurality of editor terminals of the editing target content into one cluster by a service server of the content joint editing system, transmitting information about each editor terminal belonging to the cluster to editor terminals belonging to the cluster, and configuring the p2p network between editor terminals belonging to the cluster by using information on each editor terminal belonging to the cluster.

In this case, in the first detailed embodiment, the step of grouping some of the plurality of editor terminals of the editing target content into one cluster may comprise automatically excluding the third editor terminal from the cluster when the requirement for leaving the cluster of the third editor terminal is satisfied according to a user input for a third editor terminal belonging to the cluster, and dynamically and automatically including the fourth editor terminal into the cluster when the requirement for joining the cluster of the fourth editor terminal is satisfied according to a user input for a fourth editor terminal not belonging to the cluster.

Further, in the second detailed embodiment, the step of grouping some of the plurality of editor terminals of the editing target content into one cluster comprises grouping some of the plurality of editor terminals of the editing target content into one cluster only when the number of editor terminals of the editing target content exceeds a reference value, and the step of configuring the peer-to-peer (p2p) network may comprise configuring the p2p network by all of the plurality of editor terminals of the editing target content when the number of editor terminals of the editing target content is equal to or less than the reference value.

Further, in a third detailed embodiment, the step of grouping some of the plurality of editor terminals of the editing target content into one cluster may comprise grouping the editor terminals displaying the same part of the editing target content into one cluster. Editor terminals displaying the same part of the editing target content may be editor terminals belonging to the same cluster as a result of grouping based on the position of a cursor on the editing target content of each of the editor terminals. Further, the editing target content is an online whiteboard content, in which a plurality of pads (PADs) are arranged, and editor terminals displaying the same part of the editing target content may be editor terminals that put focus on a first pad included in the plurality of pads.

Further, in the fourth detailed embodiment, the editing target content is an online whiteboard divided into a plurality of sections, and is a content including a plurality of pads, and the step of grouping some of the plurality of editor terminals of the editing target content into one cluster may include grouping editor terminals displaying the first section of the online whiteboard into one cluster.

Further, in the fifth detailed embodiment, the step of grouping of some of the plurality of editor terminals of the editing target content into one cluster may comprise grouping editor terminals connected to the same region server into one cluster.

In one embodiment, the step of broadcasting the editing information corresponding to the user input to the p2p network in a peer-to-peer manner may comprise, after broadcasting the editing information to the p2p network including the first editor terminal, further broadcasting the editing information to other p2p network that does not include the first editor terminal. In this case, the step of configuring the p2p network may comprise grouping a plurality of editor terminals of the editing target content by a service server of the content joint editing system, and configuring the p2p network by the editor terminals belonging to each cluster configured according to the grouping, and determining a real-time requirement degree between each p2p network by a service server of the content joint editing system. And, the step of broadcasting the editing information corresponding to the user input to the p2p network in a peer-to-peer manner may comprise, after broadcasting the editing information to the p2p network including the first editor terminal, sequentially further broadcasting the editing information to a plurality of other p2p networks that do not include the second editor terminal, but the sequential further broadcasting is performed in the order from the p2p network having high real-time requirement degree for the p2p network including the first editor terminal to the low p2p network. In addition, the step of grouping some of the plurality of editor terminals of the editing target content into one cluster may comprise grouping the editor terminals displaying the same part of the editing target content into one cluster, and the step of determining the real-time requirement degree may comprise determining the real-time requirement degree using a distance on a screen between display parts of the editor terminal cluster of each p2p network.

In one embodiment, the step of broadcasting the editing information corresponding to the user input to the p2p network in a peer-to-peer manner may comprise transmitting the editing information to the message queue management device so that the editing information is sequentially inserted into the database. In this case, at least some of the editing information sequentially inserted into the database may be, in order to prevent the loss of editing contents due to abnormal termination of the joint editing application or network disconnection, one provided to the editor terminal, in which the abnormal termination or network disconnection occurs. In this case, the CDN message queue management device in the first region may be one of a plurality of regional CDN message queue management devices that transmit the received editing information to the database.

In one embodiment, the second editor terminal is a terminal device that also serves as a message queue management device among editor terminals configuring the p2p network, and the step of automatically updating the editing target content by reflecting the editing information may comprise transmitting the editing information to the database management device by the second editor terminal so that the editing information received from the editor terminals configuring the p2p network and sequentially inputted in the message queue provided in the second editor terminal is inserted into the database. In this case, at least some of the editing information inserted into the database may be, in order to prevent the loss of editing contents due to abnormal termination of the joint editing application or network disconnection, one provided to the editor terminal, in which the abnormal termination or network disconnection occurs.

A content joint editing system according to another embodiment of the inventive concept comprises a service server, which configures a plurality of clusters by grouping a plurality of editor terminals of the editing target content based on a real-time requirement degree between editor terminals, and supports the p2p network establishment between editor terminals belonging to the cluster by transmitting p2p network establishment information for each of editor terminals belonging to the cluster to the editor terminals belonging to the cluster.

In one embodiment, if it is determined that migration to a second p2p network is necessary according to a result of a user input to a first editor terminal belonging to a first p2p network among the plurality of editor terminals, the service server may transmit update information on the first p2p network to editor terminals belonging to the first p2p network, and transmit update information on the second p2p network to editor terminals belonging to the second p2p network.

In one embodiment, the content joint editing system may further include a message queue management server that manages a message queue for sequentially inserting editing information received from each of the editor terminals into a database. At least some of the editing information sequentially inserted into the database may be, in order to prevent loss of editing contents due to abnormal termination of the joint editing application, one provided to the editor terminal, in which the abnormal termination occurs.

In some embodiments, the real-time requirement degree between the editor terminals may be a first value calculated to increase as the position of a cursor on the editing target content of the editor terminal is closer, a second value calculated to increase as the position of the focused object on the editing target content of the editor terminal is closer, a third value calculated to increase as the number of interactions between the editor terminals on the editing target content increases, or a value calculated by using a plurality of values among the first to third values.

A content editing method according to another embodiment of the inventive concept may comprise loading a first content and displaying it on a board, displaying an additional object on the board so as to overlap with the first content, and embedding a portion of the additional object overlapping with the first content in the first content, wherein a second content is further displayed on the board, and when the first edit for the first content and the second edit for the second content are respectively performed on the board, the first edit can be independently canceled or redone without affecting the second edit, regardless of the predecessor relationship between the first edit and the second edit.

As an embodiment, the step of embedding in the first content may comprise calculating coordinates representing a relative position between a reference point of the first content and the additional object, and associating the overlapped portion of the additional object with the first content based on the calculated coordinates.

As an embodiment, the step of embedding in the first content may further comprise updating the first content so that the first content includes an image of the overlapped portion of the additional object.

As an embodiment, the step of embedding in the first content may further comprise calculating another coordinate representing the position of the additional object on the board.

As an embodiment, the step of selectively displaying the overlapped portion of the additional object according to whether the coordinates are included in the currently displayed area of the first content may be further comprised.

As an embodiment, the additional object includes other part that does not overlap with the first content, and even when the overlapped part is embedded in the first content, the other part may not be embedded in the first content.

As an embodiment, the step of loading the first content and displaying it on the board comprises converting raw content into the first content in a first data format, and the raw content may be a content in a second data format, which can be driven by an external application program.

As an embodiment, the step of converting the first content, in which the overlapped portion of the additional object is embedded, into the second data format may be further comprised.

As an embodiment, the raw content may be a content received from a remote cloud server, and the first content may be converted into the second data format and then uploaded to the cloud server.

As an embodiment, an editing history indicating a history of edits made on the first content may be stored.

As an embodiment, the editing history may be displayed on a predetermined area of the board in response to a user manipulation to the first content.

As an embodiment, the first edit and the second edit may be independently and simultaneously performed by different users, respectively.

As an embodiment, the additional object may include a drawing object, a memo object, or a sticker object added on the board according to a user input.

A content editing service server according to another embodiment of the inventive concept comprises a processor, a memory for loading a computer program executed by the processor, and a storage for storing the computer program, wherein the computer program includes instructions for executing operations comprising loading a first content and displaying it on a board, displaying an additional object on the board so as to overlap with the first content, and embedding a portion of the additional object overlapping with the first content in the first content, and the second content is further displayed on the board, and when the first edit for the first content and the second edit for the second content are respectively performed on the board, the first edit can be independently canceled or redone without affecting the second edit, regardless of the predecessor relationship between the first edit and the second edit.

A computer program according to another embodiment of the inventive concept is combined with a computing device to execute a content editing method, and the computer program is stored in a computer readable recording medium for executing steps comprising loading a first content and displaying it on a board, displaying an additional object on the board so as to overlap with the first content, and embedding a portion of the additional object overlapping with the first content in the first content, and the second content is further displayed on the board, and when the first edit for the first content and the second edit for the second content are respectively performed on the board, the first edit can be independently canceled or redone without affecting the second edit, regardless of the predecessor relationship between the first edit and the second edit.

A computer program according to another embodiment of the inventive concept is stored in a computer readable recording medium for executing steps comprising loading a plurality of contents on a master board, checking a user's access rights to each of the plurality of contents, and sharing a first content, to which the user has an access right, from among the plurality of contents to a client device of the user based on the checked user's access right, and the client device displays the first content on a user board corresponding to a master board, and the first content is displayed at a second location on the user board corresponding to a first location on the master board, on which the first content is displayed.

BRIEF DESCRIPTION OF THE DRAWINGS

FIG. 33 is a diagram for describing an exemplary data structure of each content according to an embodiment of the inventive concept.

DETAILED DESCRIPTION

Figure 1:
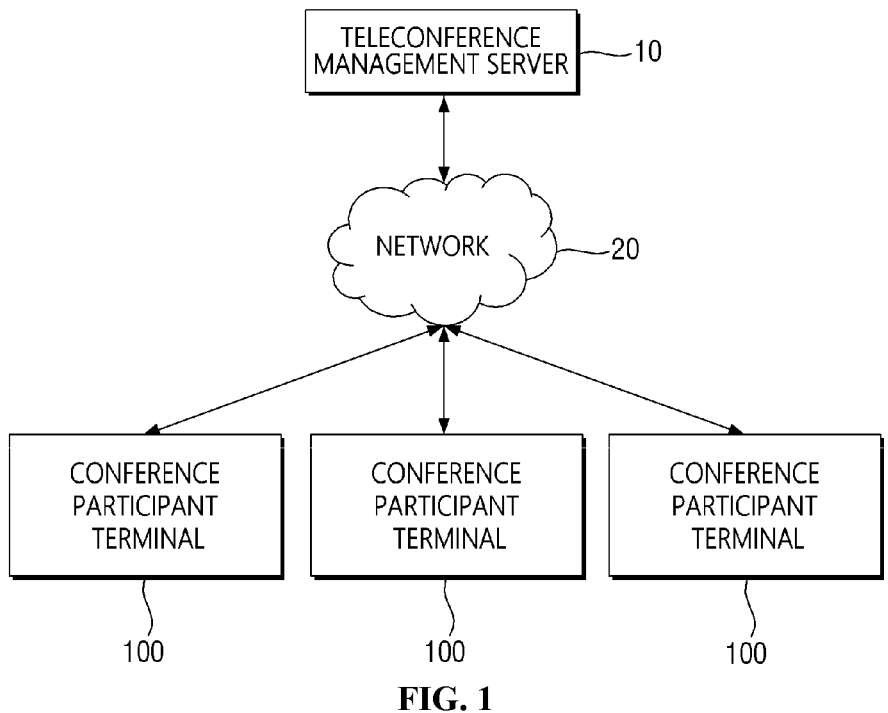
FIG. 1 is a diagram for describing a usage environment of a conference participant terminal according to an embodiment of the inventive concept.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

Smooth Non-Verbal Communication Between Teleconference Participants

Hereinafter, embodiments related to facilitating non-verbal communication among a plurality of participants participating in a teleconference will be described.

FIG. 1 is a diagram describing a usage environment of a conference participant terminal 100 that facilitates communication in a teleconference according to an embodiment of the inventive concept.

One or more conference participant terminals 100 shown in FIG. 1 may be connected to other conference participant terminal 100 and a teleconference management server 10 through a network 20. The conference participant terminal 100 may directly exchange messages with other conference participant terminals 100 through the network 20. In some embodiments, the conference participant terminal 100 may exchange messages with other conference participant terminals 100 via the teleconference management server 10.

The teleconference management server 10 shown in FIG. 1 may be a server that provides a platform for enabling audio and/or video communication between conference participant terminals 100. In some embodiments of the inventive concept, a teleconference is possible only with a configuration provided in the conference participant terminal 100 without the teleconference management server 10.

The network 20 shown in FIG. 1 includes networks such as wired and wireless networks, packet switching networks, circuit switching networks, data communication networks, and voice communication networks.

Figure 2:
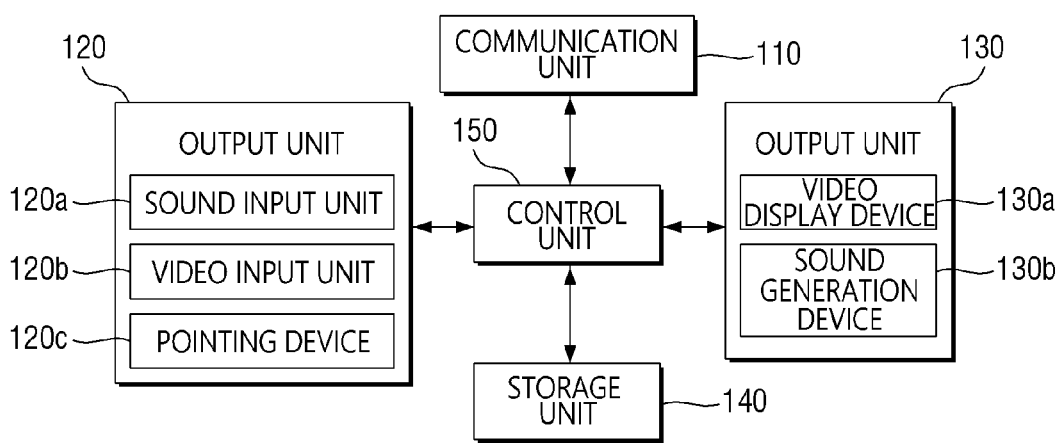
FIG. 2 is a block diagram of a conference participant terminal according to an embodiment of the inventive concept.

FIG. 2 is a block diagram of a conference participant terminal 100 according to an embodiment of the inventive concept. The conference participant terminal 100 includes a fixed computing device such as a desktop computer, and a mobile computing device such as a smart phone, a notebook computer, and a tablet PC. The conference participant terminal 100 is not limited to the examples listed above, and includes a dedicated device such as a multi-party audio conference phone, a video conference or telepresence device, and includes a home appliance including a video display device such as a smart TV and a sound reproduction device.

The conference participant terminal 100 may include a communication unit 110, an input unit 120, an output unit 130, a storage unit 140, and a control unit 150.

The communication unit 110 may transmit and receive various signals and data such as audio and video from an external device. The communication unit 110 may include a network communication device such as a wireless communication chip and a wired or wireless network adapter.

The input unit 120 receives an input from the user of the conference participant terminal 100. To this end, the input unit 120 includes a sound input device 120a, a video input device 120b, and a pointing device 120c. The sound input device 120a includes a wired/wireless microphone and a transmitter for receiving an audio signal, and the video input device 120b includes a device that receives an optical signal and converts it into video data such as a camera or a webcam. The pointing device 120c includes a motion detection device based on a mouse, a stylus, a touch pad, a touch screen, and an acceleration sensor. Although not shown, the input unit 120 may include a keyboard and a physical button.

The output unit 130 is for generating an output related to visual, auditory, or tactile sense, and the output unit 130 in this embodiment may include, in particular, a video display device 130a and a sound generation device 130b. The video display device 130a may be implemented as a touch screen by forming a layer structure or integrally with the pressure-sensitive or capacitive touch sensing module. Such a touch screen may provide an output interface to the user of the conference participant terminal 100. In addition, the touch screen may function as the input unit 120 in the range of providing an input interface to the user of the conference participant terminal 100. The sound generation device 130b includes various devices for outputting audio signals, such as a speaker, a handset, headphones, and a wireless audio module. Although not shown, the output unit 130 may include a light emitting device that provides visual feedback.

The storage unit 140 stores various types of data, commands and/or information. The storage unit 140 may store one or more programs for providing a method of providing a teleconference according to embodiments of the inventive concept. Further, the storage unit 140 may store a content and related data that can be shared among conference participants during the teleconference. The storage unit 140 may temporarily or non-temporarily store data transmitted from an external device or input by a user, or an operation result of the control unit 150. The storage unit 140 may include a nonvolatile memory such as a ROM (Read Only Memory), EPROM (Erasable Programmable ROM), EEPROM (Electrically Erasable Programmable ROM), flash memory, etc., a hard disk, a removable disk, an SD memory card, or any type of computer-readable recording medium well known in the technical field, to which the inventive concept belongs. Meanwhile, in FIG. 1, the storage unit 140 is shown as a separate configuration, but may be integrated with the control unit 150 to be described later and provided in the conference participant terminal 100.

The control unit 150 controls the overall operation of each component of the conference participant terminal 100. The control unit 150 can be configured to include a CPU (Central Processing Unit), MPU (Micro Processor Unit), MCU (Micro Controller Unit), Mobile Processor (Mobile Processor), or any type of processor well known in the technical field of the inventive concept. Further, the control unit 150 may perform an operation on at least one application or program for executing the method according to embodiments of the inventive concept.

The control unit 150 obtains a user input from the input unit 120 of the conference participant terminal 100, and in response, may display a graphic element corresponding to the user input on the video display device 130a, etc., and transmit data related to the user input to the other conference participant terminal 100 through the communication unit 110. In addition, the control unit may change the display attribute of the GUI element displayed on the video display device 130a, based on the result of determining whether the user input corresponds to a predetermined gesture, and transmit data related thereto to the other conference participant terminals 100. The specific operation of the conference participant terminal 100 by the control of the control unit 150 will be described later with reference to FIGS. 3 to 9.

The configuration of the conference participant terminal 100 has been described above with reference to FIG. 2. It should be noted that even if it is not described in the description with reference to FIG. 2, the technical idea understood through other embodiments of the inventive concept to be described later with reference to FIGS. 3 to 9 can be reflected in the configuration and operation of the conference participant terminals 100 according to the present embodiment.

Figure 3:
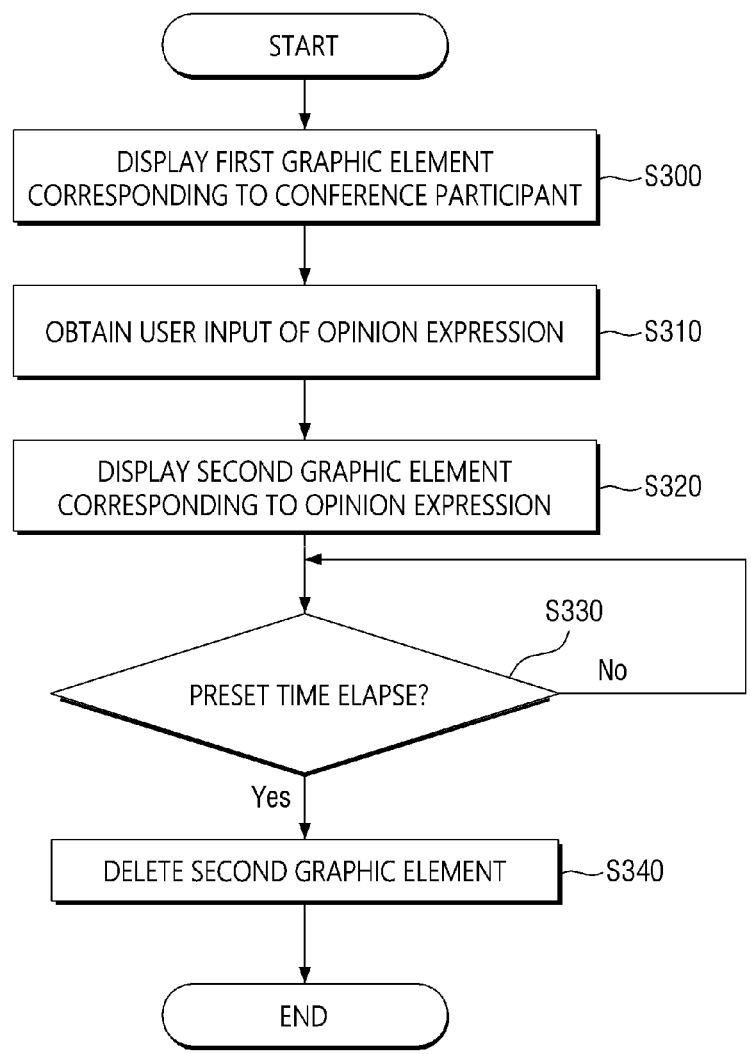
FIG. 3 is a flowchart of a method for providing a teleconference according to another embodiment of the inventive concept.

FIG. 3 is a flowchart for describing a method of providing a teleconference according to another embodiment of the inventive concept. The method for providing a teleconference according to the present embodiment may be performed in a computing device. For example, the computing device may be the conference participant terminal 100 described with reference to FIGS. 1 and 2. In interpreting the method for providing a teleconference according to the present embodiment, the embodiments described with reference to FIGS. 1 and 2 may be reflected. Hereinafter, when the subject of each operation included in the method for providing a teleconference according to the present embodiment is omitted, the subject may be interpreted as being a computing device.

Hereinafter, a method for providing a teleconference according to the present embodiment will be described with reference to the flowchart of FIG. 3 and exemplary user interfaces illustrated in FIGS. 4a to 4c, 5a to 5d, and FIG. 6.

First, a user interface 400 for a teleconference is displayed on a display such as a video display device 130a, and a plurality of first graphic elements 410a to 410e and 420a to 420c corresponding to a plurality of conference participants are displayed in the first area 402 in the user interface 400 (step S300). The first graphic elements 410a to 410e and 420a to 420c include profile images for identifying each conference participant, and video captured in real time by the video input device 120b provided in the terminal 100 of each conference participant.

Figure 4A:
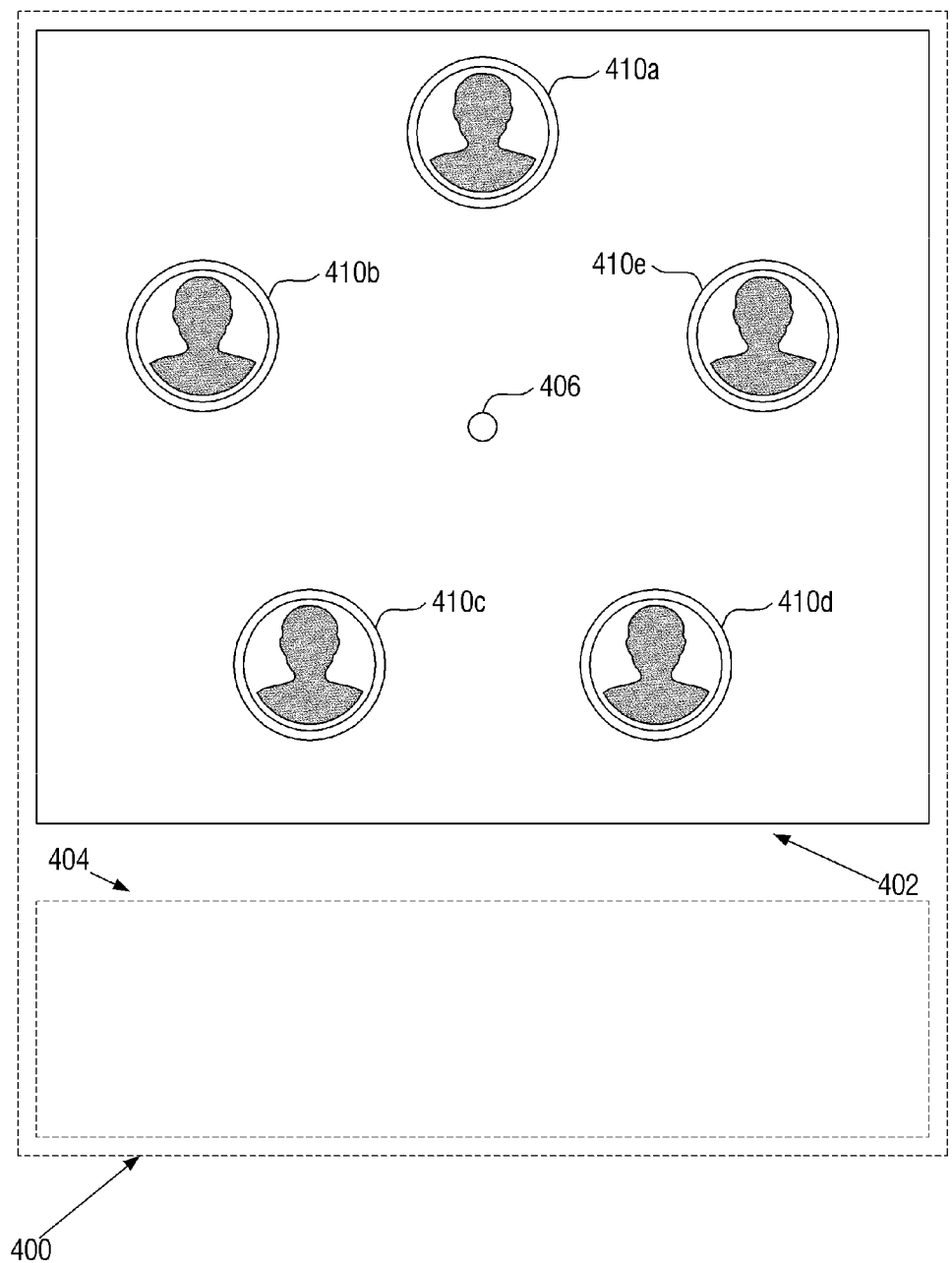
FIGS. 4a to 4c are diagrams describing an exemplary UI, in which graphic elements corresponding to teleconference participants are arranged, in the embodiment described with reference to FIG. 3.

Referring to FIG. 4a, in some embodiments, the first graphic elements 410a to 410e may be arranged to be spaced apart by the same distance from the virtual point 406 in the first area 402. For example, the first graphic elements 410a to 410e may be arranged in a circle with equal intervals on the circumference of the virtual circle. As another example, the first graphic elements 410a to 410e may be arranged on a virtual regular polygonal vertex having as many vertices as the number of conference participants. In some embodiments, the first graphic elements 410a to 410e may have a circular-shaped edge.

Figure 4B:
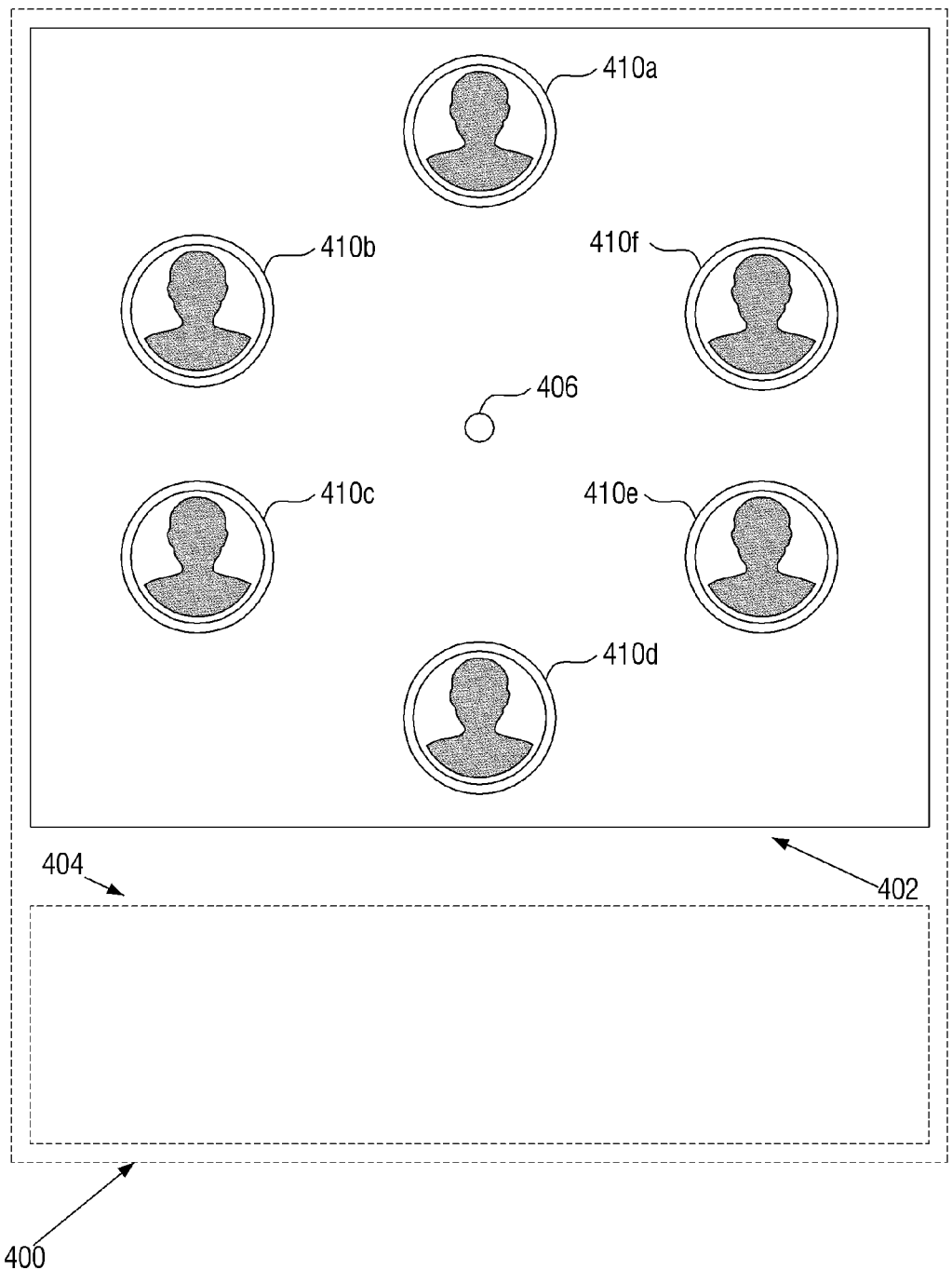
Figure 4C:
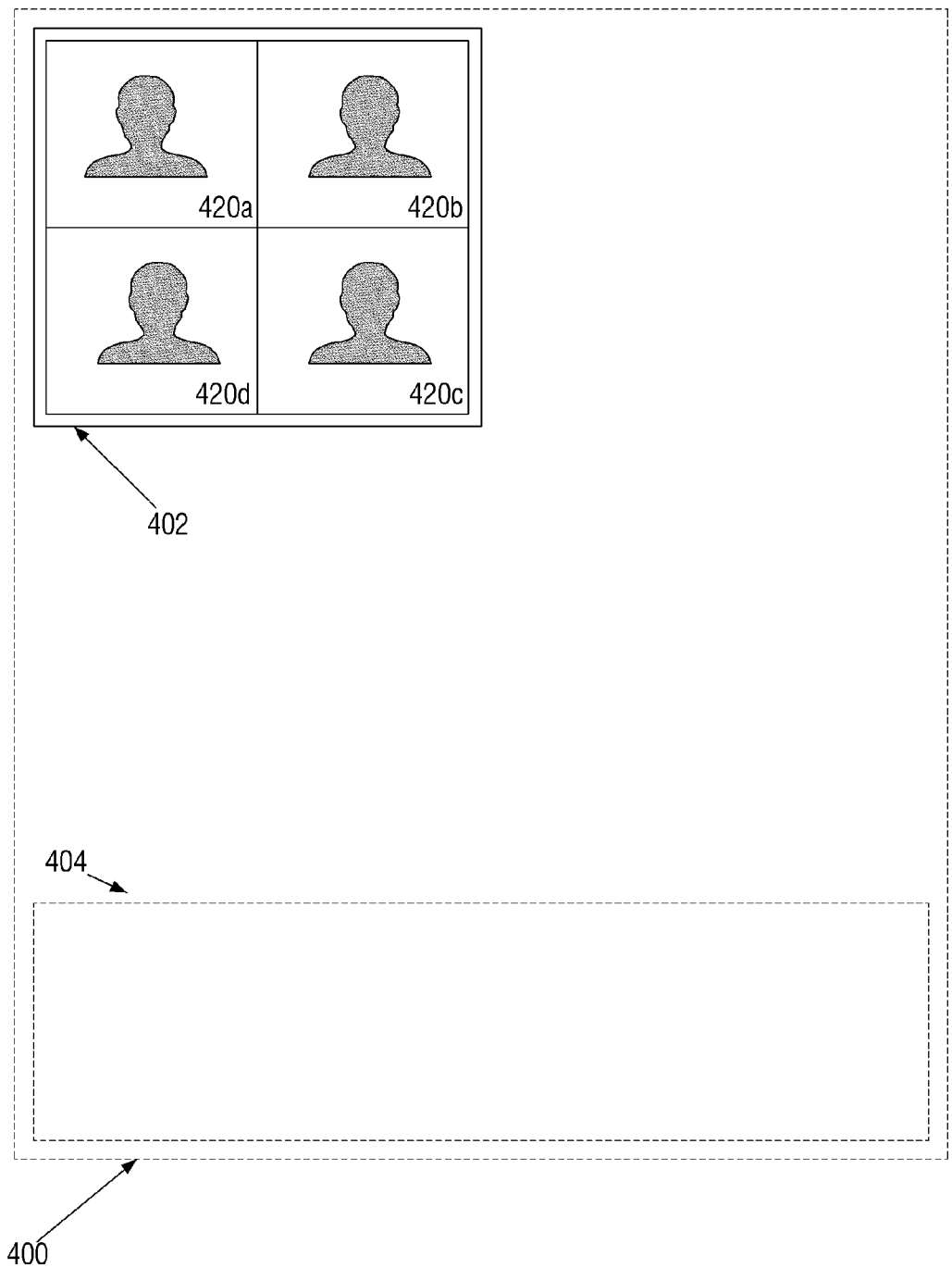

Referring to FIG. 4c, in some other exemplary embodiments, the first graphic elements 420a to 420d may each have a rectangular-shaped edge and may be arranged to have a grid shape as a whole.

In this embodiment, the first graphic elements 410a to 410e and 420a to 420d may be fixed and arranged in the first area 402 of the user interface 400 during the teleconference. For example, regardless of the transmission and reception of various data such as messages exchanged between a plurality of conference participants, the first graphic elements may maintain a displayed state in a fixed position.

In some embodiments, when a participant is added or removed from the teleconference, the first graphic elements may be rearranged to reflect the increase or decrease of the participant. For example, when one conference participant is added while the first graphic elements 410a to 410e corresponding to five conference participants are displayed as shown in FIG. 4a, as shown in FIG. 4b, the first graphic elements 410a to 410f corresponding to the six conference participants may be rearranged in the first area 402.

Referring back to FIG. 3, in step S310, a user input regarding an opinion expression may be obtained by the input unit 120 of the conference participant terminal 100. The opinion expression includes various expressions of opinions, judgments, facts, emotions, feelings, etc. of the conference participants. For example, the opinion expression includes an expression of wanting to ask a question about the content being discussed or explained at a conference, an expression of agreeing or disagreeing with an agenda, an expression of affirming or rejecting a fact. Further, the above opinion expression includes an expression of empathy or disagreement with respect to the subjective opinions of other participants, an expression about subjective feelings that is like or dislike, an expression of wanting to applaud for the opinions or facts presented, and an opinion that the content being explained is difficult or easy to understand. In addition, the opinion expression may be an opinion expression of selecting one of several options.

In step S310, a user input regarding an opinion expression may be obtained by various means provided in the input unit 120. For example, the user input includes a voice input through the microphone 120a, a character, a shortcut key, or an emoji input through the keyboard, a video input through the video input device 120b, a selection or gesture input through the pointing device 120c, etc.

Figure 6:
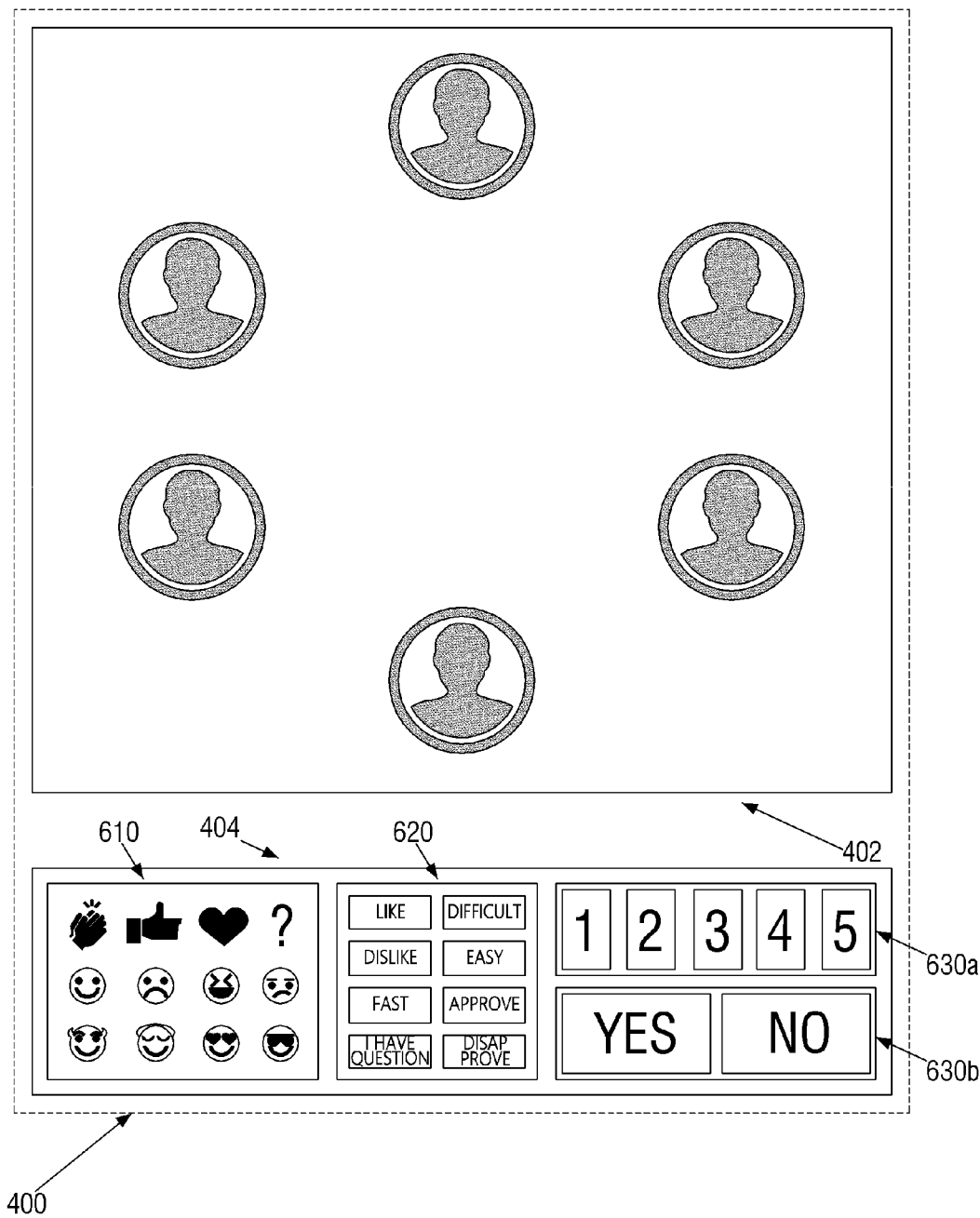
FIG. 6 is a diagram describing an exemplary UI provided to receive opinion expressions from teleconference participants in the embodiment described with reference to FIG. 3.
Figure 7:
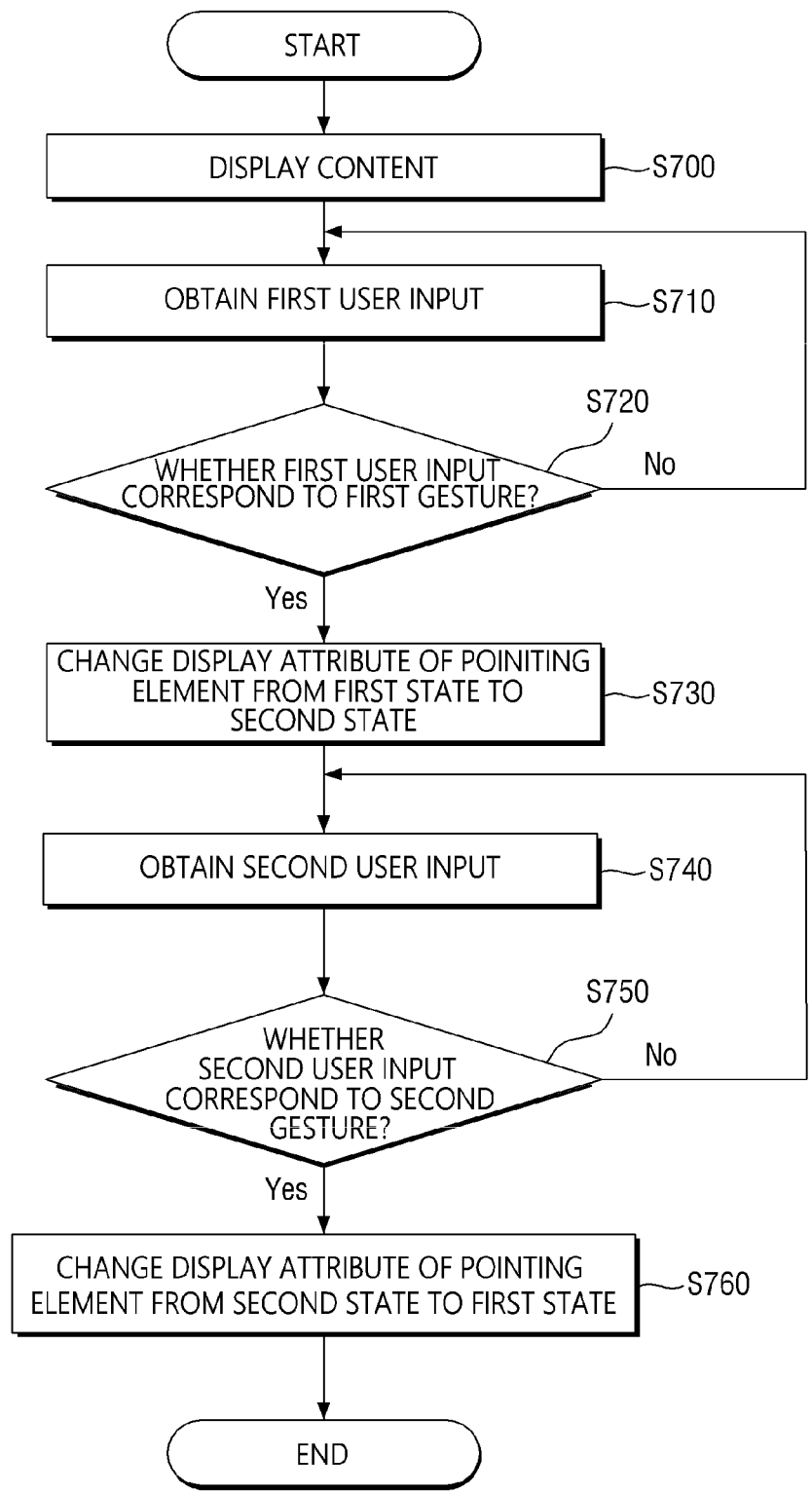
FIG. 7 is a flowchart of a method for providing a teleconference according to another embodiment of the inventive concept.

Referring to FIG. 6, in some embodiments, a user interface that allows a user to select one of a plurality of preset opinion expression elements 610, 620, 630a, and 630b may be provided to a user. A user interface including selectable opinion expression elements may be provided, for example, in the second area 404.

In some embodiments, a plurality of opinion expression elements include a plurality of emojis 610 or emoticons. An emoji is an image-based visual expression means that implicitly conveys various emotions and opinions. An emoji is a symbol that simplifies objects, gestures, and facial expressions through an image or a combination of images and characters, and is one of the expression means used to simply convey thoughts and emotions. In some embodiments of the inventive concept, a plurality of emojis 610 selectable by the user are provided on the screen as opinion expression elements, and by receiving an emoji selection from the user through an input means, a user input regarding an opinion expression may be obtained. In some other embodiments, by receiving a predefined shortcut key or an abbreviation corresponding to an emoji on a keyboard, a user input regarding an opinion expression may be obtained.

In some embodiments, a plurality of opinion expression elements include preset text phrases 620. For example, a plurality of user-selectable text phrases 620 such as "like," "dislike," "approve," and "disapprove" are provided on the screen as an opinion expression element, and a user input regarding the opinion expression may be obtained by selecting the text phrase from the user through an input means.

In some embodiments, a plurality of opinion expression elements include a plurality of selection options 630a and 630b. For example, it may include selection options such as "YES," "NO," and/or "Option 1" to "Option 5," and the like.

Referring back to FIG. 3, step S320 will be described. In step S320, in response to obtaining a user input regarding the opinion expression, the second graphic element corresponding to the opinion expression is displayed at the position of the first graphic element corresponding to the user among the plurality of first graphic elements 410a to 410f and 420a to 420d.

Figure 5A:
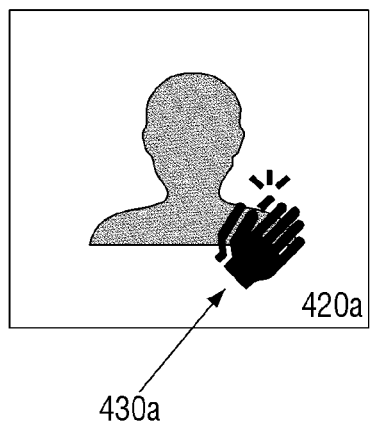
FIGS. 5a to 5d are diagrams describing an exemplary UI, in which an opinion expressions of teleconference participants are displayed, in the embodiment described with reference to FIG. 3.

In some embodiments, the second graphic element may be an emoji selected by the user in step S310. Referring to FIG. 5a, an emoji 430a selected by a user is displayed so as to at least partially overlap with a first graphic element 420a corresponding to the user.

Figure 5B:
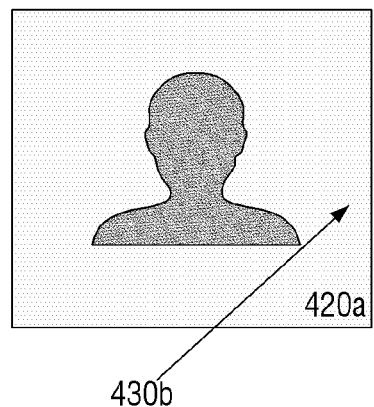

In some embodiments, the second graphic element may be a translucent layer having a color corresponding to an emoji, text, or a selection option selected by the user in step S310. In this case, the corresponding color may be a color that abstractly expresses the opinion or emotion that the user intends to express through an image, text, or a selection option, or a color that intuitively conveys such opinion or emotion. For example, if the user selects the opinion expression "like" or "approve," the corresponding color may be green, and if the user selects the expression "dislike" or "disapprove," the corresponding color may be red. Referring to FIG. 5b, the translucent layer is displayed so as to overlap with the position of the first graphic element 420a corresponding to the user.

Figure 5C:
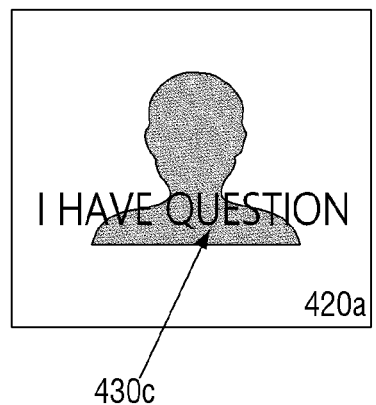

In some embodiments, the second graphic element may be a text phrase selected and input by the user from among the plurality of expression elements 620 in step S310. In addition, the second graphic element may be a text phrase typed and input by a user through an input device such as a keyboard. Referring to FIG. 5c, the text phrase is displayed so as to at least partially overlap with a first graphic element 420a corresponding to a user of the computing device. Although not shown, in some other embodiments, the text phrase may be displayed adjacent to the first graphic element 420a in the form of a speech balloon.

Figure 5D:
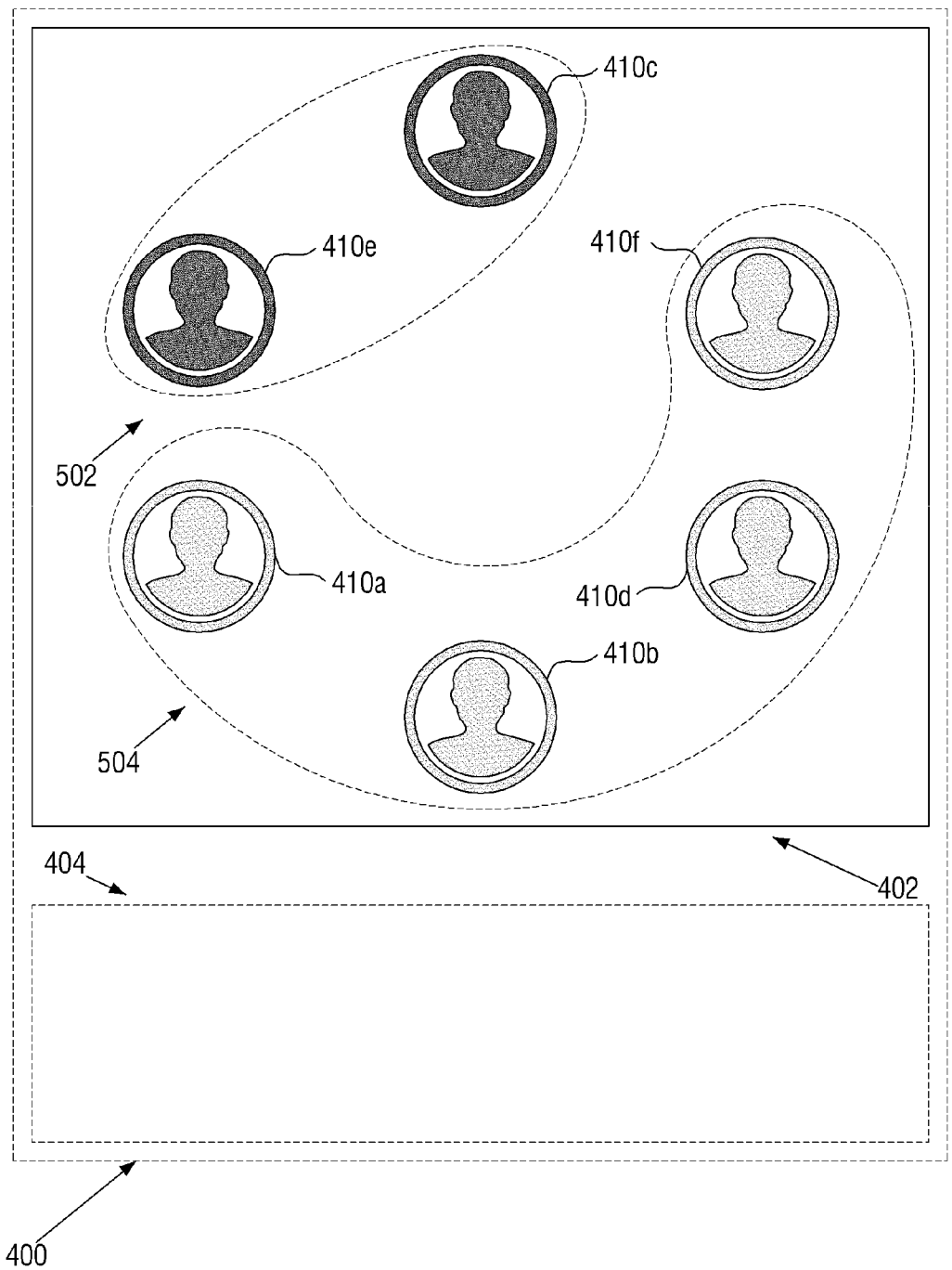

In an embodiment of the inventive concept, based on inputs respectively obtained from a plurality of conference participants, first graphic elements corresponding to conference participants may be rearranged. FIG. 5d is a diagram illustrating an example, in which first graphic elements are rearranged when a plurality of conference participants input to select one of two selection options. For example, if some of a plurality of conference participants select and input the option "YES," the other participants select and input the option "NO," it can be rearranged so that the first graphic elements 410c and 410e corresponding to the participants who input "YES" constitute the first group 502 and the first graphic elements 410a, 410b, 410d, and 410f corresponding to the participants who input "NO" constitute the second group 504.

Referring back to FIG. 3, step S330 will be described. In some embodiments, the second graphic element displayed in step S320 may be displayed for a preset time and then removed. Specifically, in step S330, it is determined whether a preset time has elapsed after the second graphic element is displayed.

If the preset time has elapsed, the process proceeds to step S340 and the second graphic element is removed. In some embodiments, the second graphic element may be immediately removed from the screen after a preset time elapses. In some other embodiments, the second graphic element gradually decreases in size or length as time passes, and eventually reaches zero size or length, and may be removed from the screen. In still other embodiments, the second graphic element may gradually increase in transparency as time passes, and eventually become completely transparent and may be removed from the screen.

In this embodiment, the second graphic element is removed immediately or gradually after maintaining the displayed state for a preset period of time so that the participant leading the conference such as the presenter can intuitively recognize when a point in time other conference participants finally express their opinions. For example, the presenter can easily identify a conference participant who recently provided feedback on a content being discussed or explained in a teleconference, such as wanting to ask, sympathy, and dissent opinion, etc., or a conference participant who did not.

Meanwhile, in some embodiments, an active state of each of the plurality of conference participants may be displayed based on a time point of the final opinion expression input of each of the plurality of conference participants. Here, the active state visually indicates whether there has been an opinion expression for a certain period of time. For example, by displaying the color of the first graphic element corresponding to the conference participant who has not expressed any opinion for a certain period of time in black and white, participants who lead the conference, such as the presenter, can easily identify participants who may have lost interest in the content being discussed.

So far, a method for providing a teleconference according to an embodiment of the inventive concept has been described with reference to FIGS. 3, 4a to 4c, 5a to 5d, and 6.

In the conventional online teleconference providing method, it is difficult to intuitively distinguish the voices of participants compared to offline face-to-face meetings. Further, in the conventional teleconference providing method, unlike offline face-to-face meetings, smooth communication of opinion is difficult when multiple participants' voice utterances occur at the same time, and it is impossible to communicate opinions and emotions by non-verbal means such as facial expressions, gestures, attitudes, and a show of hands. Due to such factors, other participants who are not the participant leading the current discussion or presenter in the teleconference tend to be reluctant to express a trivial opinion or give feedback on the contents of the discussion in order not to disturb the flow of the discussion. On the other hand, from the perspective of the participant who is leading the discussion or presenter, it is difficult to obtain feedback from participants expressed by non-verbal means such as facial expressions, gestures, attitudes, a show of hands, etc., unlike in offline face-to-face meetings.

According to the present embodiment, by providing a user interface for selecting any one of a plurality of opinion expression elements 610, 620, 630a, and 630b to a user, and obtaining a user input (step S310), participants in the teleconference can express their thoughts, opinions, and emotions expressed through non-verbal means such as facial expressions, gestures, attitudes, and applause in conventional offline face-to-face meetings.

Further, according to the present embodiment, by visualizing the opinion expression input by the participant of the teleconference as a second graphic element such as emoji, color, and text (see FIGS. 5a to 5d) and displaying it at the position of a first graphic element corresponding to each conference participant (step S320), the presenter or the like can intuitively recognize the opinion expression of the conference participant without interrupting or interfering with the main discussion through voice in the teleconference.

In addition, according to the present embodiment, by visually rearranging the first graphic elements corresponding to the plurality of conference participants based on the response contents selected and input by each of the plurality of conference participants (see FIG. 5d), the opinions or approve or disapprove opinions, etc. of each participant on a limited number of selections can be easily recognized by the participants of the conference, including the presenter. The process of gathering the opinions of participants, for example, by a show of hands, etc. in an offline face-to-face meeting becomes possible in an online teleconference in an easier and more intuitive way.

Further, according to the present embodiment, by displaying the active state of each of the plurality of conference participants based on the final opinion expression input time point of each of the plurality of conference participants, participants who lead the conference, such as the presenter, can easily identify participants who may have lost interest in the conference.

Hereinafter, a method for providing a teleconference according to another embodiment of the inventive concept will be described with reference to the flowchart of FIG. 7 and FIGS. 8a to 8d. The present embodiment, in a teleconference, in which presentation target content is shared online with participants, such as a web conference or online seminar, provides a method for enabling the presenter to indicate the part that the presenter wants to emphasize on the presentation target content in a way of participants intuitively recognizing it.

First, in step S7), a user interface for a teleconference is displayed on a display such as the video display device 130a, and presentation target content shared among a plurality of teleconference participants is displayed on the display. Also, a pointing element is displayed on the display. The pointing element is a graphic element, such as an arrow-shaped mouse pointer, used by a user to interact with content or GUI objects displayed on the display. In general, the display attribute of the pointing element may be changed according to the type and state of the GUI object or the content in the portion where the pointing element is located on the display.

In step S710, a first user input is obtained. The user input may be obtained through the pointing device 120c or the like described with reference to FIG. 2. When the pointing device 120c is a mouse, a stylus, a touch pad, or a touch screen, the user input may be data representing a two-dimensional movement of the pointing device 120c. When the pointing device 120c is a motion detection device based on an acceleration sensor or the like, the user input may be data representing a three-dimensional movement of the pointing device 120c.

In step S720, it may be determined whether the first user input corresponds to the first gesture. In some embodiments, the first gesture is a gesture of reciprocating the pointing element horizontally or left and right within a preset distance at least a preset number of times within a preset time. In some other embodiments, the first gesture is a gesture of reciprocating the pointing element vertically or up and down within a preset distance at least a preset number of times within a preset time. In some other embodiments, the first gesture is a gesture of moving the pointing element circularly at least a preset number of times.

If it is determined in step S720 that the first user input does not correspond to the first gesture, the process returns to step S710 and a first user input may be obtained.

When it is determined in step S720 that the first user input corresponds to the first gesture, in step S730, the display attribute of the pointing element may be changed from the first state to the second state. The display attribute of the pointing element includes the shape, size, and color of the pointing element.

Figure 8A:
FIGS. 8a to 8d are diagrams for describing an exemplary method of changing a display attribute of a pointing element according to a user's gesture in the embodiment described with reference to FIG. 7.

In some embodiments as shown in FIG. 8a, when the first user input corresponds to a gesture of reciprocating the pointing element horizontally or left and right within a certain distance, the shape of the pointing element may be changed from an arrow to a finger.

Figure 8B:
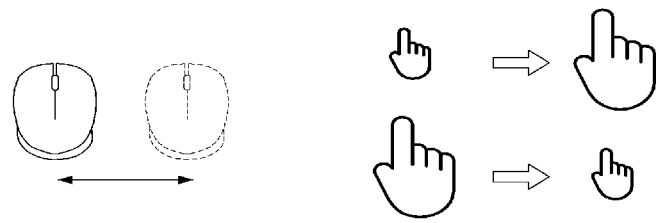

In some other embodiments as shown in FIG. 8b, when the first user input corresponds to a gesture of reciprocating the pointing element horizontally or left and right within a certain distance, the size of the pointing element may increase or decrease. In this case, when the size of the pointing element is less than the threshold value, the size of the pointing element may increase, and when the size of the pointing element reaches the threshold value, the size of the pointing element may decrease.

Figure 8C:
Figure 8D:
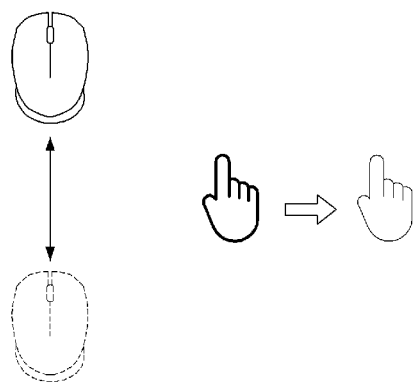

In some embodiments as shown in FIG. 8d, when the first user input is a gesture of reciprocating a pointing element vertically or up and down within a certain distance, the color of the pointing element may be changed from black to red.

Subsequently, data representing the change in the display attribute of the pointing element as described above is transmitted to the computing devices of the plurality of conference participants, and the display attribute of the pointing element displayed on the display of the computing device of the plurality of conference participants is changed from the first state to the second state.

This will be described with reference to FIG. 7 again. After the display attribute of the pointing element is changed from the first state to the second state, a second user input is obtained in step S740. Subsequently, in step S750, it may be determined whether the second user input corresponds to the second gesture. In some embodiments, the second gesture is a gesture of reciprocating the pointing element horizontally or left and right within a preset time and exceeding a preset distance at least a preset number of times.

If it is determined in step S750 that the second user input does not correspond to the second gesture, the process returns to step S740 and a second user input may be obtained.

If it is determined in step S750 that the second user input corresponds to the second gesture, in step S760, the display attribute of the pointing element may be changed from the second state to the first state. As illustrated in FIG. 8c, when the second user input corresponds to a gesture of reciprocating the pointing element horizontally or left and right exceeding a certain distance, the shape of the pointing element may be returned from a finger to an arrow.

Subsequently, data representing a change in the display attribute of the pointing element as described above is transmitted to the computing devices of the plurality of conference participants, and the display attribute of the pointing element displayed on the display of the computing device of the plurality of conference participants is changed from the second state to the first state.

So far, a method for providing a teleconference according to an embodiment of the inventive concept has been described with reference to FIGS. 7 and 8a to 8d.

In the conventional method for providing a teleconference, when a presenter of a web conference or online seminar wants to highlight or indicate (point) a specific part of the presentation target content, a method of underlining the part which intended to be highlighted using a drawing tool provided by the teleconference program, or moving the mouse pointer repeatedly and quickly around the corresponding part is used. However, it is difficult to attract sufficient attention from teleconference participants through such a method. In particular, compared to pointing at a specific part of the presentation screen with a physical pointer in an offline face-to-face meeting, the degree of attention that can be obtained from conference participants through the above-described conventional method is very low.

According to this embodiment, when a presenter of a web conference or online seminar wants to highlight or indicate (point) a specific part of the presentation targeting content, it is possible to attract the attention of other conference participants by simply and quickly changing the display attributes of a pointing element displayed in the screen such as the shape, size, and color through a simple gesture input using by the pointing device. In other words, it is possible to achieve an effect similar to pointing a specific part of the presentation screen with a physical pointer in an offline face-to-face meeting.

Figure 9:
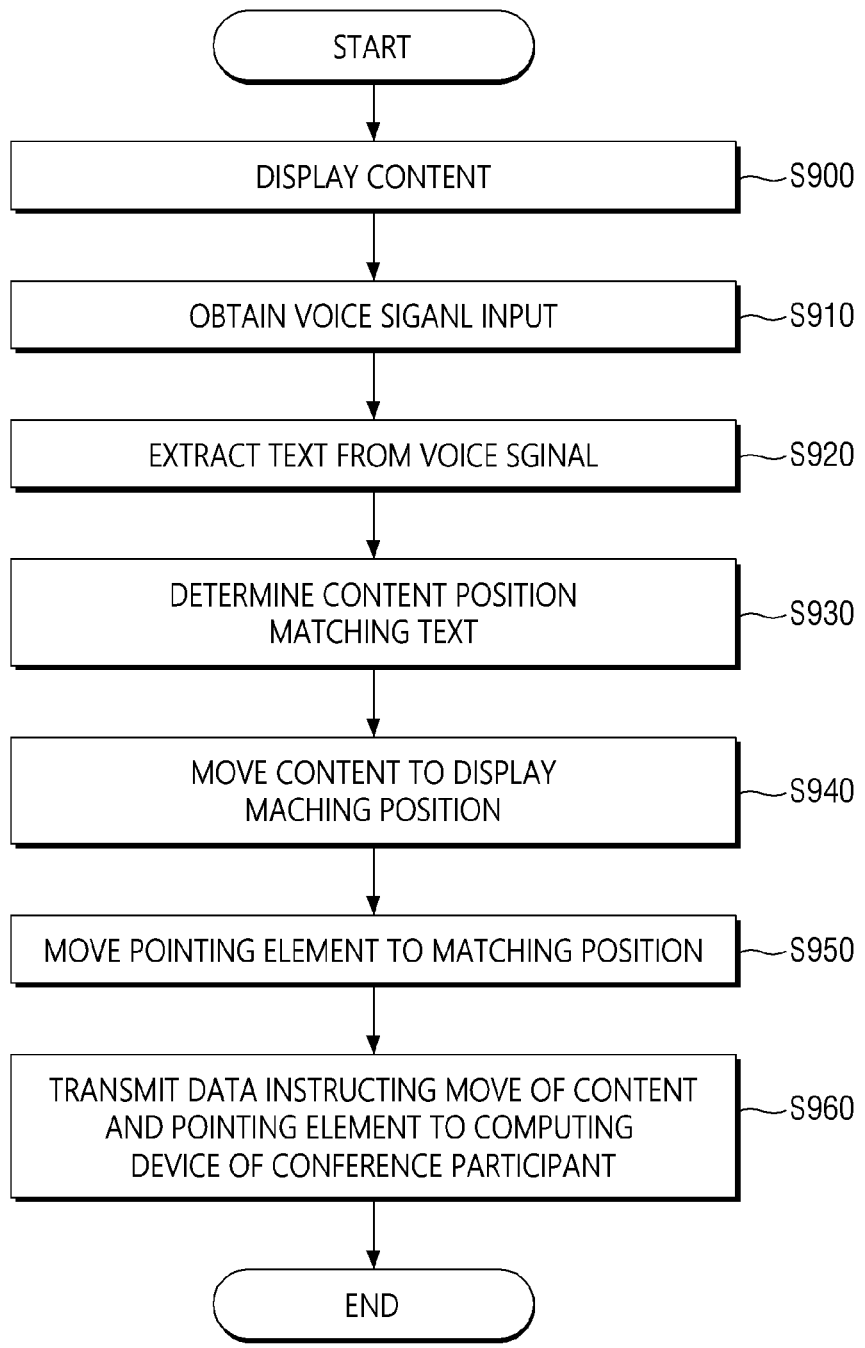
FIG. 9 is a flowchart of a method for providing a teleconference according to another embodiment of the inventive concept.

Hereinafter, a method of providing a teleconference according to another embodiment of the inventive concept will be described with reference to the flowchart of FIG. 9. The present embodiment provides, in a teleconference where presentation target content is shared online with participants, such as a web conference or online seminar, a method of allowing a pointing element to automatically indicate a part of the presentation target content that the presenter describes by voice.

First, in step S900, a user interface for a teleconference is displayed on a display such as the video display device 130a, and presentation target content shared to a plurality of teleconference participants is displayed on the display. Also, a pointing element is displayed on the display.

In step S910, a voice signal is obtained through the sound input device 120a provided in the computing device of the presenter of the teleconference.

In step S920, automatic speech recognition (ASR) is performed on the acquired voice signal, and text is extracted from the voice signal. In some embodiments, the automatic speech recognition processing may be performed through processes such as a process of extracting a feature from a voice signal, prediction through machine learning, classification, clustering, and association. The automatic speech recognition processing may be performed by various speech recognition techniques well known in the art.

In step S930, a part of the presentation target content that matches the extracted text is determined. More specifically, this process may be performed through processes such as natural language processing (NLP), context analysis, and comparative analysis with the text extracted through the voice signal for sentences included in the presentation target content. In this case, if there are two or more parts of the content that match the extracted text, a part closest to the position of the content currently displayed on the screen may be determined as the matching part.

In step S940, the content is moved so that the part of the presentation target content determined to be matched is displayed on the screen, and in step S950, the pointing element displayed on the screen is moved so that the pointing element points to the matching position. Subsequently, in step S960, data indicating the movement of the pointing element and the movement of the content is transmitted to the computing devices of the plurality of conference participants.

According to the present embodiment, in a teleconference where presentation target content is shared online with participants, such as a web conference or an online seminar, the presenter's voice is recognized and the matching part of the contents of the presentation target content is automatically analyzed and determined, and the pointing element is automatically moved to indicate the corresponding position so that what the presenter is describing or what the presenter is referencing to on the content can be easily communicated to other conference participants.

Content Joint Editing Considering Guarantee of the Real-Time Property of Content Update Hereinafter, when a plurality of editors simultaneously edit a content, embodiments, in which the real-time property of the update of edits is preserved as much as possible even if the number of editors increases, will be described.

A configuration and operation of a content joint editing system according to another embodiment of the inventive concept will be described. First, it will be described with reference to FIGS. 10 to 11.

Figure 10:
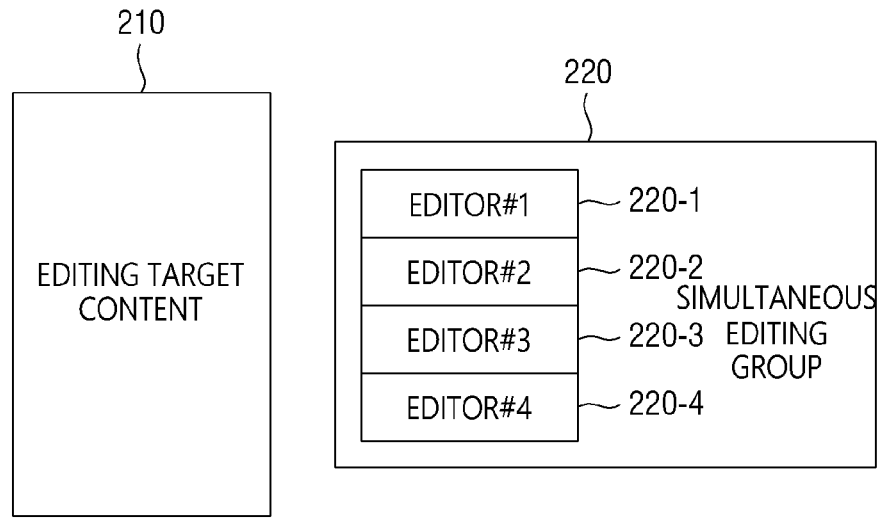
FIGS. 10 and 11 are diagrams for describing a content joint editing system according to another embodiment of the inventive concept.

In some embodiments of the inventive concept, data for rendering and editing the editing target content 210 are loaded or stored by computing devices. As shown in FIG. 10, the editing target content 210 is simultaneously edited by a plurality of editors 220-1, 220-2, 220-3, and 220-4. The user account used by each of the plurality of editors 220-1, 220-2, 220-3, 220-4 may be registered as a joint editing member account by the owner of the editing target content 210, or registered as the joint editing member account by receiving the invitation message for joint editing and accepting it. FIG. 10 illustrates that the editing target content 210 is simultaneously edited by the simultaneous editing group 220 including the first editor 220-1 to the fourth editor 220-4.

The editing target content 210 includes all types of digital contents. For example, the editing target content 210 may be any one of text documents, presentation materials, digital music editing data, video editing data, and online whiteboard data.

Figure 11:
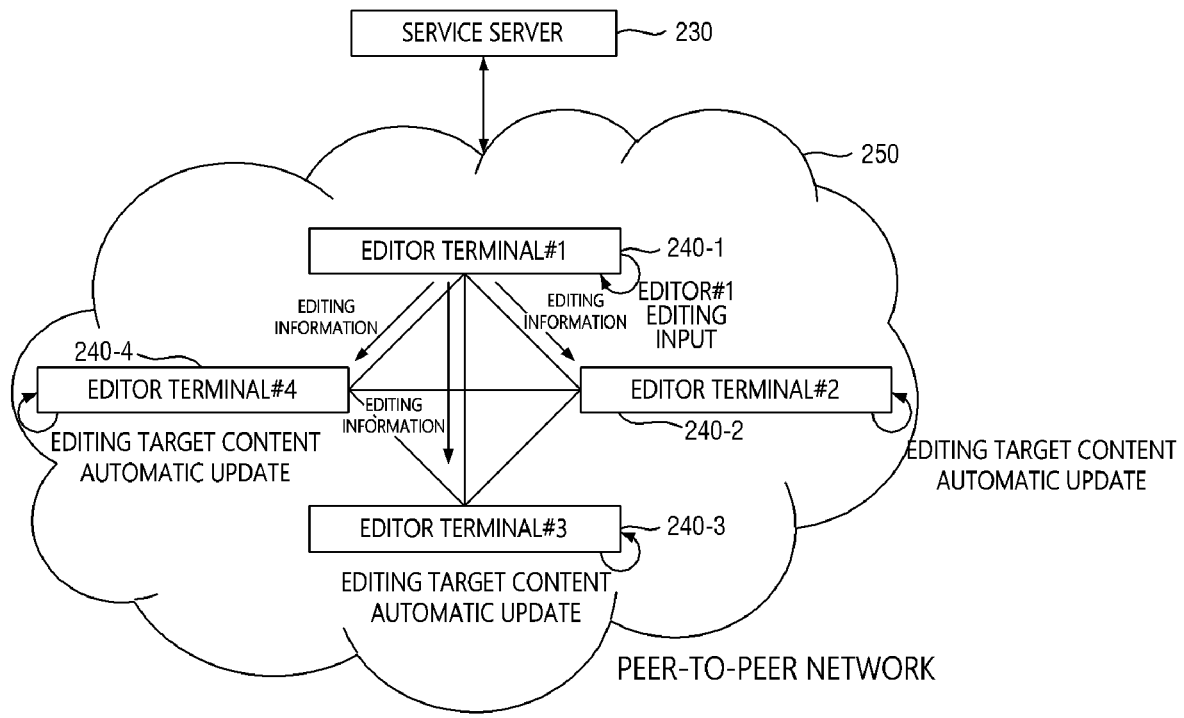

FIG. 11 is an exemplary configuration diagram of a content joint editing system according to the present embodiment. As shown in FIG. 11, the content joint editing system according to the present embodiment may include a service server 230 and a peer-to-peer network 250 (hereinafter, referred to as a 'p2p network').

The service server 230 may provide a joint editing member registration or invitation interface for configuring the simultaneous editing group 220 of the editing target content 210 to editor terminals 240-1, 240-2, 240-3, and 240-4. Further, the service server 230 may provide a viewing/editing interface of the editing target content 210 to the editor terminals 240-1, 240-2.240-3, and 240-4.

Further, the service server 230 may support at least some of the editor terminals belonging to the simultaneous editing group 220 of the editing target content 210 to configure the p2p network 250.

The service server 230 may support all editor terminals belonging to the simultaneous editing group 220 of the editing target content 210 to configure the p2p network 250. When the simultaneous editing group 220 of the editing target content 210 is the first to fourth editors 220-1, 220-2, 220-3, 2204, the service server 230 may generate p2p network setting information including network address information of the first to fourth editor terminals 240-1, 240-2, 240-3, and 240-4, and transmit the p2p network setting information to the first to fourth editor terminals 240-1, 240-2, 240-3, and 240-4. The first to fourth editor terminals 240-1, 240-2, 240-3, and 240-4 may configure the p2p network 250 using the p2p network setting information.

Editor terminals 240-1, 240-2, 240-3, and 240-4 configuring the p2p network 250 may directly transmit/receive editing information in a peer-to-peer manner. In this case, since the editing information is directly transmitted and received between editor terminals without passing through a relay device such as the service server 230, a bottleneck due to delay in processing in the relay device will not occur. It is possible to minimize the occurrence of latency in the process of transmitting and receiving the editing information. That is, if the content joint editing method according to the present embodiment is performed, it will be possible to obtain an effect of providing real-time simultaneous edit without increasing network resources.

In some embodiments, the editor terminals 240-1, 240-2, 240-3, and 240-4 configuring the p2p network 250 may transmit and receive editing information using a WebSocket. When data is transmitted and received within the p2p network 250 using a Web Socket, the possibility of data loss becomes very low.

In the p2p network 250 shown in FIG. 2, the operation of the content joint editing system according to the present embodiment will be described on the assumption that a user of the first editor terminal 240-1 inputs a user input for editing the editing target content 210 to the first editor terminal 240-1.

In some embodiments, the first editor terminal 240-1 generates editing information indicating updates of the editing target content 210 according to the user input, and before displaying the update result of the editing target content 210 according to the editing information, the editing information may be broadcasted to the second to fourth editor terminals 240-2, 240-3, and 240-4. In other words, by allowing the editing information to be broadcasted to other editor terminals as quickly as possible, the real-time property of reflecting edits may be further enhanced.

The editing information may be generated in units of editing transactions indicating one completed editing action. For example, the editing action of moving a first object placed on the editing target content 210 from a first position to a second position goes through several intermediate positions between the first position and the second position, but not all movements to each of the intermediate positions will be generated as individual editing information. That is, since the editing information is generated in units of editing transactions and the editing information is broadcasted within the p2p network, it is possible to prevent pieces of meaningless user manipulation from being transmitted to other editor terminals as they are.

In order to enhance the real-time property of reflecting edits, the second to fourth editor terminals 240-2, 240-3, and 240-4 that have received the editing information may also automatically perform an update of the editing target content 210 reflecting the editing information in response to receiving the editing information, and immediately display the updated editing target content. Automatically performing the update of the editing target content 210 reflecting the editing information may mean performing the update immediately without receiving a confirmation input related to the reflection of the edits from the user.

In some other embodiments, the first editor terminal 240-1 generates editing information indicating updates of the editing target content 210 according to the user input, and after immediately displaying the update result of the editing target content 210 according to the editing information, the editing information may be broadcasted to the second to fourth editor terminals 240-2, 240-3, and 240-4.

Figure 12:
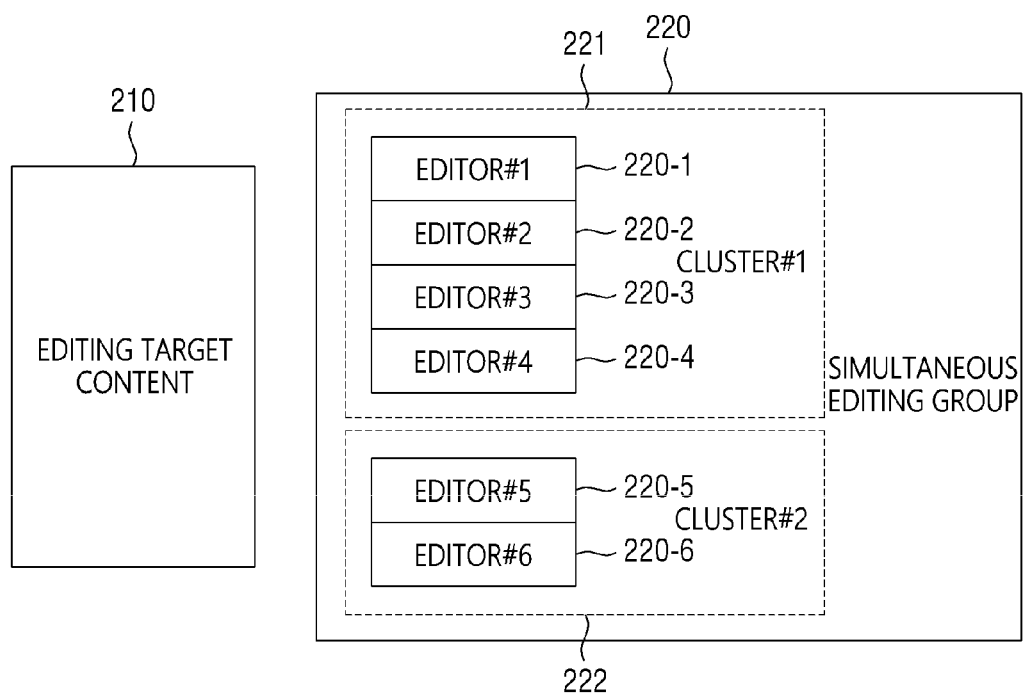
FIGS. 12 to 13 are diagrams for describing an operation of configuring a plurality of p2p networks by the content joint editing system described with reference to FIG. 2.

The service server 230 may group editor terminals belonging to the simultaneous editing group 220 of the editing target content 210 and support each cluster formed as a result of the grouping to configure an individual p2p network. In this regard, FIG. 12 shows that the first cluster 221 configured with the first to fourth editors 220-1, 220-2, 220-3, 220-4 and the second cluster 222 configured with the fifth to sixth editors are identified as a result of the grouping for the simultaneous editing group 220 configured with the total of 6 editors 220-1, 220-2, 220-3, 220-4, 220-5, 220-6.

Figure 13:
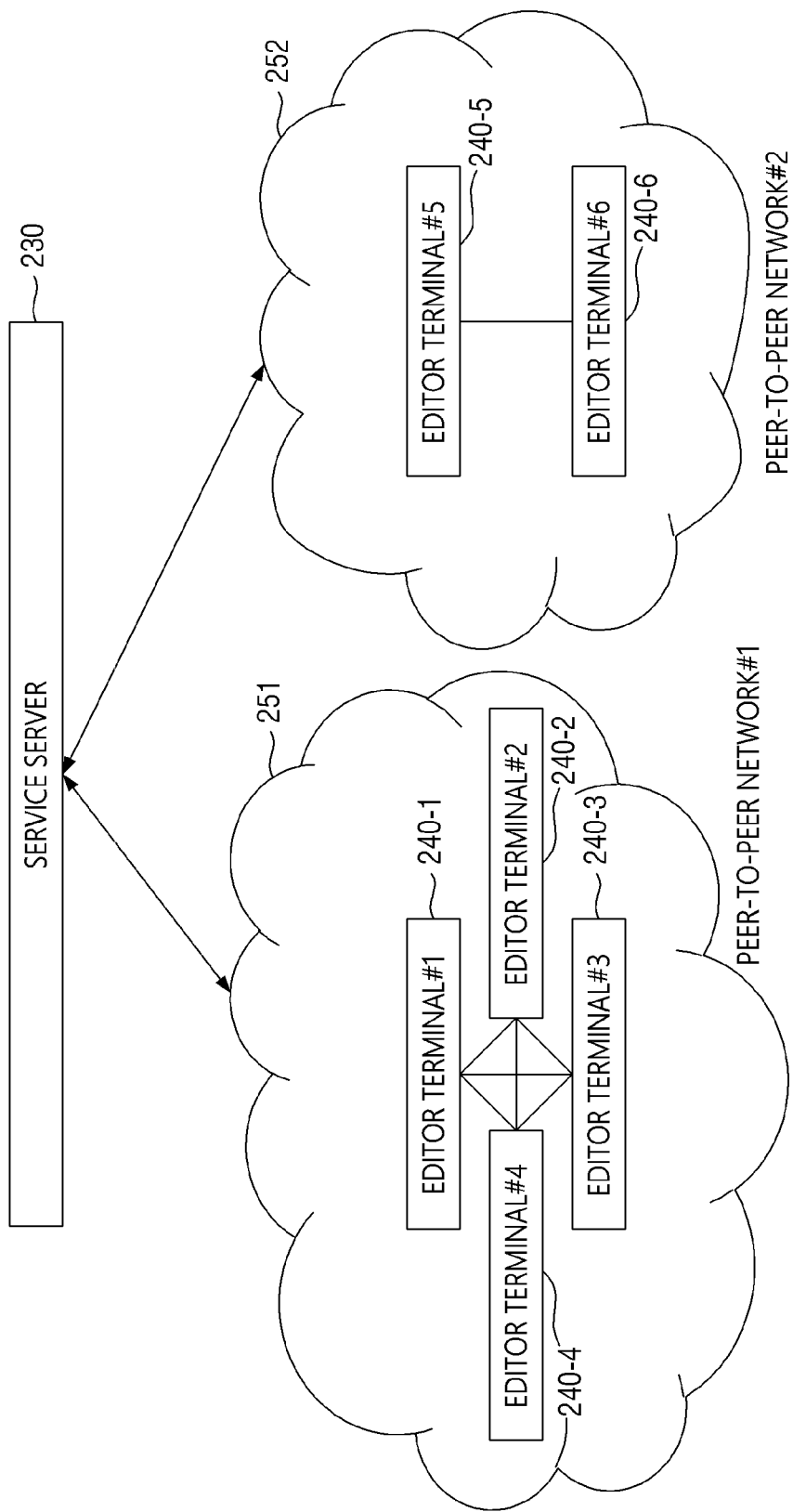

FIG. 13 shows that editor terminals 240-1, 240-2, 240-3, and 240-4 of the first cluster 221 configure the first p2p network 251, and the editor terminals 240-5 and 240-6 of the second cluster 222 configure the second p2p network 252. To this end, the service server 230 may generate the first p2p network setting information including network address information of the first to fourth editor terminals 240-1, 240-2, 240-3, and 2404, and transmit the first p2p network setting information to the first to fourth editor terminals 240-1, 240-2, 240-3, and 2404. Further, the service server 230 may generate the second p2p network setting information including network address information of the fifth to sixth editor terminals 240-5 and 240-6, and transmit the second p2p network setting information to the fifth to sixth editor terminal 240-5 and 240-6.

Even if the number of editor terminals belonging to the simultaneous editing group 220 of the editing target content 210 increases, editors subjected to the real-time update of edits may be only some. For example, if the entire area occupied by the editing target content 210 is large enough to display only a specific part, which is a part of the entire area occupied by the editing target content 210, through the display device of the editor terminal, it is most important to update edits in real-time between editor terminals displaying the same part, and it is not necessary to update edits of editor terminals displaying other parts in real time.

Even if the number of editor terminals belonging to the simultaneous editing group 220 of the editing target content 210 increases to a burdensome level, unless all editor terminals are displaying only a specific part of the editing target content 210, the transmission/reception traffic of editing information may be distributed through the configuration of the p2p network in the cluster unit. Through this, this embodiment can provide the effect that, even if the number of editors increases, the real-time property of update of edits is preserved as much as possible, and if it is difficult to display all the content on one screen of the editor terminal when multiple editors simultaneously edit the content, the real-time property of update of edits between editor terminals where the content parts displayed on the screen overlap is preferentially guaranteed.

In some embodiments, when the number of editor terminals belonging to the simultaneous editing group 220 of the editing target content 210 is not a burdensome level, a p2p network of all editor terminals belonging to the simultaneous editing group 220 of the editing target content 210 may be configured instead of configuring a p2p network in a cluster unit.

That is, the service server 230 may configure a p2p network in a cluster unit only when the number of editor terminals of the editing target content exceeds the reference value, and when the number of editor terminals of the editing target content is equal to or less than the reference value, the service server 230 may control all of the plurality of editor terminals of the editing target content to configure the p2p network.

In this case, the reference value, which is a criterion for configuring a p2p network in a cluster unit, may be dynamically adjusted using at least one of a type of editing target content, an importance of editing target content, and a network state. The content joint editing system according to the present embodiment may provide the effect that the configuration of the p2p network is flexibly diversified based on the number of editor terminals belonging to the simultaneous editing group 220, and through this, the range of editor terminals that guarantees the real-time property of update of edits is dynamically managed to a level that is not burdensome in light of the total number of editors.

In some embodiments, the service server 230 may dynamically update the cluster configuration and transmit the p2p network setting information of the updated cluster to a terminal belonging to the updated cluster. For example, when the requirement to leave the cluster of the first editor terminal is satisfied according to a user input to the first editor terminal belonging to the first cluster, the service server 230 may transmit the p2p network setting information of the updated first cluster to the belonging terminal remaining in the first cluster in order to automatically exclude the first editor terminal from the first cluster. Further, when the requirement to join the cluster of the second editor terminal is satisfied according to a user input to the second editor terminal that does not belong to the first cluster, the service server 230 may transmit the p2p network setting information of the updated first cluster to an existing belonging terminal of the first cluster in order to dynamically and automatically include the second editor terminal in the first cluster.

In summary, it can be understood that when it is determined that migration to the second p2p network according to the result of a user input to the first editor terminal belonging to the first p2p network among the plurality of editor terminals, the service server 230 transmits update information on the first p2p network to editor terminals belonging to the first p2p network, and transmits update information on the second p2p network to editor terminals belonging to the second p2p network.

As described above, the cluster once configured is not statically maintained, and joining and leaving the cluster may dynamically occur according to a user input for content editing. Further, this dynamic cluster joining/leaving is automatically controlled by the service server 230.

Hereinafter, a method of grouping editor terminals according to some embodiments will be described with reference to FIGS. 14 to 18.

As described above, since editing information can be transmitted and received without latency between editor terminals belonging to the same p2p network, updates made by one editor can be reflected in real time to other editor terminals. However, if a plurality of editor terminals belong to a p2p network, it is difficult to guarantee real-time property, so only editor terminals that strongly require the guarantee of real-time property need to belong to the same p2p network.

It can be seen that the editor terminals displaying the same part of the editing target content 210 are strongly required to guarantee real-time property, and the service server 230 may group the editor terminals displaying the same part into one cluster.

Figure 14:
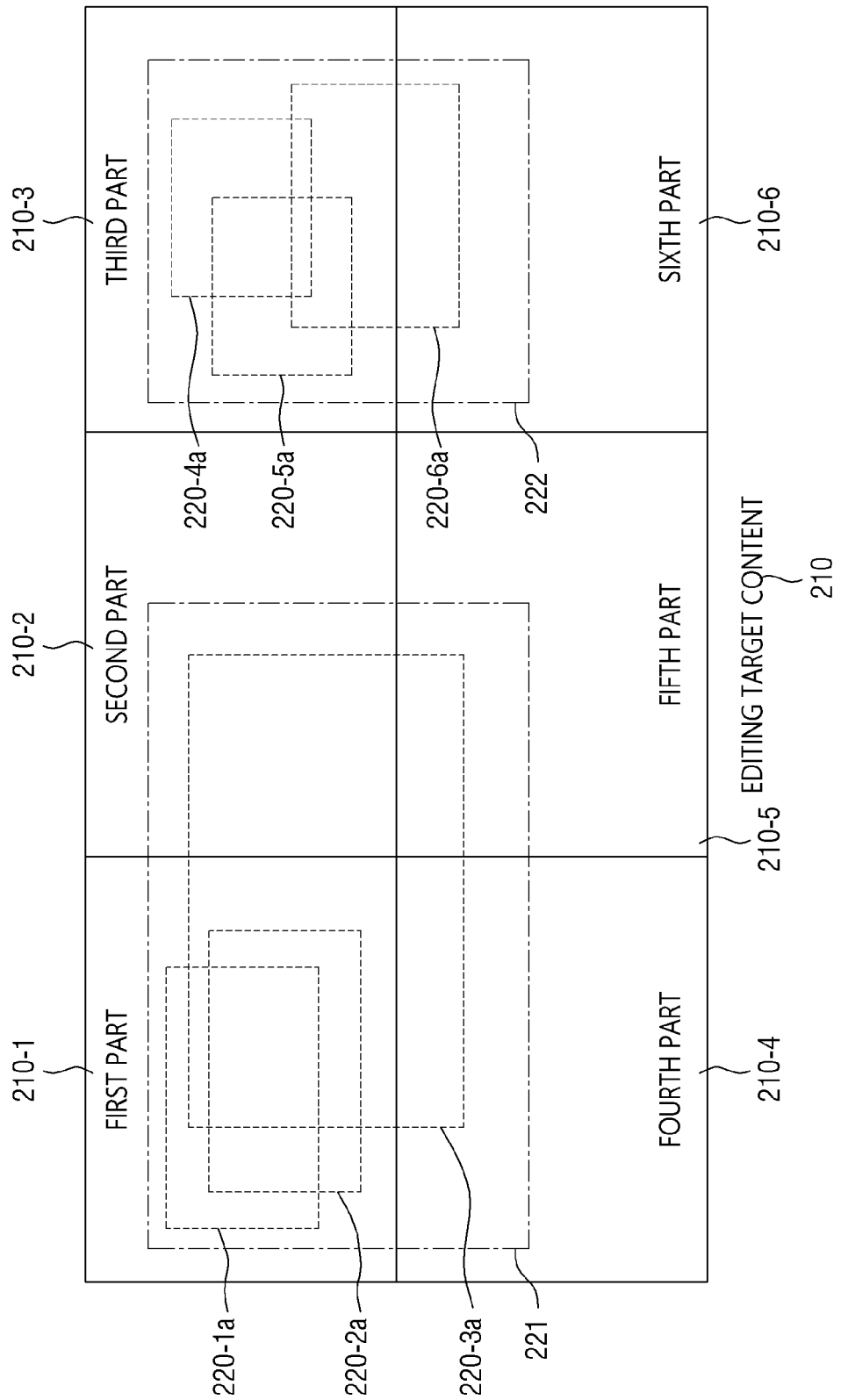
FIG. 14 is a diagram for describing that, in the configuration of a plurality of p2p networks described with reference to FIGS. 12 to 13, editor terminals to be belonging to each p2p network are grouped.

When the exemplary editing target content 210 shown in FIG. 14 is divided into first to sixth parts 210-1, 210-2, 210-3, 210-4, 210-5, and 210-6, the display range 220-1a of the screen of the first editor terminal, the display range 220-2a of the screen of the second editor terminal, and the display range 220-3a of the screen of the third editor terminal all display at least a part of the first part 210-1. This means that there is a possibility that the user of the first editor terminal, the user of the second editor terminal, and the user of the third editor terminal are simultaneously watching a specific part of the editing target content. Accordingly, the service server 230 may group a first editor terminal, a second editor terminal, and a third editor terminal displaying at least a part of the first part 210-1 into the first cluster 221.

Further, since the display range 220-4a of the screen of the fourth editor terminal, the display range 220-5a of the screen of the fifth editor terminal, and the display range 220-6a of the screen of the sixth editor terminal all display at least a part of the third part 210-3, the service server 230 may group a fourth editor terminal, a fifth editor terminal, and a sixth editor terminal displaying at least a part of the third part 210-3 into the second cluster 222.

Figure 15:
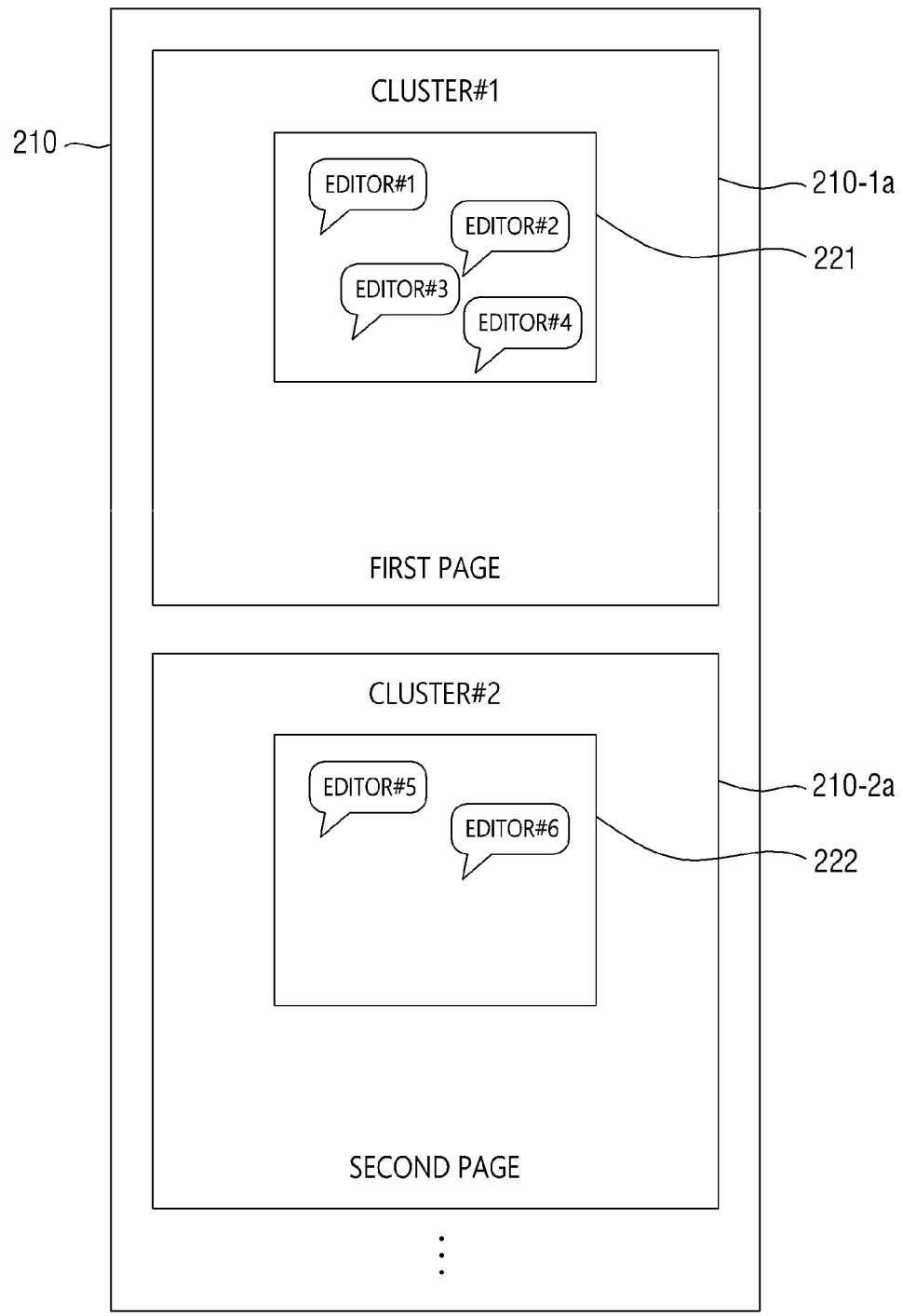
FIGS. 15 to 18 are diagrams for describing various examples of grouping of editor terminals described with reference to FIG. 14.

In FIG. 14, each part of the editing target content 210 is illustrated as being divided so as not to overlap with each other. In this case, the parts may be understood as division units that do not overlap with each other, such as each page of a document and each slide of a presentation material. FIG. 15 illustrates that when the editing target content 210 is a document, the parts are divided to correspond to each page. As a result, the first to fourth editors who are editing the first page 210-1a of the document 210, which is the editing target content, are grouped into the first cluster 221, and the fifth editor and the sixth editor who are editing the second page 210-2a are grouped into a second cluster 222.

Meanwhile, unlike in FIG. 14, each part of the editing target content 210 may be divided to partially overlap with each other. For example, when the editing target content 210 is an online whiteboard, an explicit division line may not exist on the whiteboard. In this case, each part is divided to partially overlap with each other, or a part is not formed in a blank whiteboard area where an object does not exist.

Further, in some embodiments, the service server 230 may dynamically adjust the division setting of each part by reflecting the edit result of the editing target content. For example, when the editing target content 210 is an online whiteboard, the service server 230 may adjust the part division setting according to the object arrangement situation on the whiteboard. For example, the service server 230 may adjust the part division setting to include a predetermined number of objects.

In some embodiments, the service server 230 may perform grouping based on the position of a cursor on the editing target content in each of the editor terminals. The cursor may be a mouse cursor or a last touch point.

Figure 16A:
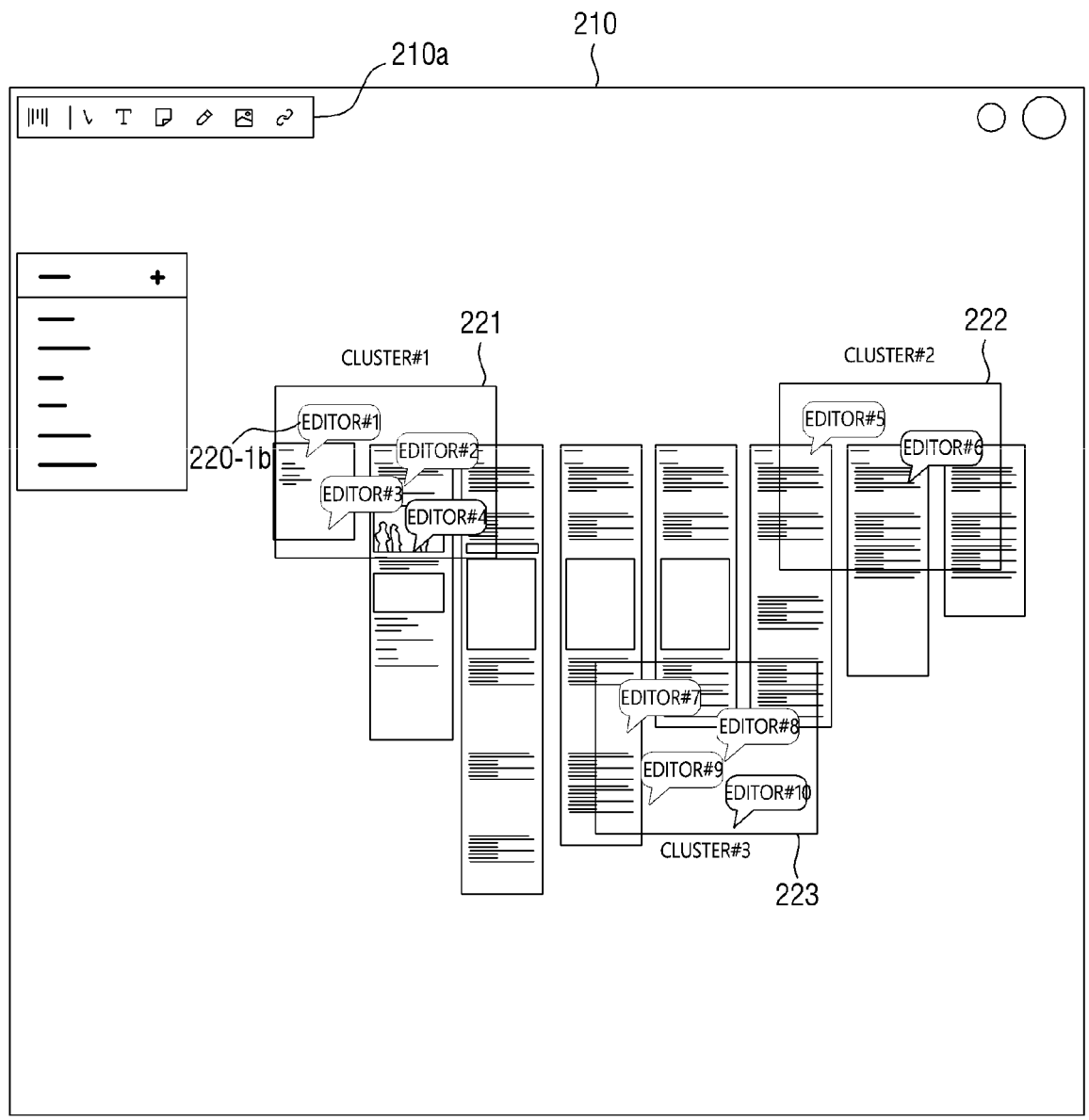

FIG. 16a is a case where the online whiteboard is the editing target content 210, and shows an exemplary result of grouping based on the position of the cursor of each editor terminal. The online whiteboard is a collaborative tool, in which an environment for sharing ideas while writing and attaching notes on a physical whiteboard is brought online. Editors who have been granted the editing authority of the online whiteboard may select a plurality of types of pads from the editing tool 210a, arrange the pads at a desired position on the whiteboard, and edit the contents of the pad. The pad may be understood as an object capable of expressing various types of contents such as text, image, video playback, sound playback, web document link, chat room, bulletin board, and handwriting. The pad may be one parsing document file stored in an external device such as cloud storage, and rendering and displaying the result.

In the situation shown in FIG. 16a, the cursor 220-1b of the first editor is adjacent to the cursor of the second editor, the cursor of the third editor, and the cursor of the fourth editor, and as a result of the grouping, the first to fourth editors belong to the first cluster 221 together. For the same reason, the fifth to sixth editors belong to the second cluster 222, and the seventh to tenth editors belong to the third cluster 223.

In order to perform grouping based on the position of the cursor on the editing target content in each of the editor terminals, the service server 230 may manage information on the position of the cursor of each editor terminal. The information on the cursor position may include an x-axis coordinate and a y-axis coordinate as shown in FIG. 16b. Also, the service server 230 may calculate an Euclidean distance between cursor positions of each editor terminal and perform grouping using the calculated Euclidean distance. FIG. 16b shows that the first to third clusters are configured as a result of the grouping.

The service server 230 manages information on the cursor position of each editor terminal, but may update the cursor position at a predetermined period. In this case, each editor terminal may transmit the cursor position to the service server 230 according to the period, and as a result, excessive network traffic for managing information on the cursor position may be suppressed.

In some embodiments, when the editing target content is a content, in which one or more objects are arranged on a background such as presentation material or an online whiteboard, the service server 230 may group editor terminals that put focuses on the same object or adjacent objects into one cluster. Putting focus on an object may mean selecting the object by clicking or touching the object so that the object can be edited.

Figure 17:
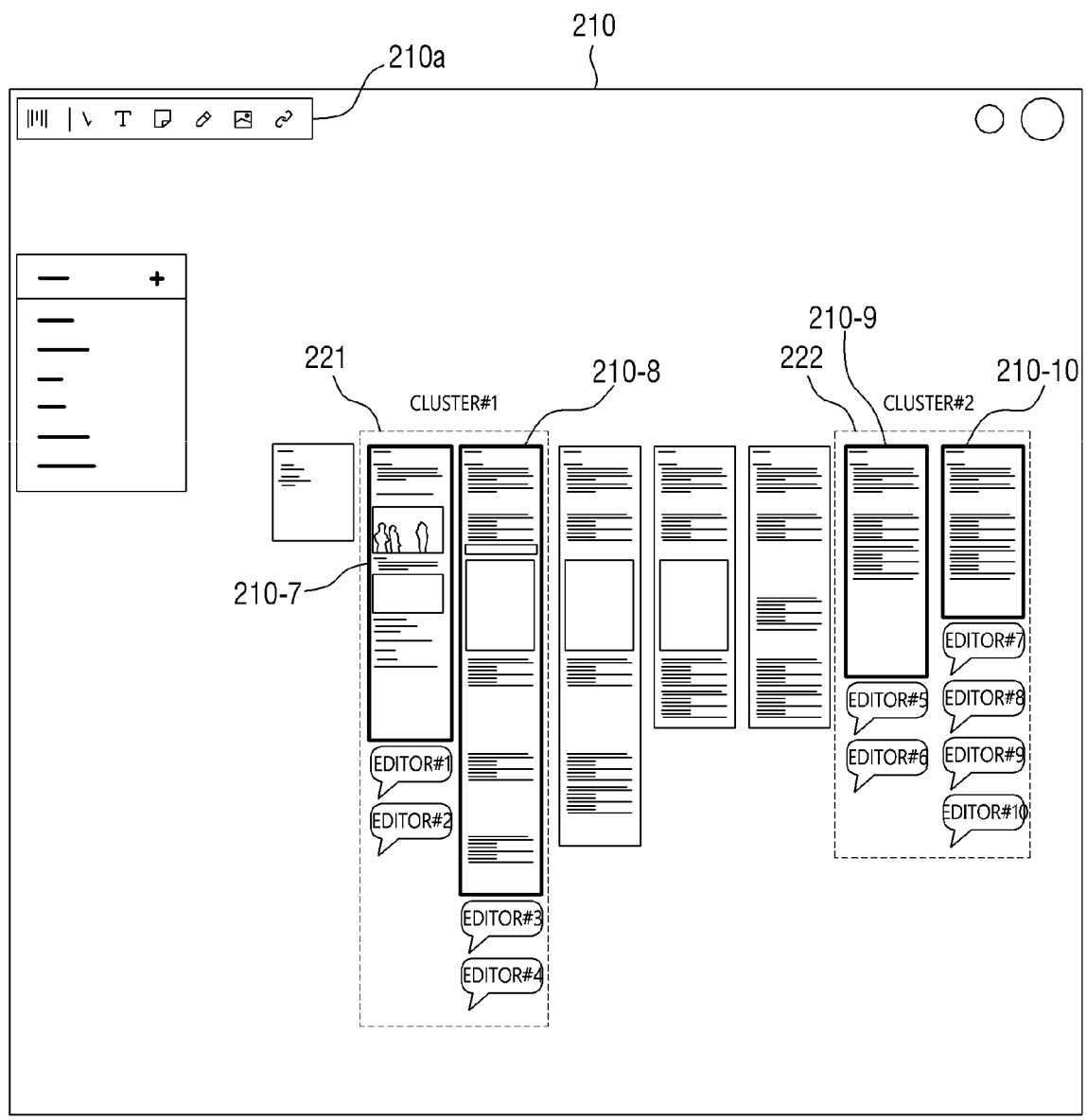

FIG. 17 is an exemplary online whiteboard with a plurality of pads arranged on the whiteboard. It may be understood that the pad corresponds to the above described object. Referring to an exemplary grouping result in the online whiteboard shown in FIG. 17, the first editor terminal and the second editor terminal putting focuses on the first pad 210-7, and the third editor terminal and the fourth editor terminal putting focuses on the second pad 210-8 may belong to the first cluster 221. Since the distance between the first pad 210-7 and the second pad 210-8 on the whiteboard is equal to or less than the reference value, the first pad 210-7 and the second pad 210-8 are determined as being adjacent pads. In addition, the fifth editor terminal and the sixth editor terminal putting focuses on the third pad 210-9, and the seventh editor terminal to the tenth editor terminal putting focuses on the fourth pad 210-10 may belong to the second cluster 221. Since the distance between the third pad 210-9 and the fourth pad 210-10 on the whiteboard is equal to or less than the reference value, the third pad 210-9 and the fourth pad 210-10 are determined as being adjacent pads.

In some embodiments, editor terminals, in which mutual interactions are expressed on the editing target content 210, are considered as strongly requiring the guarantee of real-time property, and can be grouped into one cluster, regardless of whether the same part of the editing target content 210 is displayed. For example, if there are actions such as a second editor posting additional content such as comments on the content written by a first editor, a first editor tagging a second editor, or a first editor referring to a second editor, etc., it may be determined that the interaction between the first editor and the second editor is being expressed on the editing target content 210. An exemplary grouping result according to the present embodiment will be described with reference to FIG. 18.

Figure 18:
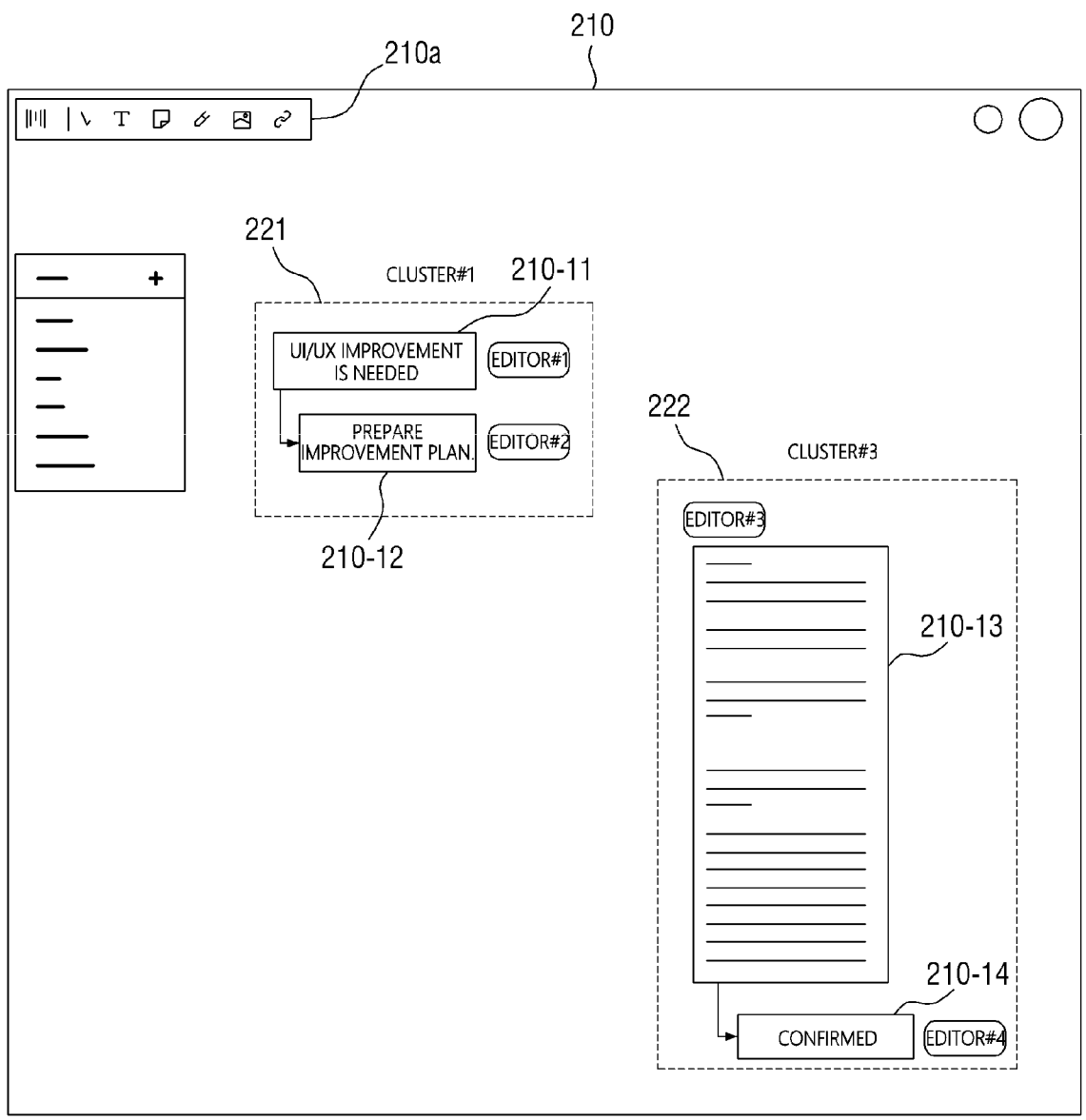

In FIG. 18, the exemplary grouping result that when the second editor connects the text pad 210-12 in the form of comments to the text pad 210-11 written by the first editor, the first editor terminal and the second editor terminal are grouped as belonging to the first cluster 221, and when the fourth editor connects the text pad 210-14 in the form of comments to the web document link pad 210-13 written by the third editor, the third editor terminal and the fourth editor are grouped as belonging to the second cluster 222 is shown.

So far, a method of grouping editor terminals according to some embodiments has been described with reference to FIGS. 14 to 18. Meanwhile, in addition to some embodiments illustrated in FIGS. 14 to 18, various embodiments related to the grouping method may be considered.

For example, if the editing target content is an online whiteboard divided into a plurality of sections and includes a plurality of pads, editor terminals displaying a specific section of the online whiteboard may be grouped into the same cluster. When the screen change is performed on the whiteboard in units of the sections, the fact that different editor terminals display the same section means that users of the editor terminals are viewing the same screen. Accordingly, editor terminals displaying the same section on the online whiteboard may configure one p2p network so that edits are updated in real-time.

Also, for example, editor terminals connected to the same region server may be grouped into one cluster. When editor terminals configuring the content joint editing system are distributed globally, regional servers may be arranged at a plurality of regional bases to provide a smooth service. At this time, if the first editor terminal connected to the European region server and the second editor terminal connected to the Asian region server configure one p2p network, it may take time to transmit and receive p2p packets due to the geographical distance. In consideration of this point, the grouping may be performed so that a p2p network is configured between editor terminals connected to the same region server.

So far, a method of grouping editor terminals according to some embodiments has been described. It may be understood that the grouping is performed to determine a real-time requirement degree between editor terminals of the same editing target content, and to configure the p2p network by editor terminals having a high real-time requirement degree between each other.

The real-time requirement degree between the editor terminals may be a first value that is calculated to increase as the position of the cursor on the editing target content of the editor terminal is closer, a second value that is calculated to increase as the position of the focused object of the editing target content of the editor terminal on the editing target content is closer, or a third value that is calculated to increase as the number of interactions between the editor terminals on the editing target content increases. Further, the real-time requirement degree between the editor terminals may be a value obtained by combining a plurality of the first to third values.

Further, when the editing target content is divided into a plurality of sections, and the screen change is performed in units of the sections, the real-time requirement degree between the editor terminals may be a value that increases as the sections displayed in each editor terminal on the editing target content are adjacent. For example, if the document is the editing target content, the section is a page of the document, and the real-time requirement degree may be calculated in a way that the more the pages displayed by each editor terminal are the same or adjacent, the higher the real-time requirement degree between the editor terminals.

The content joint editing system according to the present embodiment may further include a message queue management device. The configuration and operation of a content joint editing system further including the message queue management device will be described with reference to FIGS. 19a to 21.

As described with reference to FIG. 11, the editor terminal receiving the editor's editing input broadcasts the editing information according to the editing input inside the p2p network. The editor terminal receiving the editing input may broadcast the editing information inside the p2p network and transmit the editing information to the message queue management device 260 as well.

The message queue management device 260 is a computing device that manages a message queue, into which the editing information is sequentially inserted, and may be implemented as a separate physical server with the service server 230, or may be implemented as a separate module implemented through the service server 230 and one physical server.

The message queue management device 260 may insert the editing information sequentially input to the message queue into the database 270. At this time, when the number of editing information inserted in the message queue reaches a reference value, the message queue management device 260 may output a query for inserting the inserted editing information into the database 270 at a time to the database 270 or a query for periodically inserting the inserted editing information into the database 270 to the database 270.

Figure 19A:
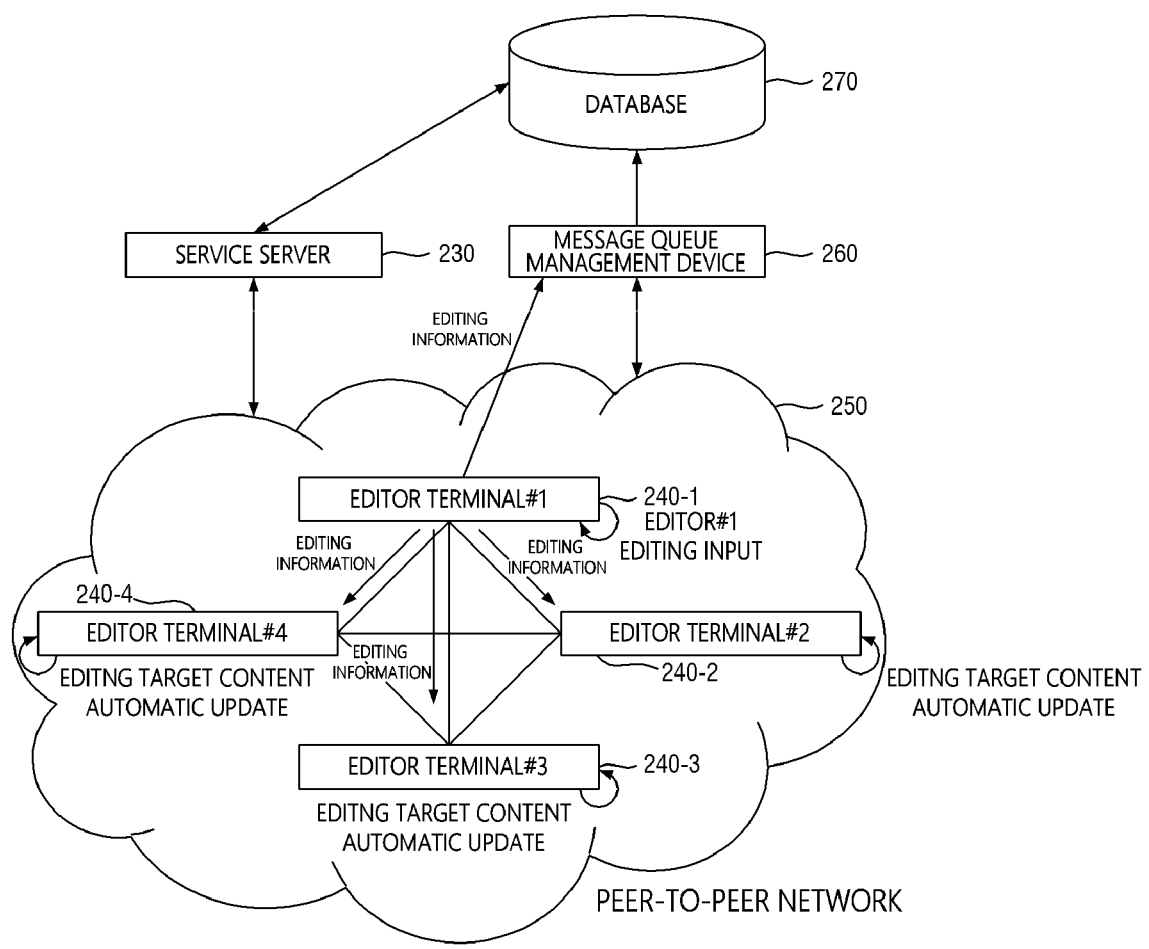
FIGS. 19a to 21 are diagrams for describing some modified configurations of the content joint editing system described with reference to FIG. 2.
Figure 19B:
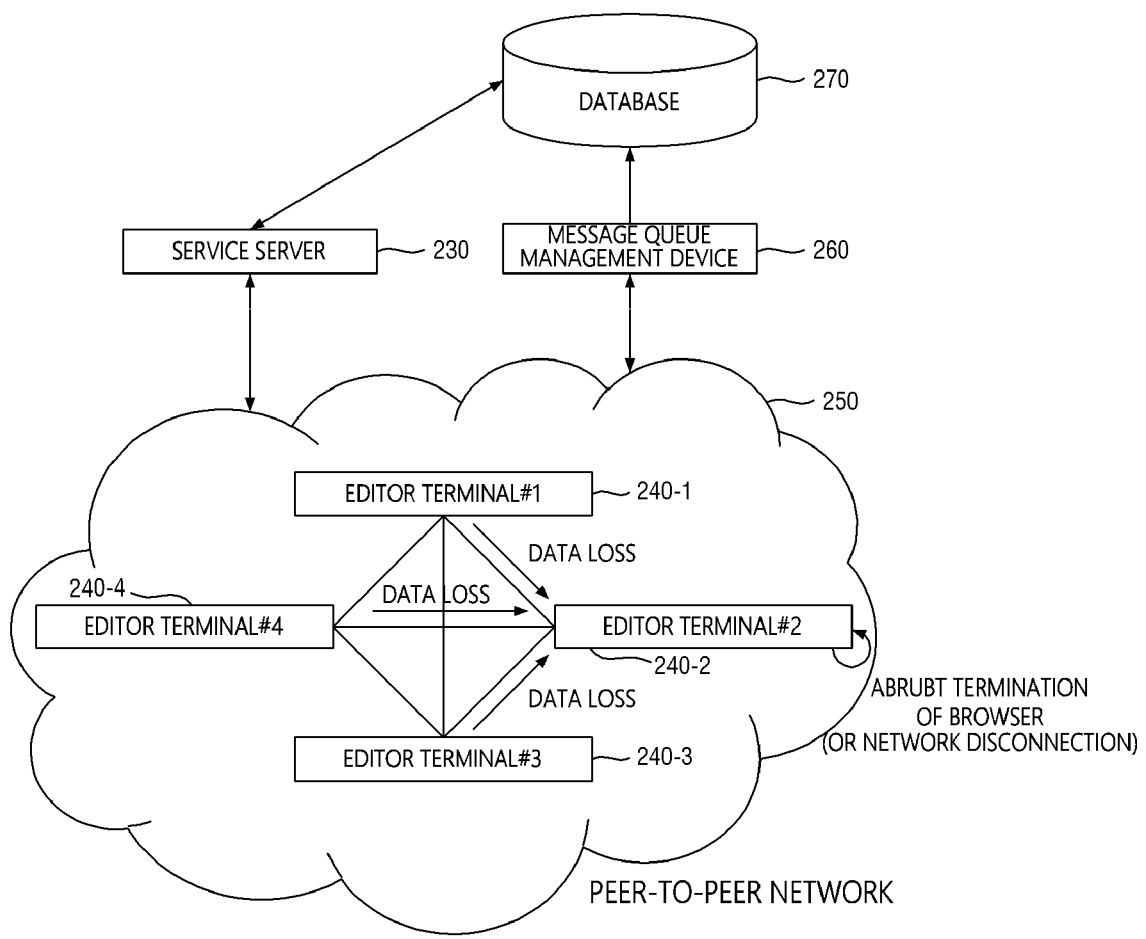
Figure 19C:
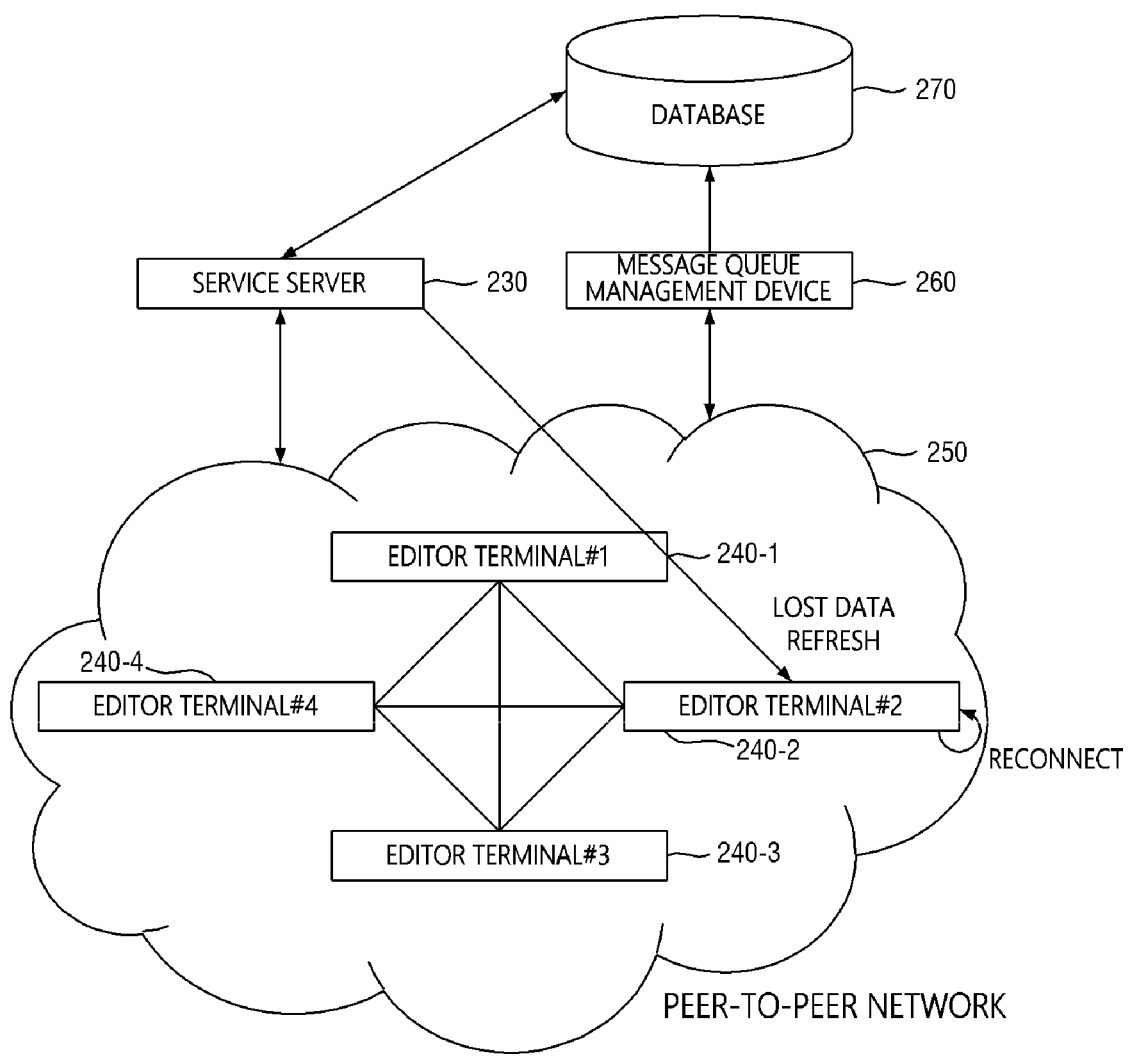
Figure 20:
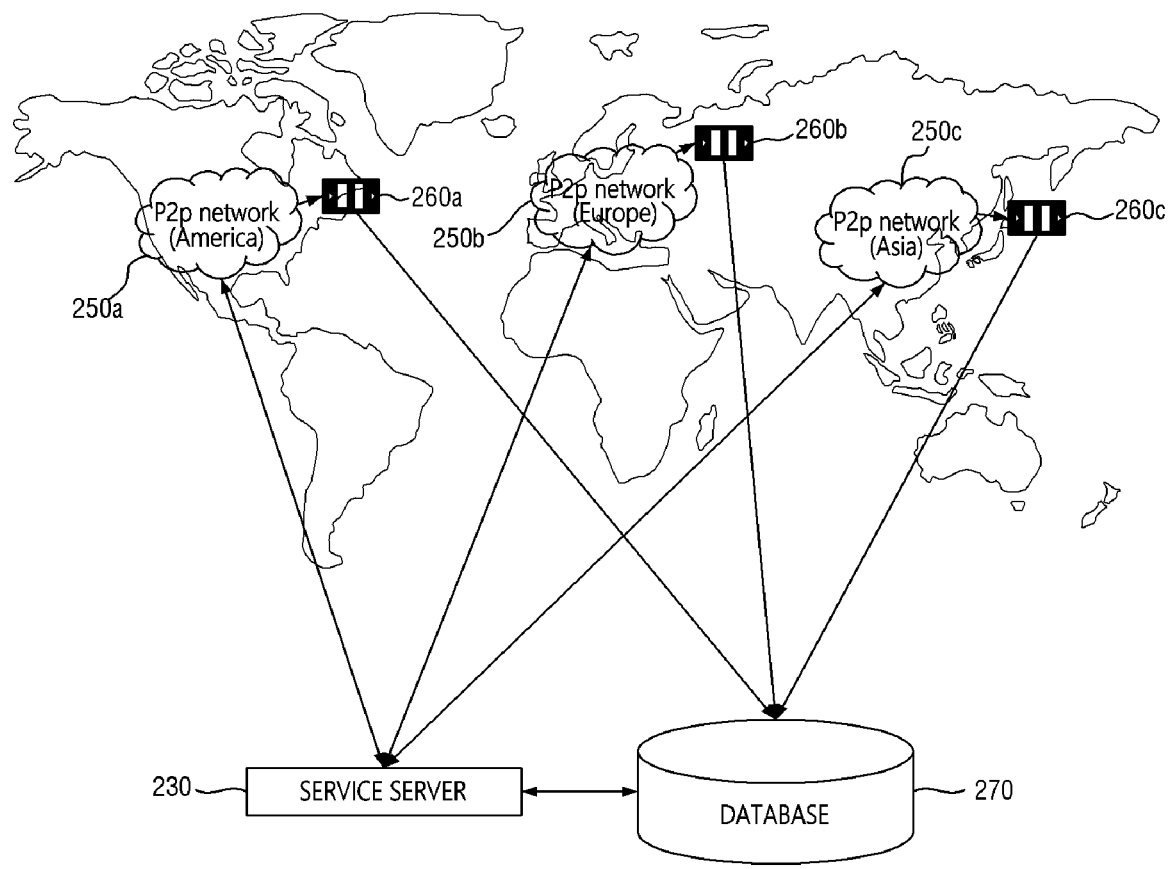

FIG. 19b is a diagram for describing a situation, in which the message queue management device 260 is required. If the editor terminal operates normally, there is little possibility that data transmitted and received directly between the editor terminals is lost. However, if an abnormal termination of the content joint editing application of the editor terminal or disconnection of the network occurs, occurred editing information may be lost until reconnection. The content joint editing application may be a web browser for accessing an online whiteboard service.

For example, as shown in FIG. 19b, when a problem situation occurs in the second editor terminal 240-2 due to a reason such as an abrupt termination of web browser execution, since then, the second editor terminal 240-2 is no longer able to receive the editing information broadcasted by the first editor terminal 240-1, the third editor terminal 240-3, and the fourth editor terminal 240-4. However, the editing information broadcasted by the first editor terminal 240-1, the third editor terminal 240-3, and the fourth editor terminal 240-4 is sequentially stored in the database 270 through the message queue management device 260, and when the second editor terminal 240-2 reconnects to the online whiteboard service, the service server 230 would transmit the lost editing information stored in the database 270 to the second editor terminal 240-2, as a result, the second editor terminal 240-2 will be able to avoid loss of the editing information even if a problem situation occurs.

By the operation of the message queue management server described with reference to FIGS. 19a to 19b, although each editor terminal directly transmits/receives editing information in a p2p manner to share the editing situation of the content in real-time, loss of editing information according to the problem situation can be avoided.

Meanwhile, since each editor terminal of the p2p network needs to transmit the editing information to the message queue management server, if the physical distance between the p2p network and the message queue management server is too far, a latency may occur in transmission of the editing information. In consideration of this, in some embodiments, a plurality of CDN (Contents Delivery Network) message queue management devices 260a, 260b, and 260c may be arranged for each region. Each p2p network may transmit the editing information to the CDN message queue management devices 260a, 260b, and 260c located nearby. The service server may provide information on the nearby CDN message queue management devices 260a, 260b, and 260c to editor terminals of each p2p network.

In some embodiments, even if a plurality of CDN message queue management devices 260a, 260b, and 260c are arranged for each region, only one database 270 may be operated. This is because if a plurality of databases are arranged for each region, overhead may occur for synchronization between each of the databases.

Figure 21:
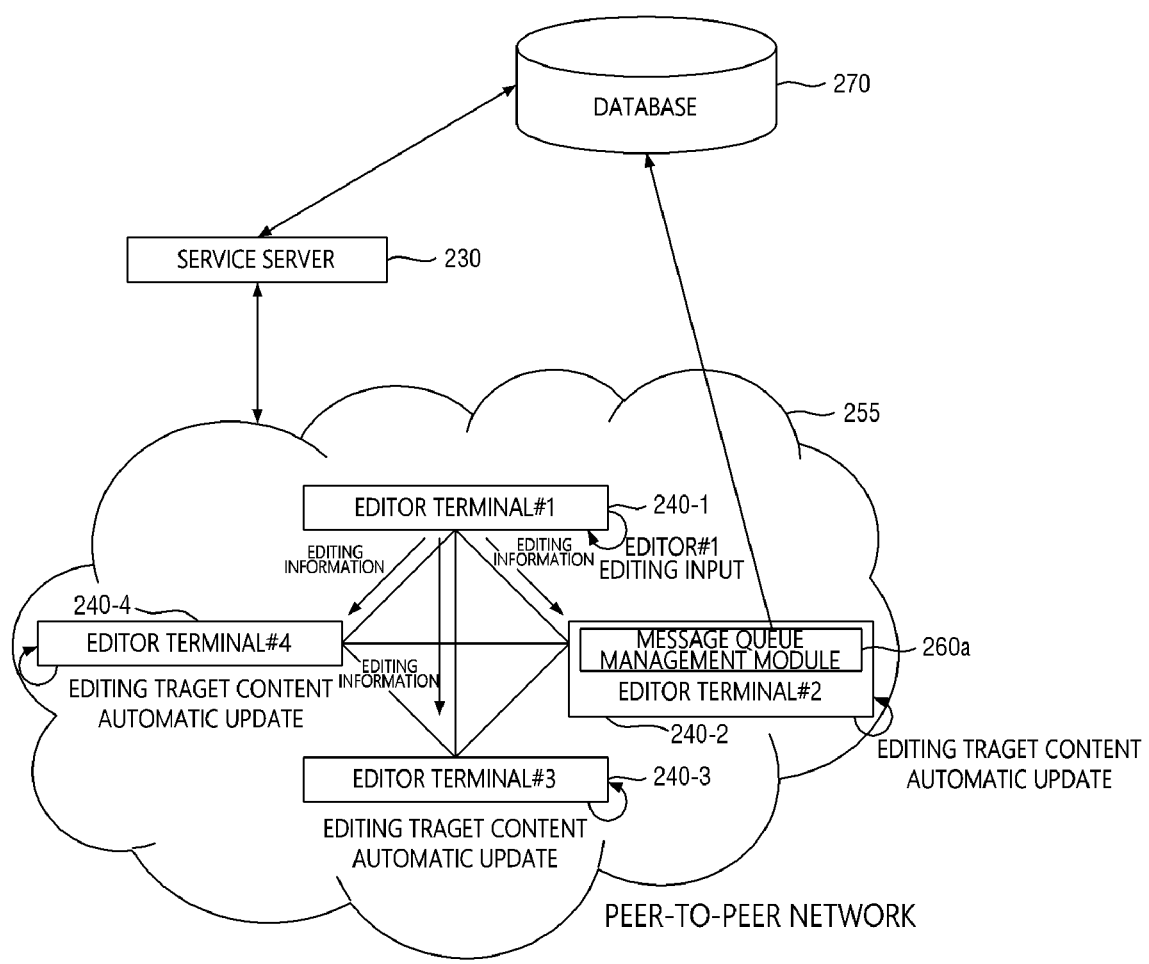

Further, in some embodiments, as shown in FIG. 21, some of the editor terminals belonging to the p2p network may be responsible for the message queue management function that sequentially inserts editing information generated in the p2p network. The number of editor terminals responsible for the message queue management function may be one per p2p network, or may be plural.

In FIG. 21, it is shown that the second editor terminal 240-2 is in charge of the message queue management function. That is, the message queue management module may be installed in the second editor terminal 240-2. The message queue management module may sequentially insert editing information broadcasted from other editor terminals of the p2p network 255 into the message queue and transmit the editing information inserted in the message queue to the database 270.

Among the editor terminals configuring the p2p network, the editor terminal responsible for the message queue management function may be designated by the service server 230 or may be designated by itself through a consensus process between the editor terminals configuring the p2p network.

As shown in FIG. 21, when some of the editor terminals belonging to the p2p network are in charge of the message queue management function, each editor terminal does not need to frequently transmit editing information to an external message queue management device. The editing information is broadcasted inside the p2p network, and among editor terminals belonging to the p2p network, the editor terminal in charge of the message queue management function naturally receives the broadcasted editing information, and thus traffic waste generated during transmission of the editing information to an external message queue management device at the same time as the broadcasting of the editing information inside the p2p network can be suppressed.

Of course, even if some of the editor terminals belonging to the p2p network are in charge of message queue management function, the editing information inserted in the message queue must be transmitted to the database 270, but the editing information inserted in the message queue is transmitted to the database 270 after it is accumulated somewhat, and so the transmission period will not be frequent.

When a plurality of p2p networks for each cluster are configured by the grouping, after the broadcasting of the editing information inside the p2p network, the broadcasting of the editing information to other p2p networks may be performed. At this time, when three or more p2p networks are configured, there is an issue of which p2p network is to be broadcasted first in broadcasting editing information to other p2p networks.

In some embodiments, the service server may determine a real-time requirement degree between each p2p network, and sequential additional broadcasting may be performed from a p2p network having a high real-time requirement degree to a low p2p network.

The real-time requirement degree between p2p networks may be a value determined by using a distance on a screen between display parts of an editor terminal cluster of each p2p network.

Figure 22A:
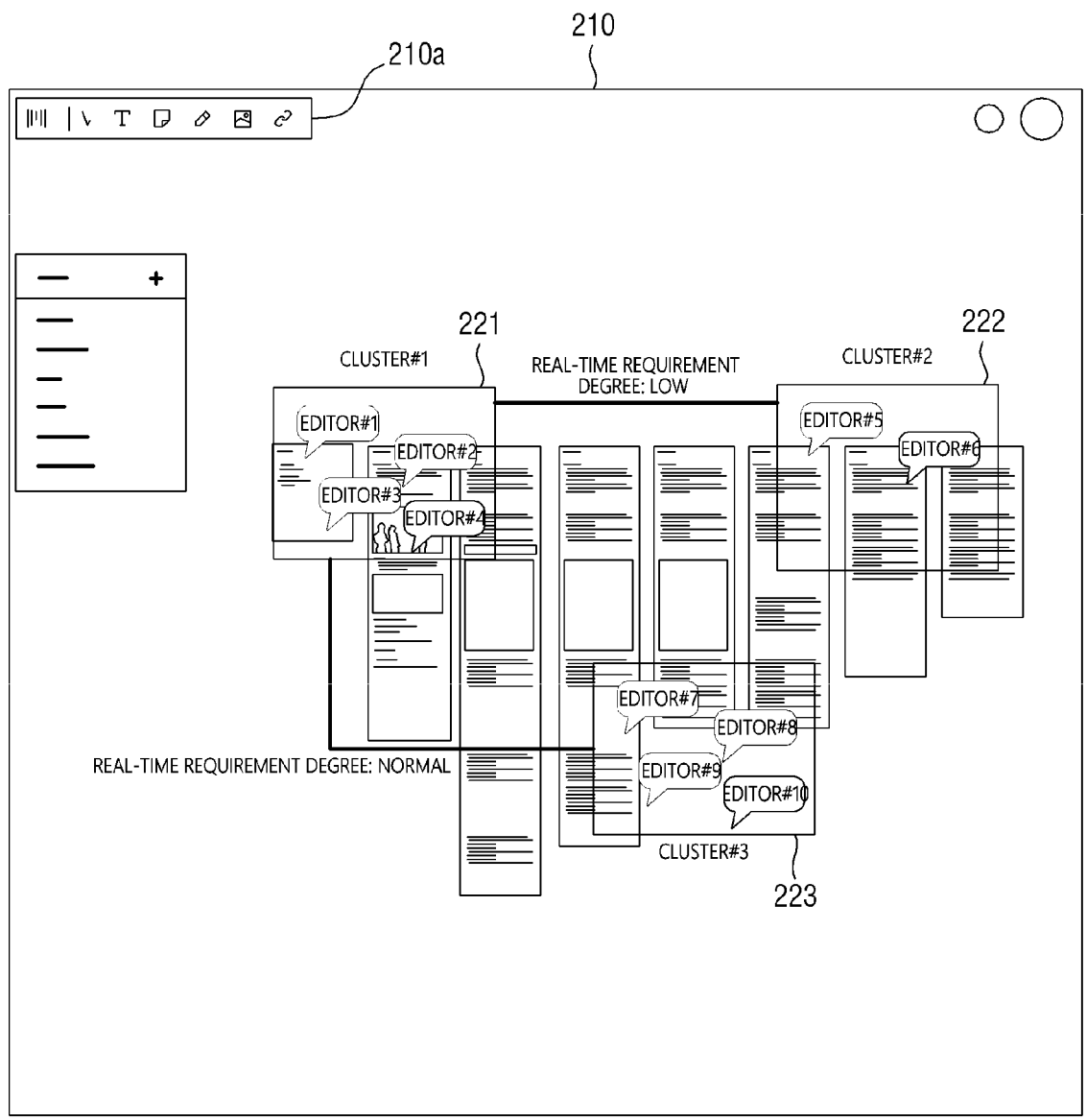
FIGS. 22a to 22c are diagrams for describing an operation, in which edits further broadcasted to another cluster after being broadcasted inside a cluster in the content joint editing system described with reference to FIG. 2.

For example, since the first cluster 221 and the second cluster 222 of FIG. 22a have a relatively long linear distance on the whiteboard, and the first cluster 221 and the third cluster 223 have a relatively short linear distance on the whiteboard, it could be evaluated that the real-time requirement degree between the first cluster 221 and the second cluster 222 is 'low,' and the real-time requirement degree between the first cluster 221 and the third cluster 223 is 'normal.' In this case, the editing information generated by the first editor terminal of the first cluster 221 may be first broadcasted inside the first cluster 221, then to the third cluster 223, and finally to the second cluster 222.

Figure 22B:
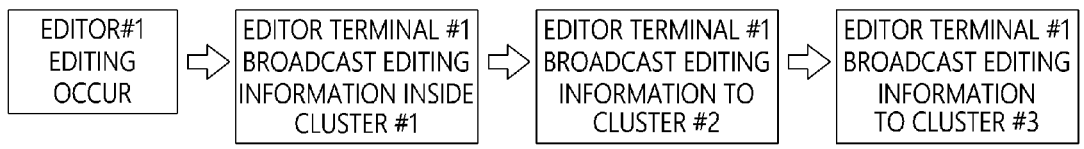
Figure 22C:
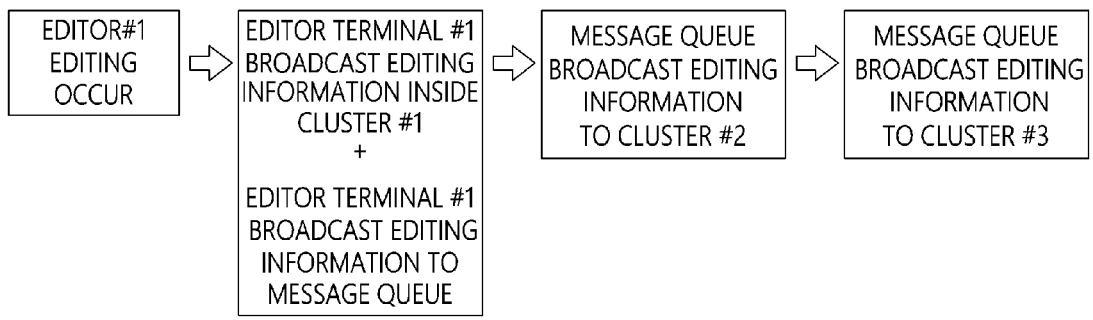

In some embodiments, as shown in FIG. 22b, the first editor terminal may directly broadcast the editing information not only inside the first cluster, but also to the second cluster and the third cluster, and as shown in FIG. 22c, the first editor terminal may perform only the broadcasting of editing information inside the first cluster, and the broadcasting of the editing information to the second cluster and the third cluster may be performed by the message queue management device receiving the editing information from the first editor terminal.

So far, the configuration and operation of the content joint editing system according to an embodiment of the inventive concept has been described with reference to FIGS. 10 to 22c. Hereinafter, a content joint editing method according to another embodiment of the inventive concept will be described with reference to FIGS. 23 to 26. The content joint editing method according to the present embodiment may be performed by a computing device. The content joint editing method according to the present exemplary embodiment may be divided and performed by a plurality of computing devices. Hereinafter, in describing the content joint editing method according to the present embodiment, description of the subject of each operation may be omitted, and in this case, it may be understood that the subject of the operation is a computing device.

Further, technical ideas that can be understood through the embodiments described with reference to FIGS. 10 to 22c can be naturally applied to the content joint editing method according to the present embodiment, even if there is no special mention. Accordingly, matters described with reference to FIGS. 10 to 22c will not be repeated throughout this embodiment.

Figure 23:
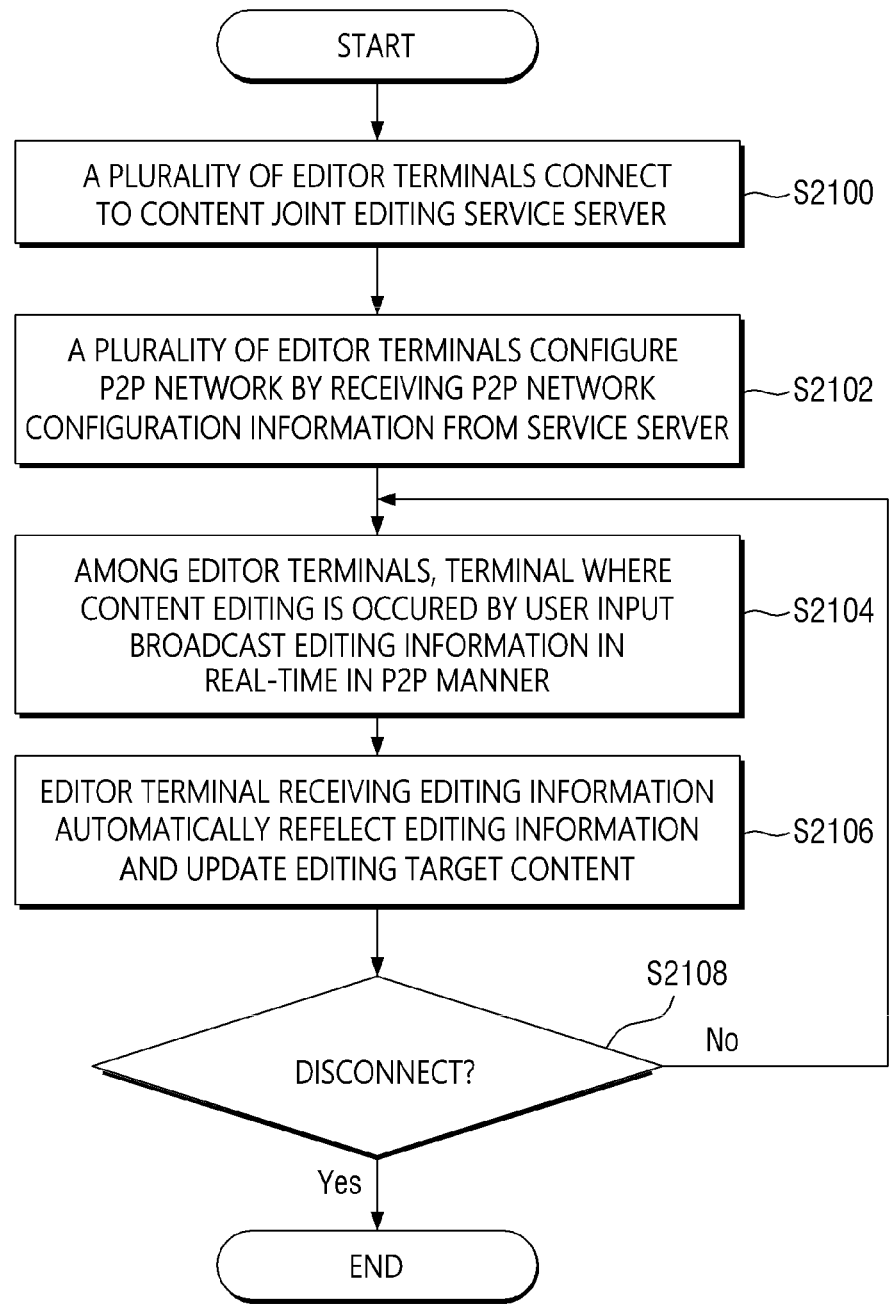
FIG. 23 is a flowchart of a content joint editing method according to another embodiment of the inventive concept.

This will be described with reference to FIG. 23.

In step S2100, a plurality of editor terminals included in the simultaneous editing group of the editing target content access the content joint editing service server. For example, when an idea creation meeting starts using an online whiteboard, in which the editing authority is given to all team members of the first department, all team members of the first department access a web server providing an online whiteboard service using the web browser of the terminal device.

In step S2102, a plurality of editor terminals receive p2p network configuration information from the service server to configure a p2p network. At this time, if the number of editor terminals is less than the reference value, all of the plurality of editor terminals configure one p2p network, and if the number of editor terminals is equal to or more than the reference value, the plurality of editor terminals are grouped, as a result, a plurality of p2p networks may be configured.

In order to configure a plurality of p2p networks, an operation of a service server may be performed. This will be described with reference to FIG. 25.

The service server groups all editor terminals of the editing target content (S2200). The method of grouping may refer to what has been described with reference to FIGS. 14 to 18.

Next, the service server generates p2p network configuration information for each editor terminal cluster configured as a result of the grouping, and transmits the p2p network configuration information of the cluster to editor terminals belonging to the corresponding cluster (S2202).

As already described, the p2p network configuration information of each cluster may be dynamically updated according to a user input to each editor terminal. For example, when a first editor terminal displaying a part corresponding to a first cluster displays a part corresponding to a second cluster according to a users scroll, the first editor terminal need to migrate to the second cluster from the first cluster. Further, as described above, the part division of the online whiteboard may be dynamically updated according to the PAD arrangement. When the service server determines that the p2p network configuration information needs to be dynamically updated (S2204), it performs steps S2200 and S2202 again.

It will be described returning back to FIG. 23. In step S2104, a terminal, in which content editing occurs by a user input, among editor terminals generates editing information, and broadcasts the generated editing information inside the p2p network in a p2p manner. Further, in step S2106, the editor terminal, which has received the editing information as a result of the broadcasting, automatically reflects the editing information to update and display the editing target content. Steps S2104 and S2106 will be repeated until the service server connection of the editor terminal is terminated (S2108). It has already been described that the editing information can be broadcasted inside the p2p network in a p2p manner and then to other p2p networks.

Figure 24:
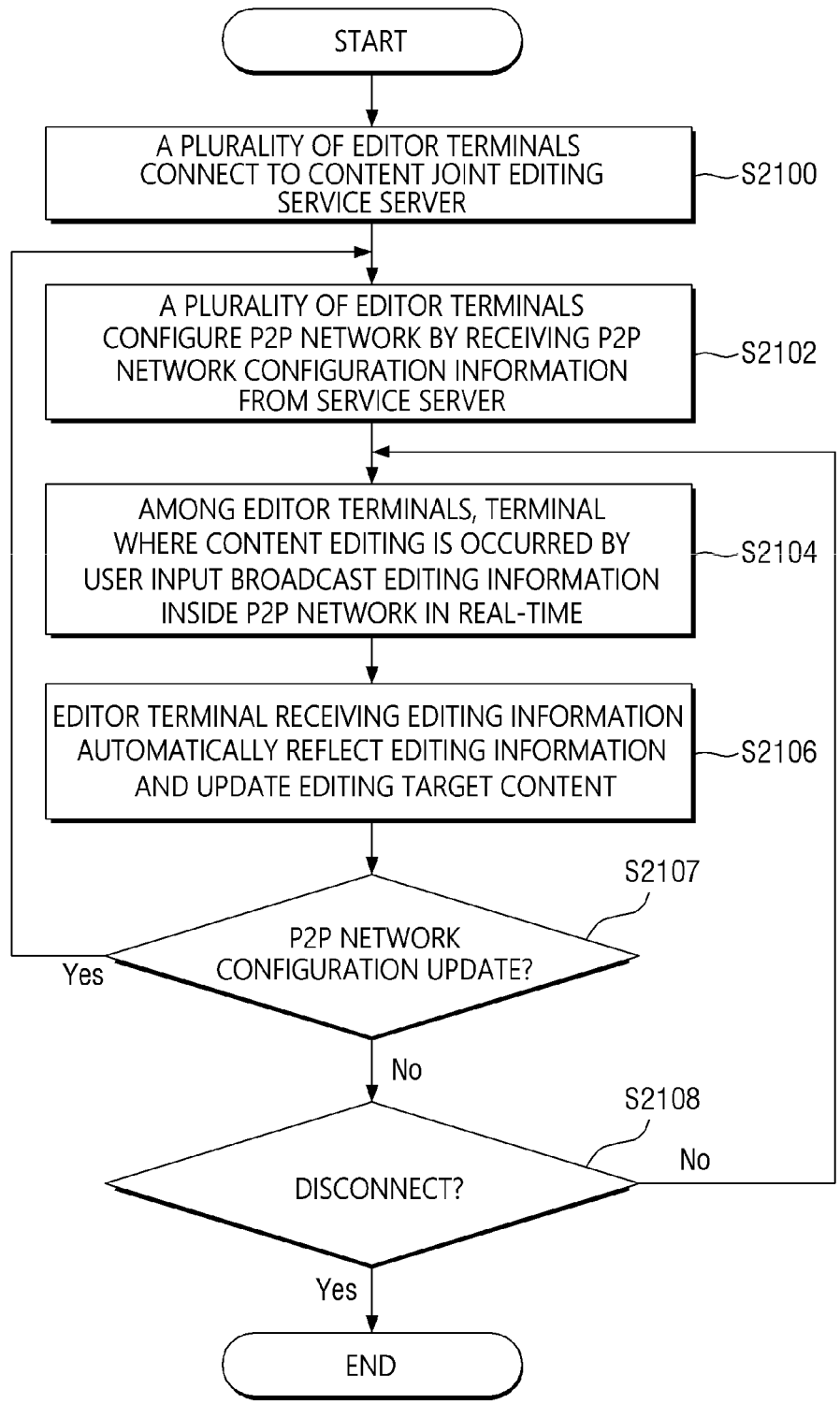
FIG. 24 is another flowchart of the content joint editing method described with reference to FIG. 23.
Figure 25:
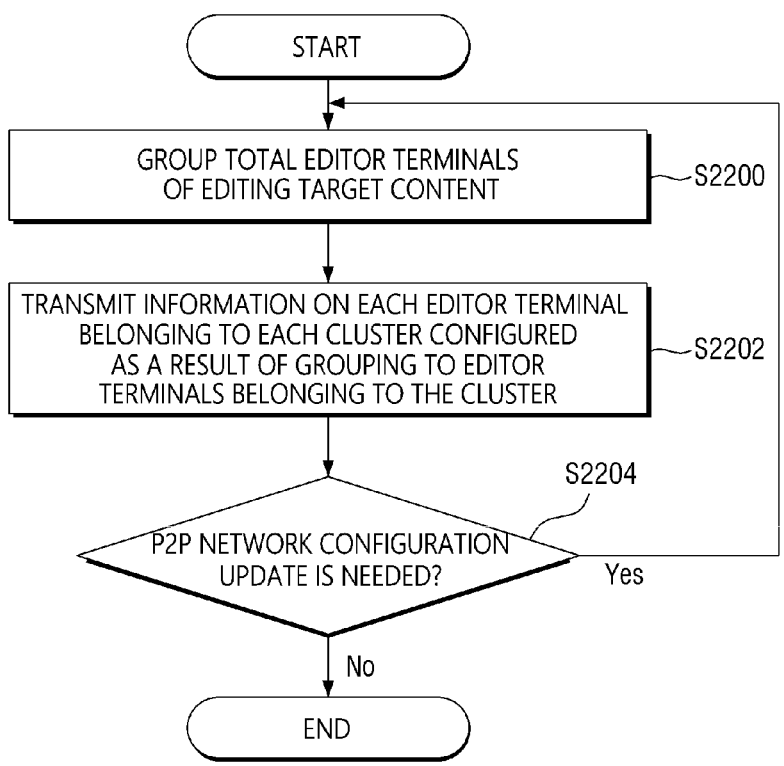
FIG. 25 is a flowchart illustrating an operation that may be performed in the service server side when the content joint editing method described with reference to FIG. 24 is executed.

In some embodiments, the service server may transmit data indicating an update of the p2p network configuration to the editor terminal. At this time, the editor terminal may determine that the p2p network configuration has been updated. As shown in FIG. 24, when the editor terminal detects an update of the p2p network configuration (S2107), steps S2102, S2104, and S2106 may be performed again.

Figure 26:
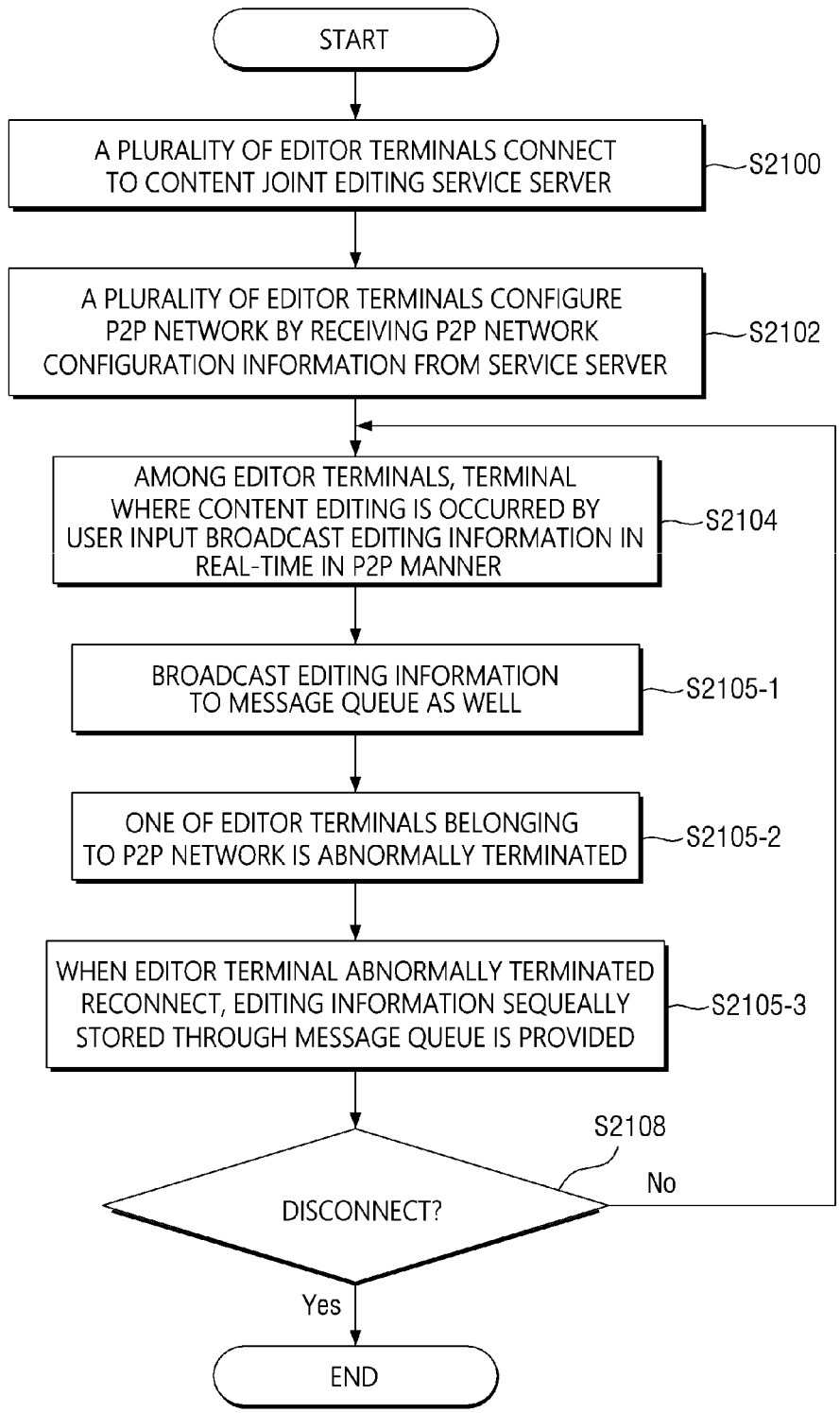
FIG. 26 is another flowchart of the content joint editing method described with reference to FIG. 23.

In some embodiments, even if the editor terminal is abruptly terminated due to occurrence of a problem situation or the like, the message queue may collect the editing information so that a problem of loss of editing information does not occur in the editor terminal. As shown in FIG. 26, in step S2104, a first terminal, in which content editing occurs by a user input, among editor terminals generates the editing information, and broadcasts the editing information inside the p2p network, to which the first terminal belongs, and in step S2105-1, may also broadcast the editing information to the message queue. The message queue may sequentially insert the received editing information and periodically/aperiodically transmit the editing information to the database.

If the network is abnormally disconnected or the content simultaneous editing application is abnormally terminated in the problem terminal among the editor terminals (S2105-2), when the problem terminal reconnects to the service server editing information sequentially stored in the database is automatically provided (S2105-3). Accordingly, even if a problem situation such as network disconnection occurs, loss of editing information can be effectively prevented.

Minimization of App Switching in Content Joint Editing

Hereinafter, in an online collaboration service including joint editing of content, various embodiments related to minimizing the call of an external application (minimizing app switching) even when the editing target content includes embedded content generated in the external application will be described.

Figure 27:
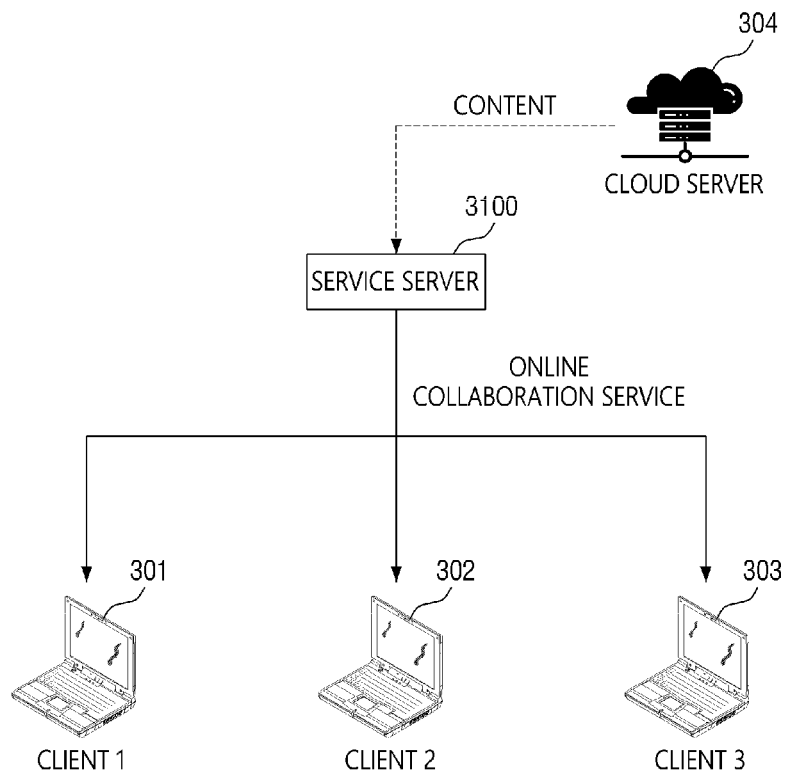
FIG. 27 is a diagram illustrating a system environment of an online collaboration service, to which a content editing method according to the inventive concept is applied.

FIG. 27 is a diagram showing a system environment of an online collaboration service, to which a content editing method according to the inventive concept is applied. Referring to FIG. 27, the system environment 3000 includes a service server 3100 that provides an online collaboration service, a plurality of clients 301, 302, and 303 that share and edit a content through the service server 3100, and a cloud server 304 that downloads a content to the service server 3100 or is uploaded a content from the service server 3100 through the API communication.

The service server 3100 provides a collaboration space (or workplace) for a plurality of clients 301, 302, and 303, and loads various contents on the collaboration space. In this case, the content loaded in the collaboration space may be content downloaded from the cloud server 34 by the service server 3100.

The loaded content may be content in various data formats. For example, the content may be an MS-Word file, an image file, an Excel file, or an MPEG file. In this case, in order to load content in general, it is necessary to call an external application dedicated to reading the content (for example, an Excel program is called to load an Excel format content). However, if a dedicated external application is executed each time each content is loaded, there is a problem that the amount of computation of the service server 3100 increases and system resources are consumed. This problem is further maximized as the number of contents simultaneously loaded in the collaboration space increases.

In order to avoid this, the service server 3100 converts and loads each content into a specific data format for use in a collaborative space when loading a content. For example, the service server 3100 converts contents of various data formats (e.g., *.docx. *.jpg, *.xlsx, or *.mpg) into json (JavaScript Object Notation) format first. After that, it is loaded onto the collaboration space. According to this, since each content is converted into a single data format (here, json) that can be read and edited in a collaborative space, contents of various data formats can be loaded without calling a separate external program, and each content can be conveniently edited using a dedicated editor tailored to the single data format. Then, the loaded contents are broadcasted to a plurality of clients 301, 302, and 303.

Each of the clients 301, 302, 303 displays the contents broadcasted by the service server 3100 to the user, and transmits the contents to the service server 3100 when the user edits the content.

The service server 3100 receives the user's editing actions from each of the clients 301, 302, and 303, reflects them in the content in the json format in real-time, and then broadcasts the result back to each of the clients 301, 302, and 303. And, when all editing of the content is completed, the content in json format is converted to the original data format (for example, *.docx, *.jpg, *.xlsx, or *.mpg, etc.) in order to reflect the editing contents to the original content stored in the cloud server 304, and then updated to the cloud server 304 through API communication.

According to the online collaboration service according to the inventive concept described above, contents of various data formats can be shared and edited without calling a separate external application, and since individual editing of the contents is reflected in json format data and the API communication is called only when the editing contents is finally reflected in the original content of the cloud server 304, the API transaction for the cloud server can be minimized.

Hereinafter, various embodiments according to the inventive concept will be described in detail with reference to each drawing.

Figure 28:
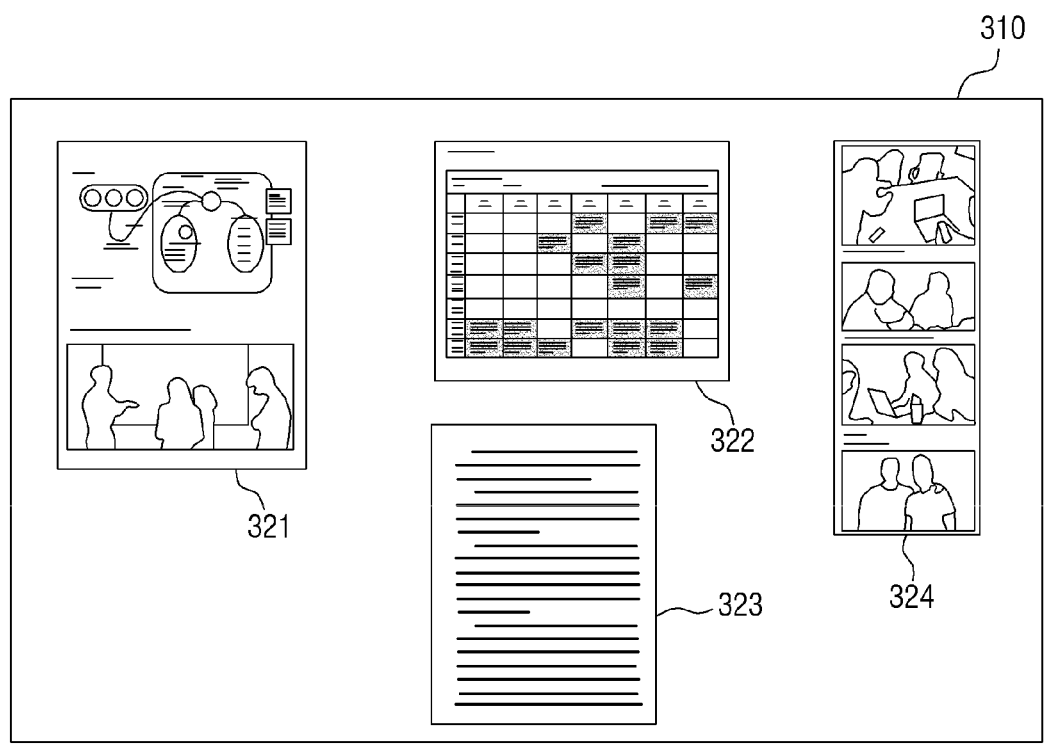
FIG. 28 is a diagram illustrating an exemplary form of an online collaboration service provided through the system environment shown in FIG. 27.

FIG. 28 is a diagram illustrating an exemplary form of an online collaboration service provided through the system environment 3000 shown in FIG. 27. FIG. 28 shows a board as an exemplary form of a collaboration space shared by a plurality of clients.

The board 310 is a collaboration space provided by the service server 3100. Various contents such as presentation contents 321, diagram contents 322, text contents 323, or image contents 324 may be displayed together on the board 310, and contents displayed on the board 310, 321, 322, 323, and 324 are contents converted to a single data format (e.g., json) that can be read and edited by the board 310 as described above.

Similar to the case of FIG. 27, the service server 3100 broadcasts the contents 321, 322, 323, and 324 displayed on the board 310 to the clients 301, 302, and 303, and after receiving the editing action for each content 321, 322, 323, 324 from the client 301, 302, 303, reflects and broadcasts it back to each client 301, 302, 303. And, when all the editing of the contents 321, 322, 323, 324 is completed, each contents 321, 322, 323, 324 are converted to the original data format and then updated to the remote cloud server 304.

Figure 29:
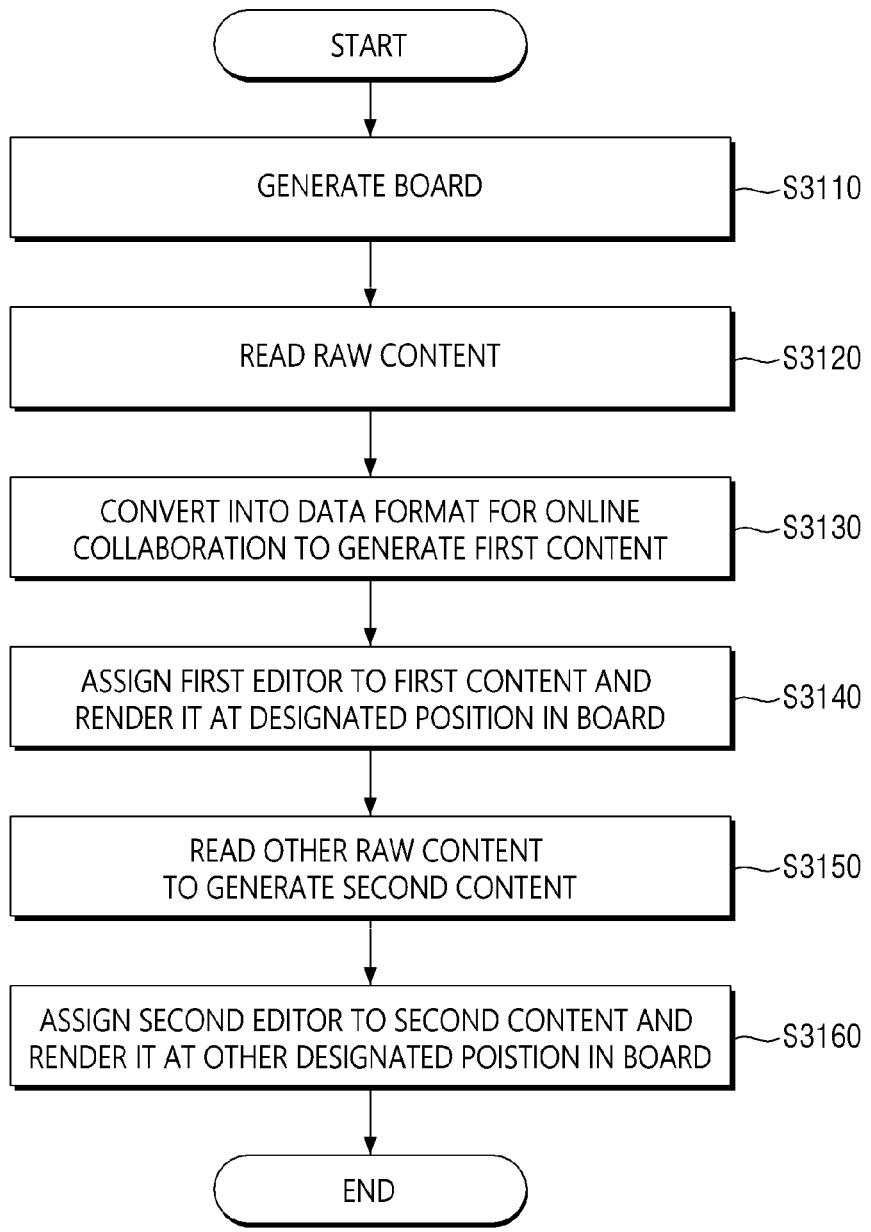
FIG. 29 is a flowchart illustratively describing a method of reading a raw content and displaying it on a board in order to perform a content editing method according to an embodiment of the inventive concept.

In FIG. 29, specific steps for the service server 3100 to load contents onto the board 310 are described. It will be described below with reference to the drawings.

In step S3110, the service server 3100 first generates a board 310, into which the content is to be loaded.

In step S3120, the service server 3100 reads a raw content to be displayed on the board 310. The raw content is a content in a data format (for example, *.docx, *.jpg, *.xlsx, or *.mpg, etc.) that can be driven by an external application program, and may be a content downloaded from the cloud server 304 or a content stored by the service server 3100 in the storage.

In step S3130, the service server 3100 converts the read raw content into a first data format suitable for online collaboration to generate the first content 321 (see FIG. 2). In this case, the first data format is a data format that can be directly read and edited on the board 310 (or a collaboration space), and may be, for example, the json format.

In step S3140, the service server 3100 allocates a first editor to the generated first content 321 and renders the first content 321 at a designated position in the board 310. Here, the first editor means a software module having an editing function for editing the first content 321.

Up to this point, when loading of the first content 321 is completed, the service server 3100 then loads the second content 322 onto the board 310.

Specifically, in step S3150, the service server 3100 generates second content by reading other raw contents.

Similar to those described in steps S3120 to S3130 above, the other raw content is a content in a data format that can be driven by an external application program, and may be a content downloaded from the cloud server 34 or a content stored by the service server 3100 in a storage. The second content may be a content obtained by converting the other raw content into a first data format.

In step S3160, the service server 3100 allocates a second editor to the generated second content 322, and renders the second content 322 at the designated position in the board 310. In this case, it is preferable that the service server 3100 renders the second content 322 in a position that does not overlap with the first content 321, but is not limited thereto. Similar to the first editor, the second editor means a software module having the editing function for editing the second content 322.

In this way, the service server 3100 can load the first content 321 and the second content 322 on the board 310, and in a similar way, can additionally load the other contents 323 and 324 onto the board 310.

Figure 30:
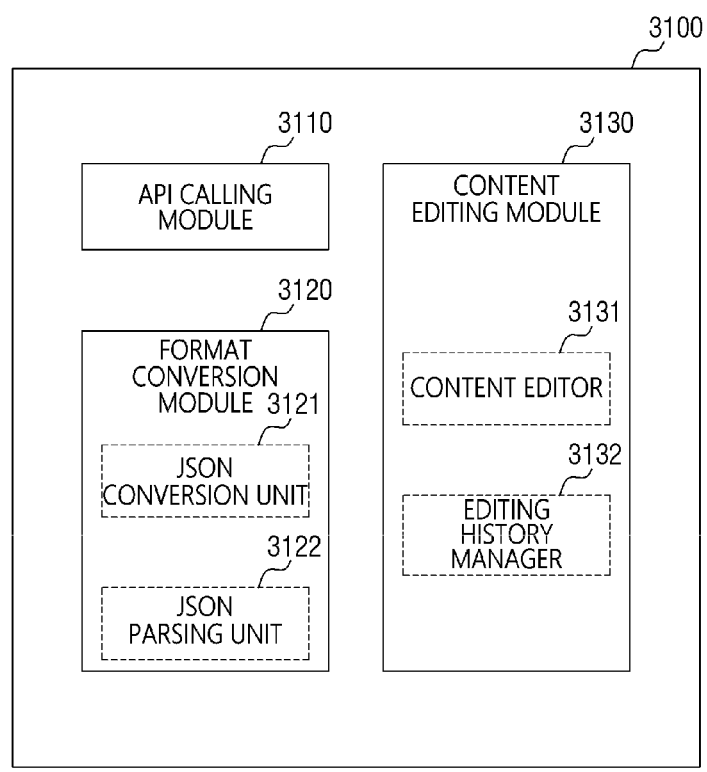
FIG. 30 is a block diagram illustrating an exemplary configuration of a service server for performing the method of FIG. 29.

FIG. 30 is a block diagram illustrating an exemplary configuration of a service server 3100 for performing the method of FIG. 29. Referring to FIG. 30, the service server 3100 may include an API calling module 3110, a format conversion module 3120, and a content editing module 3130.

The API calling module 3110 is a module that calls an API for generating a content to be displayed on the board 310. The service server 3100 reads a raw content corresponding to the content to be displayed using the called API.

The format conversion module 3120 is a module that converts a raw content read through an API into a first data format that can be directly read and edited on the board 310. In this case, it is assumed that the first data format is a json format.

To this end, the format conversion module 3120 may include the json parsing unit 3122, which analyzes the data code of the raw content to find the corresponding json code, and the json conversion unit 3121 that converts the raw content into the json format content by combining the json codes parsed by the json parsing unit 3122.

The content editing module 3130 is a module that edits the contents 321, 322, 323 and 324 loaded on the board 310. The content editing module 3130 includes a content editor 3131 that is assigned to each content 321, 322, 323, 324 and performs individual editing functions for the content 321, 322, 323, 324, and an editing history manager 3132 that manages the editing history performed on each content 321, 322, 323, and 324.

As an embodiment, it may be assigned one-to-one to each content 321, 322, 323, 324, and when the content 321, 322, 323, 324 is loaded on the board 310, may be individually generated and assigned to each content 321, 322, 323, 324, and then released and deleted from each content 321, 322, 323, 324 when the content 321, 322, 323, 324 is unloaded.

The service server 3100 may edit each of the contents 321, 322, 323, 324 loaded on the board 310 through the content editing module 3130, and individually manage the editing history of each of the contents 321, 322, 323, 324, and independently cancel or redo edits performed on each content 321, 322, 323, and 324. In this regard, it will be described in more detail with reference to FIG. 31.

Figure 31:
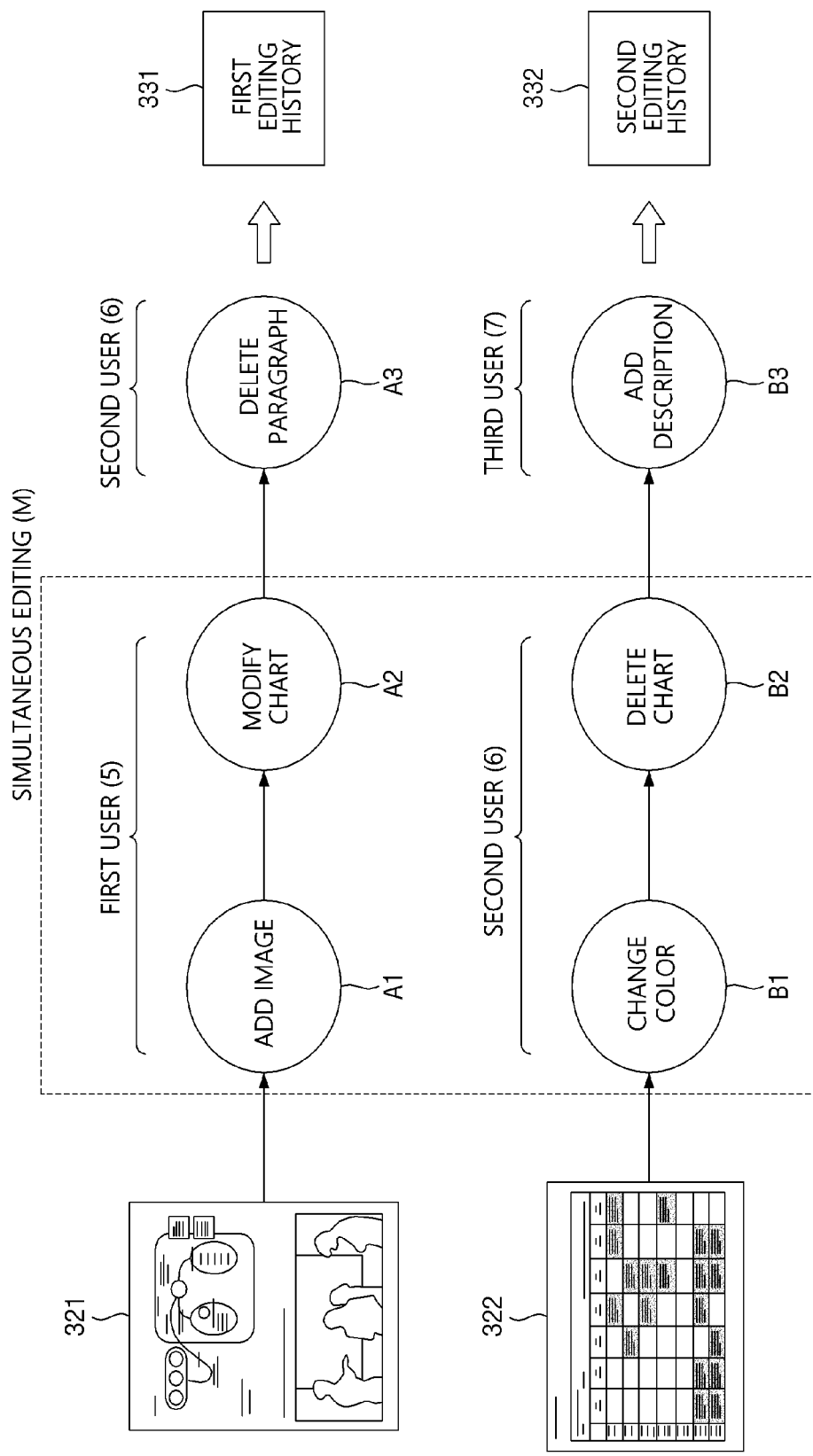
FIG. 31 is a conceptual diagram illustrating an exemplary application case of a content editing method according to an embodiment of the inventive concept, and a diagram describing a method, in which multiple users independently and simultaneously edit a plurality of contents displayed on a board.

FIG. 31 is a conceptual diagram illustrating an exemplary application case of a content editing method according to an embodiment of the inventive concept, and is a diagram for describing a method, in which multiple users independently and simultaneously edit a plurality of contents 321 and 322 displayed on the board 310 through the service server 3100.

Referring to FIG. 31, an embodiment, in which a series of editing is performed on the first content 321 and the second content 322 loaded on the board 310 and the editing history is stored, is illustrated.

First, looking at an editing method for the first content 321, multiple users 305 and 306 may jointly edit the first content 321. Specifically, after the first user 305 adds an image to the first content 321 (A1) and performs the editing to modify the table (A2), the second user 306 may perform the editing to delete paragraphs in the first content 321 (A3). The editing order of the first user 305 and the second user 306 for the first content 321 may be determined according to which user first inputs his or her editing action. For example, in the embodiment of FIG. 31, since the first user 305 inputs edits A1, A2 for the first content 321 before the second user 306, after the edits A1 and A2 of the first user 305 are reflected in the first content 321, the edit A3 of the second user 306 is additionally reflected thereon.

Meanwhile, the history of the series of edits A1, A2, and A3 made on the first content 321 is stored and managed as the first editing history 331. The first editing history 331 may be referred to display the progress and details of edits made on the first content 321 to the user, or may be used to cancel or redo edits made on the first content 321.

For example, when an edit cancel command (e.g., Ctrl+Z) is input to the first content 321, the service server 3100 may sequentially cancel staring from the most recently performed editing action among editing actions in the first editing history 331. That is, when a series of edits A1. A2, A3 are sequentially performed on the first content 321, the most recent edit A3 is canceled and the deleted paragraph is restored when the edit cancel command is input once, and if the edit cancel command is input again, the previous edit A2 is canceled and the modified chart is restored to the state before the modification. If the edit cancel command is input again, the first edit A1 is canceled and the added image is deleted.

Similarly, the first editing history 331 can also be used to redo the canceled edit. For example, when an edit cancel command (e.g., Ctrl+Z) is input once for the first content 321, the service server 3100 may sequentially redo from a recently canceled edit among the editing actions in the first editing history 331. That is, when the most recent edit A3 is canceled through an edit cancel command for the first content 321, the canceled edit A3 is redone when an edit redo command (e.g., Ctrl+Y) is input.

The editing method for the second content 322 is similarly performed. Multiple users 306 and 307 also may jointly edit the second content 322. Specifically, after the second user 306 performs the editing to change the color (B1) and delete the table (B2) for the second content 321, the third user 307 may perform the editing to add a description to the content 322 (B3).

In this case, the editing A1, A2 of the first content 321 and the editing B1, B2 of the second content 322 may be simultaneously performed in parallel. That is, as described in FIGS. 29 and 30 above, since a separate editor is allocated for each content 321 and 322, the second user 306 may performs the editing B1, B2 on the second content 322 at the same time when the first user 305 perform the editing A1, A2 on the first content 321.

The history of the series of edits B1, B2, B3 made on the second content 322 is stored and managed as a second editing history 332. The second editing history 332 may be referred to display the progress and details of edits made on the second content 322 to the user, or may be used to cancel or redo edits made on the second content 322.

As an embodiment, each editing history 331 and 332 may exclusively store only the editing history of the corresponding content. For example, only the history of edits made on the first content 321 is stored in the first editing history 331, and the history of edits made on the other content 322 may not be stored. Similarly, only the history of edits made on the second content 322 is stored in the second editing history 332, and the history of edits made on the other content 321 may not be stored. In this way, if only the editing history of the specific content 321, 322 is exclusively stored in each editing history 331, 32, when editing for a certain content 321 is canceled or redone, it is possible to avoid affecting the editing state of other content 322 therefrom.

For example, it is assumed that the editing history of the first content 321 and the second content 322 is managed as one editing history. At this time, if an attempt is made to cancel two edits A2. A3 on the first content 321 through an edit cancel command, the last edit B3 made on the second content 322 inevitably must be canceled. That is, since the last edit B3 of the second content 322 occurred temporally later than the second edit A2 of the first content 321, if it is sequentially canceled from the most recent edit according to the editing history, the last edit B3 of the second content 322 is also canceled in the process of canceling the second edit A2 of the first content 321.

On the other hand, according to the embodiment described above, since only the history of the editing A1, A2, A3 of the first content 321 is stored in the first editing history 331, if the edit cancel command is performed using the first editing history 331, the editing A1, A2, A3 of the first content 321 may be sequentially canceled without affecting the editing state of the second content 322. Similarly, if the editing histories 331 and 332 are individually managed for each of the contents 321 and 322, even when the editing for the first content 321 is redone using the first editing history 331, the editing state of other contents 322 may not be affected.

On the other hand, as an embodiment, each of the editing histories 331 and 332 may be displayed on the board 310 in association with the corresponding contents 321 and 322. This will be described in detail with reference to FIG. 32.

Figure 32:
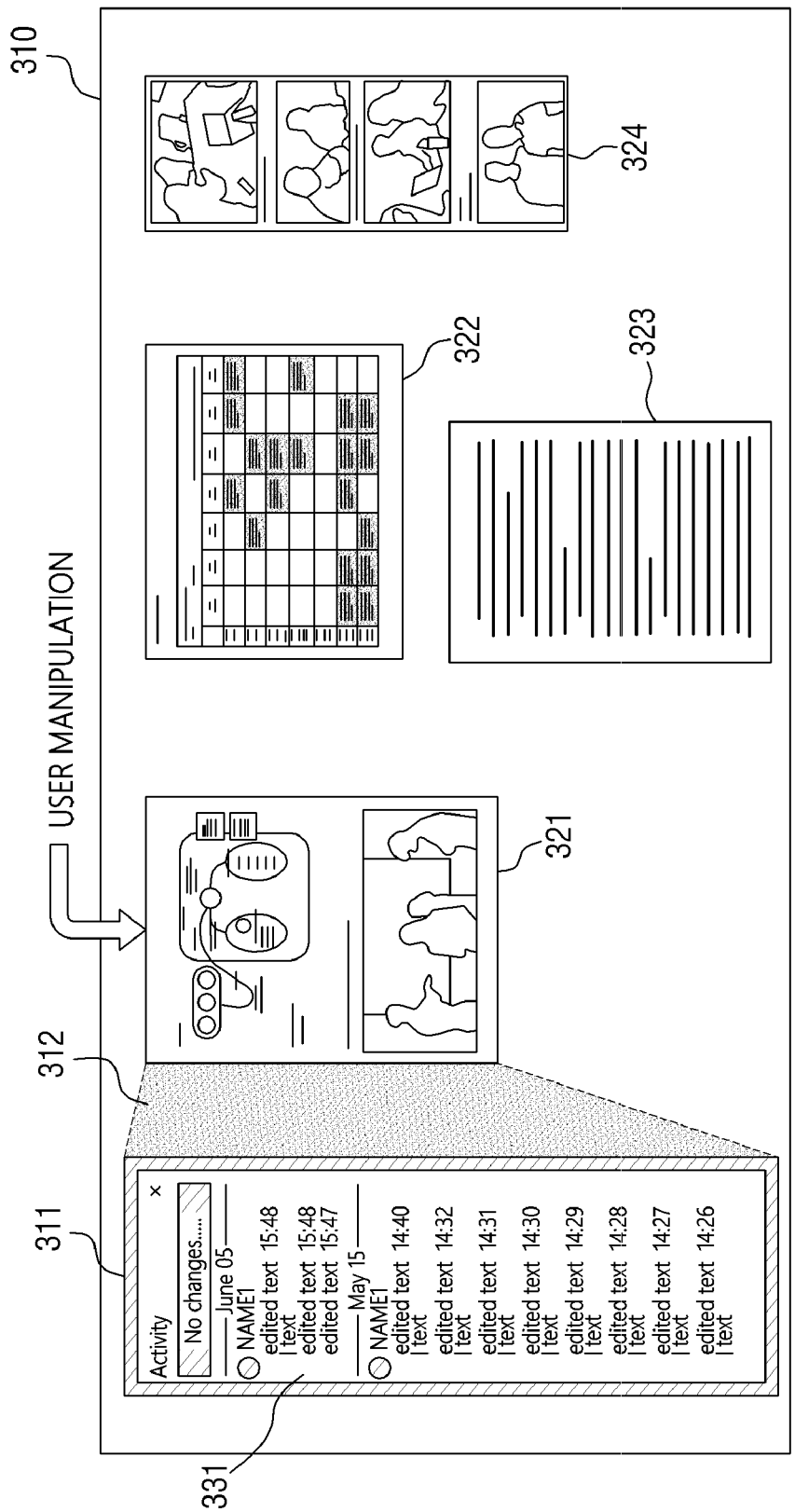
FIG. 32 is a diagram illustrating a method of displaying an editing history of content loaded on a board by way of example.

FIG. 32 shows an embodiment of displaying the editing history 331 of the first content 321 among the content 321, 322, 323, and 324 displayed on the board 310. When a user manipulation to display the editing history for the first content 321 is applied, the service server 3100 displays the first editing history 331 corresponding to the first content 321 in a specific area 311 on the board 310. In this case, the displayed first editing history 331 may include a time when the editing was performed, a user who performed the editing, and contents of the editing.

The specific area 311, in which the editing history 331 is displayed, may be displayed in the blank portion of one side of the board 310 so as not to cover the contents 321, 322, 323, and 324 in the board 310, but it is not limited thereto.

As an embodiment, in order to indicate that the currently displayed first editing history 331 is for the first content 321, an identifier 312 implying the association between the first editing history 331 and the first content 321 may be further displayed.

FIG. 33 is a diagram for describing an exemplary data structure of each content according to an embodiment of the inventive concept. However, the data structure 308 shown in FIG. 33 is a brief description of an exemplary form to describe the data structure of the contents 321, 322, 323, and 324 loaded on the board 310. The scope of the inventive concept is not limited thereto.

Referring to FIG. 33, the data structure 308 includes history information 308b of edits made to the content along with an ID 308a of the content. The ID 308a of the content may be newly assigned when the content is generated, or may indicate the 1D or URL of the raw content corresponding to the content. The history information 38b may include the time when each edit was made, the user who made the edit, the type of edit, or the edited value.

Meanwhile, the data structure 308 may further include coordinates indicating the position and size, at which the content is displayed on the board 310, and time information when the content is generated or updated.

Figure 34:
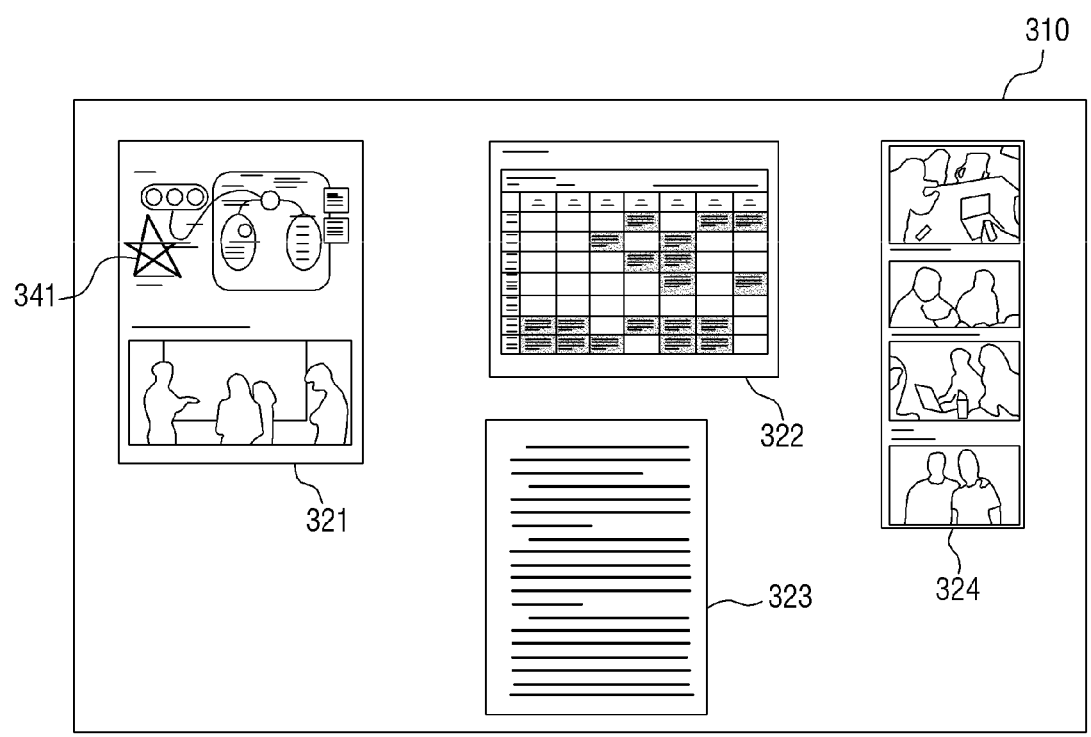
FIG. 34 is a conceptual diagram for describing a method, in which an additional object is embedded in content loaded on a board as an embodiment of the inventive concept.

FIG. 34 is a conceptual diagram illustrating a method, in which an additional object is embedded in a content loaded on the board 310 as an embodiment of the inventive concept. In FIG. 34, an embodiment that when a user externally adds an additional object to the content displayed on the board 310, it is embedded into the content and reflected as editing contents of the content will be described.

Referring to FIG. 34, a board 310, in which a plurality of contents 321, 322, 323 and 324 are loaded, is shown. Among them, it is assumed that a user discusses the first content 321 and draws an asterisk-shaped drawing object 341 on the first content 321 in order to emphasize a specific part of the first content 321. In this case, the drawing object 341 is a separate external object displayed on the board 310 and is not one edited from the first content 321 itself, so the conventional online collaboration service could not provide means to embed the drawing object 341 as the editing contents of the first content. 321. Therefore, external objects such as drawings, memos, or stickers added in the online collaboration process are not stored in the first content 321 and are lost as they are when the online collaboration ends.

In this embodiment, in order to solve this problem, technical means to reflect external objects added on the first content 321 on a board or a collaboration space as the editing contents of the first content 321 and store it together with the first content 321 is provided. A detailed description of this will be continued with reference to FIG. 35 or below.

Figure 35:
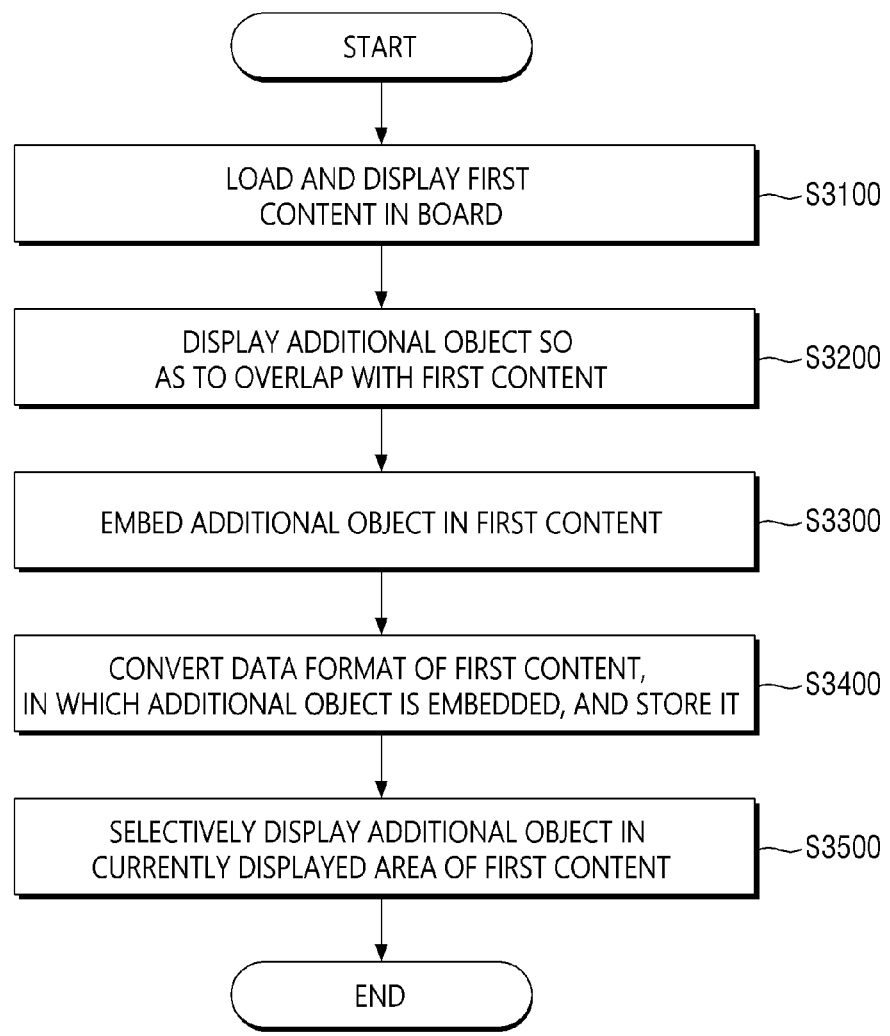
FIG. 35 is a flowchart describing the content editing method described in FIG. 34 in more detail.

FIG. 35 is a flowchart specifically describing the content editing method described in FIG. 34. In the flowchart of FIG. 35, a method of embedding and storing the additional object 341 displayed to overlap with the first content 321 in the first content 321 is described.

First, in step S3100, the service server 3100 loads the first content 321 and displays it on the board 310. Step S3100 may be, for example, a step including steps S3110 to S3160 of FIG. 3, respectively. A detailed method of displaying the first content 321 by the service server 3100 through the step S3100 is substantially the same as what described with reference to FIG. 29 above, and thus a detailed description thereof will be omitted here to avoid redundancy.

In step S3200, the service server 3100 displays the additional object 341 so as to overlap with the first content 321. The additional object may be a drawing object, a memo object, or a sticker object displayed on the board 310 by a user input.

In step S3300, the service server 3100 checks the overlapped portion of the first content 321 and the additional object 341, and embeds the overlapped portion of the additional object in the first content 321. Step S300 will be described in more detail later with reference to FIGS. 36 and 37.

In step S3400, the service server 3100 converts the first content 321, in which the additional object 341 is embedded, into an original data format and stores it. As an embodiment, the first content 321 converted and stored in an original data format may be uploaded (or updated) to the cloud server 304 afterwards.

In step S3500, the service server 3100 selectively displays the additional object according to whether the additional object 341 is included in the currently displayed area of the first content 321 on the board 310. Previously, since the additional object 341 is embedded in the first content 321, the additional object 341 is fixed and moved at a specific position in the first content 321. Therefore, if the position where the additional object 341 is fixed is moved away from the currently displayed screen by scrolling the screen of the first content 321 up and down, the additional object 341 is not rendered on the board 310. This will be described in more detail later with reference to FIG. 41.

According to the content editing method of the inventive concept described above, objects such as drawings, memos, or stickers added externally in relation to the content in the online collaboration service are reflected as the editing contents of the content and stored together with the corresponding content. Therefore, even if the online collaboration ends, the additional object is not lost and can remain embedded in the content.

Figure 36:
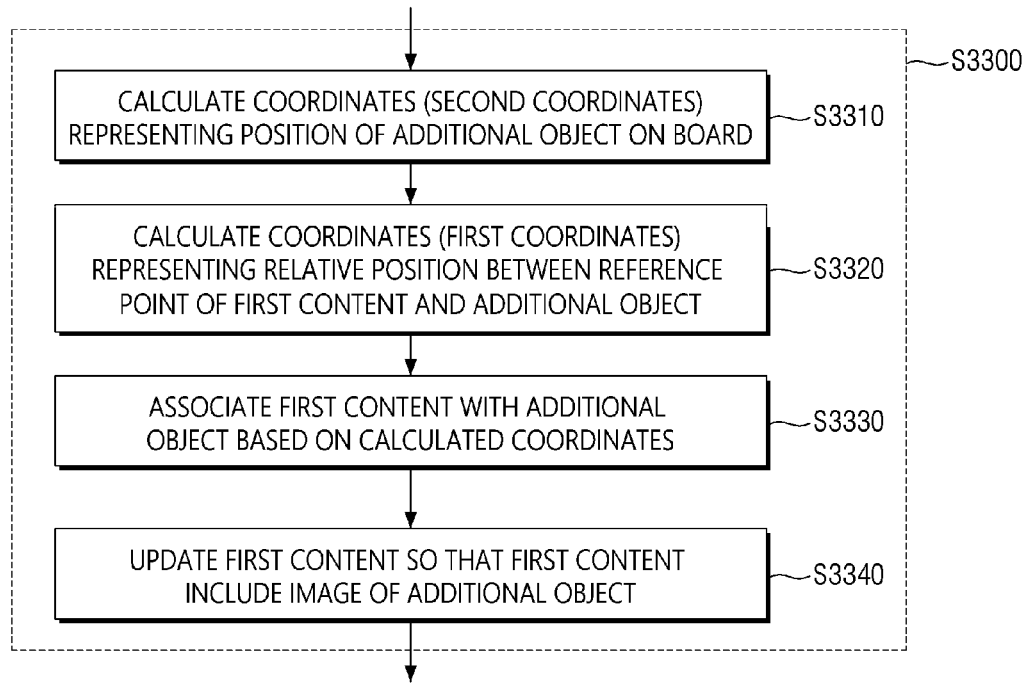
FIG. 36 is a flowchart illustrating an embodiment, in which an additional object is embedded in the first content of FIG. 35.
Figure 37:
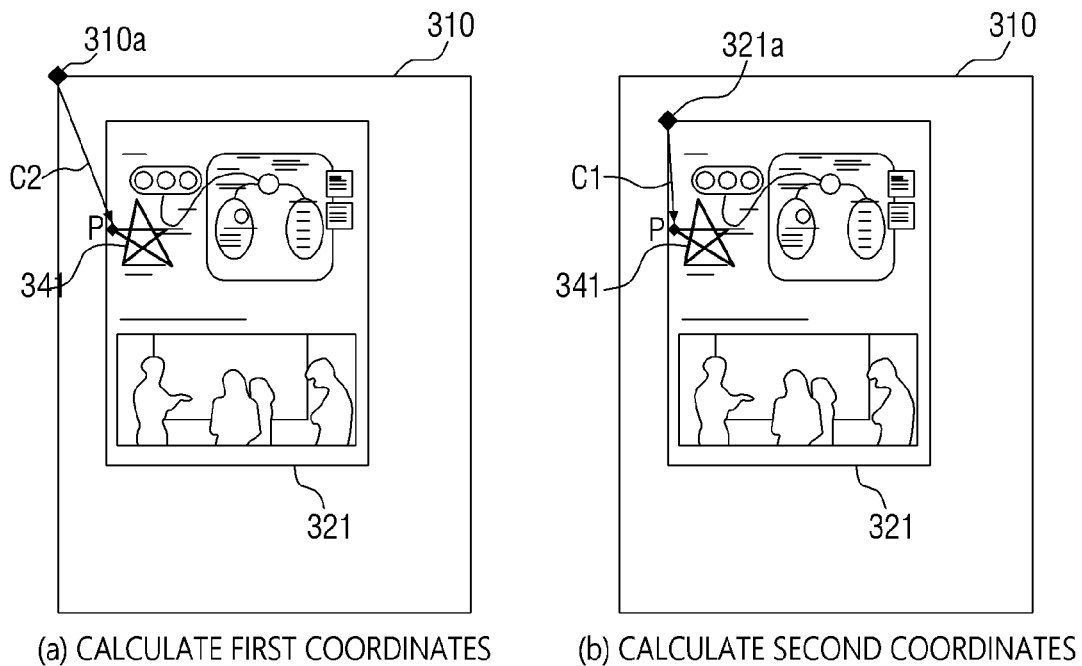
FIG. 37 is a conceptual diagram for further describing some operations of FIG. 36, and is a diagram illustrating a method of calculating coordinates of an additional object and associating it with a first content.

FIG. 36 is a flowchart illustrating an embodiment of embedding an additional object in the first content of FIG. 35 (S3300). FIG. 37 is a diagram for further describing each step of FIG. 36.

Referring to FIG. 36, as a sub-step of step S3300 of FIG. 35, the method of calculating coordinates representing the position of the additional object 341, and associating the first content 321 with the additional object 341 based on the calculated coordinates is described.

First, in step S3310, the service server 3100 calculates coordinates (first coordinates) indicating the position of the additional object 341 on the board 310.

Then, in step S3320, the service server 3100 calculates coordinates (second coordinates) indicating the position of the additional object 341 on the first content 321. In this case, the second coordinates mean coordinates indicating the relative position of the additional object with respect to the reference point of the first content 321.

FIG. 37 is referenced for a clear understanding of this. (a) of FIG. 37 shows a method of calculating the first coordinates of the additional object 321, and (b) of FIG. 37 shows a method of calculating the second coordinates of the additional object 321.

In (a) of FIG. 37, when an additional object 341 is added on the board 310 according to a user input, the service server 3100 calculates the position of the additional object 341 on the board 310 (first coordinates, C1), and the size (width or height, etc.) of the additional object 341. In this case, the first coordinates C1 may be coordinates indicating a relative position between the reference point 310a of the board 310 and the reference point P of the additional object 341. For example, if the coordinates of the reference point 310a are (0,0) and the coordinates of the reference point P are (10, 30), the first coordinates C1 (10, 30) means the relative position between the reference point 310a and the reference point P.

Next, the service server 310 determines whether the additional object 341 at least partially overlaps with the first content 321 using the calculated first coordinates. As described above in FIG. 33, since the position and size of the first content 321 can be checked with reference to information in the data structure 308, the service server 3100 may determine whether the additional object 341 overlaps with the first content 321 by comparing them with the previously calculated first coordinates and size of the additional object 341.

When it is confirmed that the additional object 341 at least partially overlaps with the first content 321, the service server 3100 additionally calculates the position of the additional object 341 on the first content 321 (second coordinate, C2) as shown in (b) of FIG. 37. Since the second coordinates represent the relative position of the additional object with respect to the reference point of the first content 321, it can be calculated by calculating the difference between the coordinates of the reference point 321a of the first content 321 and the coordinates of the reference point P of the additional object 341 (that is, the first coordinates). For example, if the coordinates of the reference point 321a of the first content 321 on the board 310 are (9, 9), the value (1, 21), which obtained by subtracting it from the coordinates (10, 30) of the reference point P, becomes the second coordinates C2 of the additional object 341.

The first coordinates C1 and the second coordinates C2 of the additional object 341 may be calculated through the method described above.

Returning back to FIG. 36, in step S3330, the service server 3100 associates the first content 321 with the additional object 341 based on the calculated second coordinates C2. For example, if the service server 3100 inserts the additional object 341 at the position of the second coordinate C2 of the first content 321, and the second coordinates C2 are included in the currently displayed area of the first content 321, the additional object 341 can be associated with the first content 321 by editing the data of the first content 321 so that the additional object 341 is rendered at the position of the second coordinate C2. In this case, information such as the second coordinates, size (position and height), object ID, shape, or type of the additional object 341 may be added to the data structure of the first content 321.

In step S3340, the service server 3100 generates an image of the additional object 341 in order to include the additional object 341 as a part of the editing contents of the first content 321, and then inserts the image at the position of the second coordinates C2 of the first content 321.

Meanwhile, although the case where the additional object 341 completely overlaps the first content 321 has been exemplified here, the scope of the inventive concept is not limited thereto. For example, even when the additional object partially overlaps with the content, the partially overlapping portion may be embedded in the content. This will be described with reference to FIG. 38.

Figure 38:
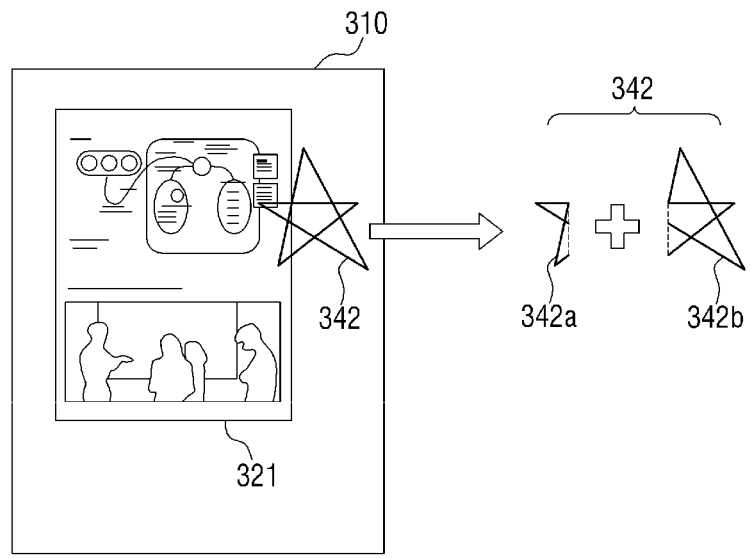
FIG. 38 is a diagram describing a method how to embed an additional object into the first content when the additional object partially overlaps with the first content.

Referring to FIG. 38, an example, in which the additional object 342 partially overlaps with the first content 321 loaded on the board 310, is shown. In this case, the service server 3100 determines whether the additional object 342 completely overlaps with the first content 321 or partially overlaps, and if it is confirmed that the additional object 342 overlaps only partially, the additional object 342 is divided into a first portion 342a overlapping with the content 321 and a second portion 342b not overlapping with the first content 321. And, for the first portion 342a, in the same method as described in FIGS. 36 and 37 above, coordinates representing the relative position of the first portion 342a on the first content 321 are calculated, and the first content 321 and the first portion 342a are associated based on the calculated coordinates. And, the service server 3100 embeds first portion 342a in the first content 321 through the steps of generating an image of the first portion 342a in order to include the first portion 342a as a part of the editing contents of the first content 321, and then inserting the generated image into the previously calculated coordinate position of the first content 321.

Meanwhile, since the portion overlapping with the first content 321 is only the first portion 342a, the other portion (the second portion, 42b) not overlapping with the first content 321 is not embedded in the first content 321.

Figure 39:
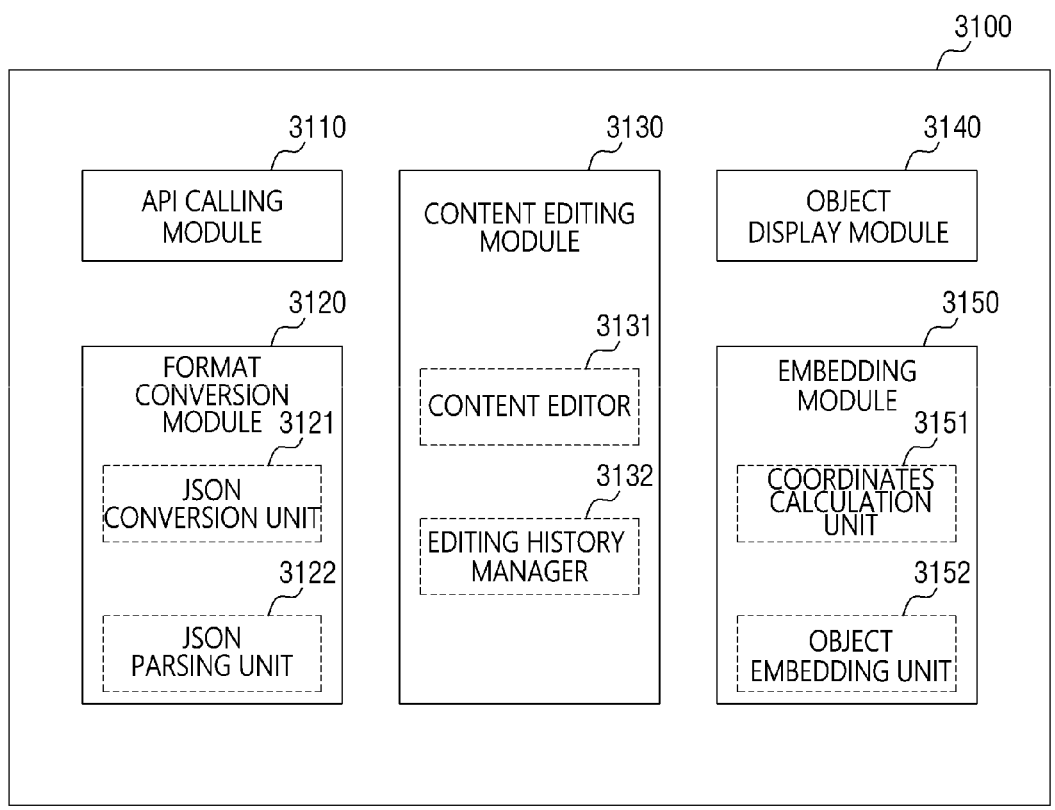
FIG. 39 is a block diagram illustrating an exemplary configuration of a service server for performing the method described in FIGS. 35 to 38.

FIG. 39 is a block diagram illustrating an exemplary configuration of a service server 3100 for performing the method described in FIGS. 35 to 38. The configuration of the service server 3100 shown in FIG. 39 is similar to that described in FIG. 30. However, it is different in that the service server 3100 of FIG. 39 further includes an object display module 3140 and an embedding module 3150.

In FIG. 39, specific configurations and functions of the API calling module 3110, the format conversion module 3120, and the content editing module 3130 among the configurations of the service server 3100 are substantially the same as those described in FIGS. 4a to 4c. In order to avoid redundancy, a description thereof is omitted here.

The object display module 3140 is a module that displays an additional object 341 (see FIG. 34) on the board 310 (see FIG. 34) according to a user input. The object display module 3140 may display various types of external objects, such as a drawing object, a memo object, or a sticker object, on the board 310 as the additional object 341.

The embedding module 3150 calculates the coordinates of the additional object 341 displayed on the board 310, determines whether it overlaps with the first content 321 based on this, and embeds the additional object 341 in the first the content 321 according to the result. The embedding module 3150 may include a coordinates calculation unit 3151 for calculating a position of the additional object 341 on the board 310 (first coordinates) and a relative position on the first content 321 (second coordinates) and an object embedding unit 3152 for embedding the additional object 341 in the first content 321.

Figure 40:
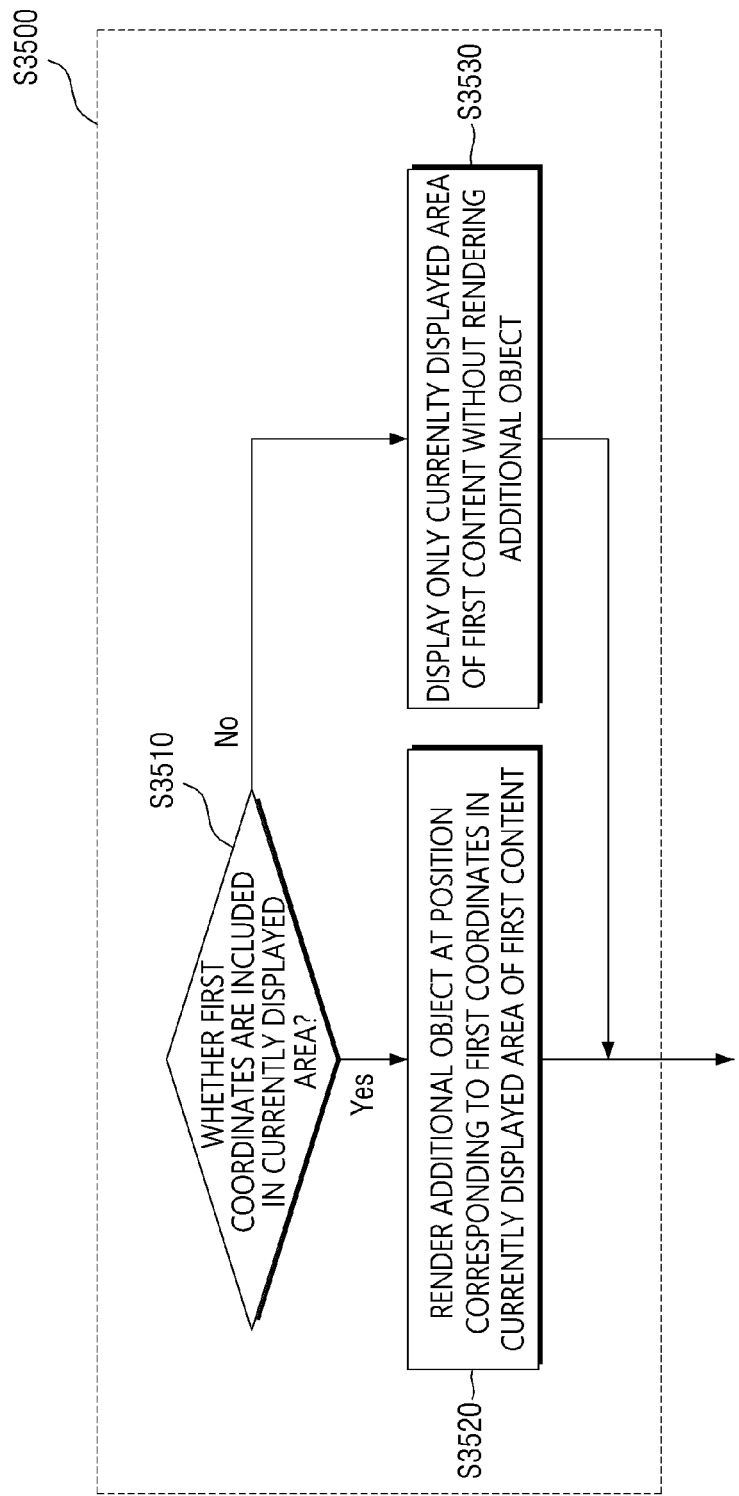
FIG. 40 is a flowchart illustrating an exemplary embodiment, in which an additional object is selectively displayed in a currently displayed area of the first content of FIG. 35.
Figure 41:
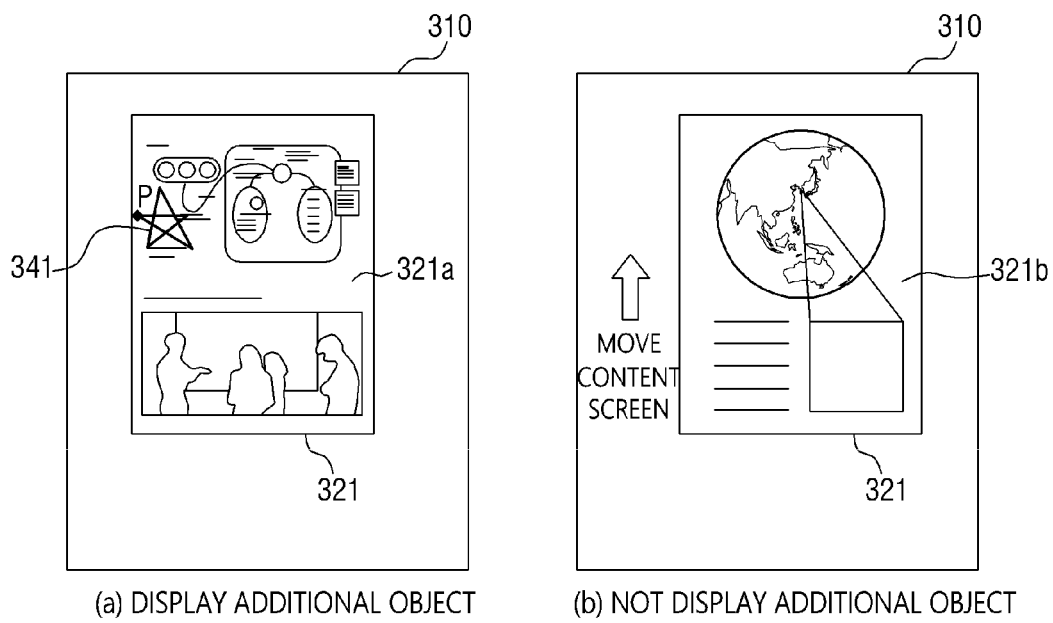
FIG. 41 is a conceptual diagram for further describing the method described in FIG. 40.

FIG. 40 is a flowchart illustrating an exemplary embodiment of selectively displaying an additional object in a currently displayed area of the first content of FIG. 35 (S500). FIG. 41 is a conceptual diagram for further describing the method described in FIG. 40.

As described above, when the additional object 341 is embedded in the first content 321, the additional object is selectively displayed according to whether the additional object 341 is included in the currently displayed area of the first content 321. Hereinafter, it will be described with reference to FIGS. 40 and 41.

In step S3510, the service server 3100 determines whether (for example) the coordinates of the additional object 341 are included in the currently displayed area of the first content 321. When the coordinates of the additional object 341 (e.g., the second coordinates) are included in the currently displayed area of the first content 321, the present embodiment proceeds to step S3520. Otherwise, the present embodiment proceeds to step S530.

In step S3520, since the coordinates of the additional object 341 are included in the currently displayed area of the first content 321, the service server 3100 renders the additional object 341 at the position corresponding to the coordinates among the currently displayed areas of the first content 321. For further explanation, referring to (a) of FIG. 41, it is assumed that the currently displayed area 321*a* of the first content 321 loaded on the board 310 includes the coordinates P of the additional object 341. This means that the screen of the first content 321, to which the additional object 341 is initially added, is currently displayed, so the service server 3100 searches for information on the additional object 341 and renders additional object 341 at the position corresponding to the coordinates P on the first content 321.

Meanwhile, in step S3530, since the coordinates of the additional object 341 are not included in the currently displayed area of the first content 321, the service server 3100 does not render the additional object 341 and displays only the currently displayed area of the first content 321. For further description, referring to (b) of FIG. 41, it is assumed that the user moves the screen of the first content 321 through a scroll manipulation, etc., and the coordinates P of the additional object 341 is not included in the currently displayed area 321*b* of the first content 321. This means that the screen of the first content 321, to which the additional object 341 is initially added, is not currently displayed. Therefore, the service server 3100 does not render the additional object 341, but renders only the currently displayed area 321*b* of the first content 321.

According to the embodiment described above, the additional object 341 is integrated with the first content 321 and can be displayed as if it was a part of the first content 321 from the beginning, thereby providing an excellent user experience in the online collaboration service.

Access Right Management in Units of Embedded Contents

Hereinafter, in an online collaboration service including joint editing of a content, when the editing target content includes a plurality of embedded contents, various embodiments related to individually manage the access rights of each user to each embedded content are described.

In the online collaboration service provided through the system environment shown in FIG. 27, each content 321, 322, 323, and 324 of the board may be selectively shared according to whether an individual user has access rights to each content. Hereinafter, embodiments related to this will be described.

Figure 42:
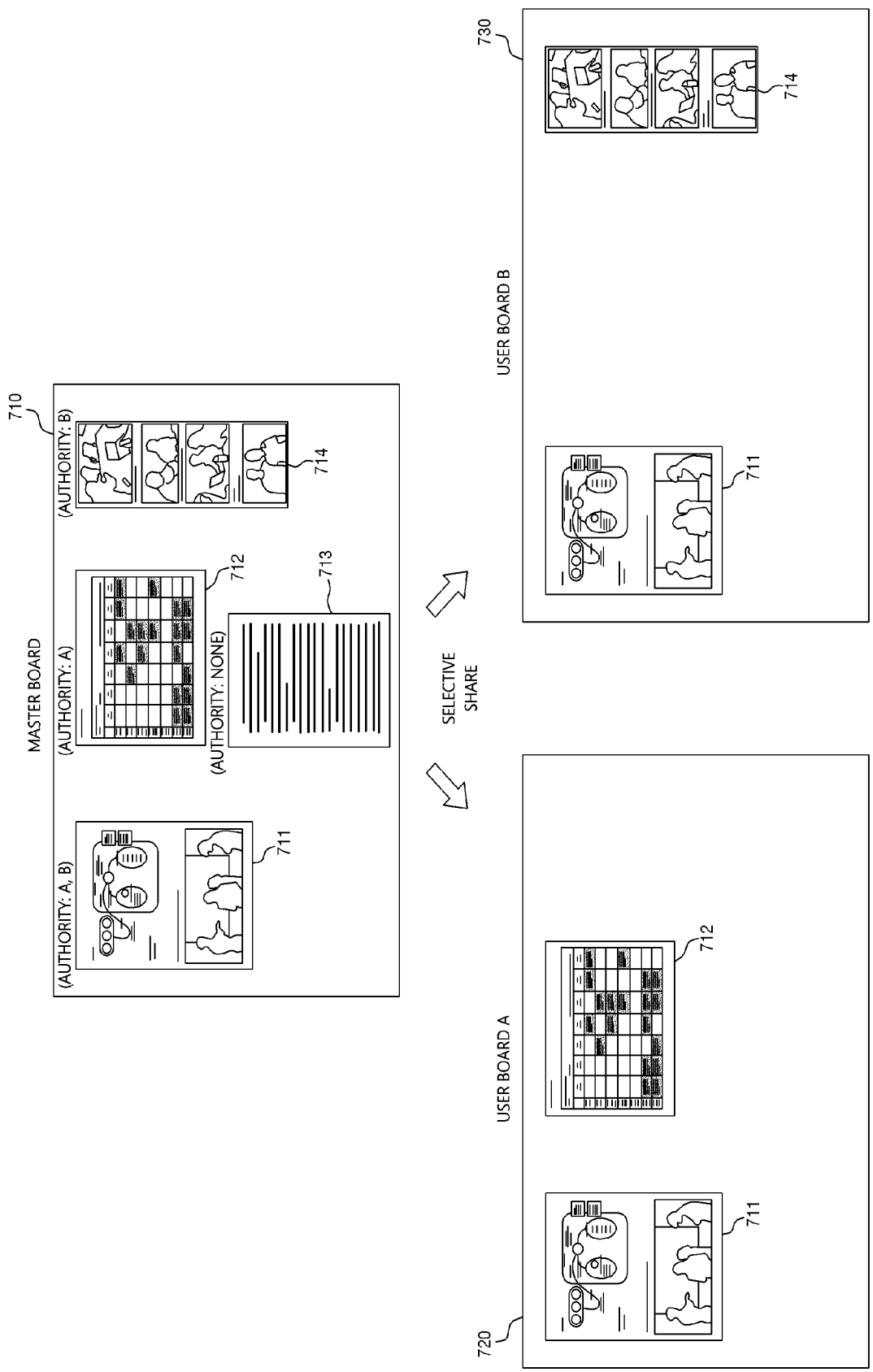
FIG. 42 is a conceptual diagram of a content sharing method according to another embodiment of the inventive concept.

FIG. 42 is an exemplary diagram conceptually describing a content sharing method according to an embodiment of the inventive concept. Referring to FIG. 42, a master board 710 and user boards 720 and 30 are shown. The master board 710 is a board generated by the service server 3100 described in FIG. 27, and the user boards 720 and 730 are boards generated by a client device of an individual user. Here, it is assumed that the client device of user A is the first client device 301 and the client device of user B is the second client device 302. And, a user board generated by the first client device 301 will be referred to as a user board A 720, and a user board generated by the second client device 302 will be referred to as a user board B 730, respectively.

The master board 710 displays all the contents 711, 712, 713, and 714 provided in the collaboration space. In each of the contents 711, 712, 713, and 714, individual users' access rights to the corresponding contents are set. For example, as shown in FIG. 42, user A and user B have the access rights to the first content 711, user A has the access right to the second content 712, and nobody has the access right to the third content 713, and user B has the access right to the fourth content 714.

At this time, when the first client device 301 and the second client device 302 connect to the service server 3100, the service server 3100 selectively shares contents 711, 712, 713, and 714 loaded on the master board 710 to each of the client devices 301 and 302 based on the user's access right to individual content.

For example, since the user A has access rights to the first content 711 and the second content 712, the service server 3100 selects and shares only the first content 711 and the second content among the contents of the master board 710 with the first client device 301. The first client device 301 displays the shared contents 711 and 712 on the user board A 720.

Meanwhile, the access right of user A to the shared contents 711 and 712 may be different for each of the contents 711 and 712. For example, user A's access right to the first content 711 may be "READ/WRITE" right, which is readable and editable, and user A's access right to the second content 712 may be "READ ONLY" right, which is only readable, but not editable. At this time, for content that the user has "READ/WRITE" rights (or editing right), when the user edits the content or changes the position on his or her user board, the content may be edited or its position may be changed even on the master board to correspond to the edit or the position change.

A similar content sharing method applies to user B. Since the user B has access rights to the first content 711 and the fourth content 714, the service server 3100 selects and shares only the first content 711 and the fourth content 714 among the contents of the master board 710 with the second client device 302. The second client device 302 displays the shared contents 711 and 714 on the user board B 730. As described above, also at this time, the user B's access right to the shared contents 711 and 714 may have different types for each of the contents 711 and 713.

Meanwhile, since both the user A and the user B do not have access right to the third content 713, the service server 3100 shares the third content 713 with neither the first client device 301 nor the second client device 302.

According to the content sharing method according to an embodiment of the inventive concept described above, in a collaboration service that simultaneously displays a plurality of content on a collaboration space for content sharing between multiple users, each user's access rights to the content can be managed in individual content units, and only the content, to which the user has access right, can be selectively shared to each user's client device.

Figure 43:
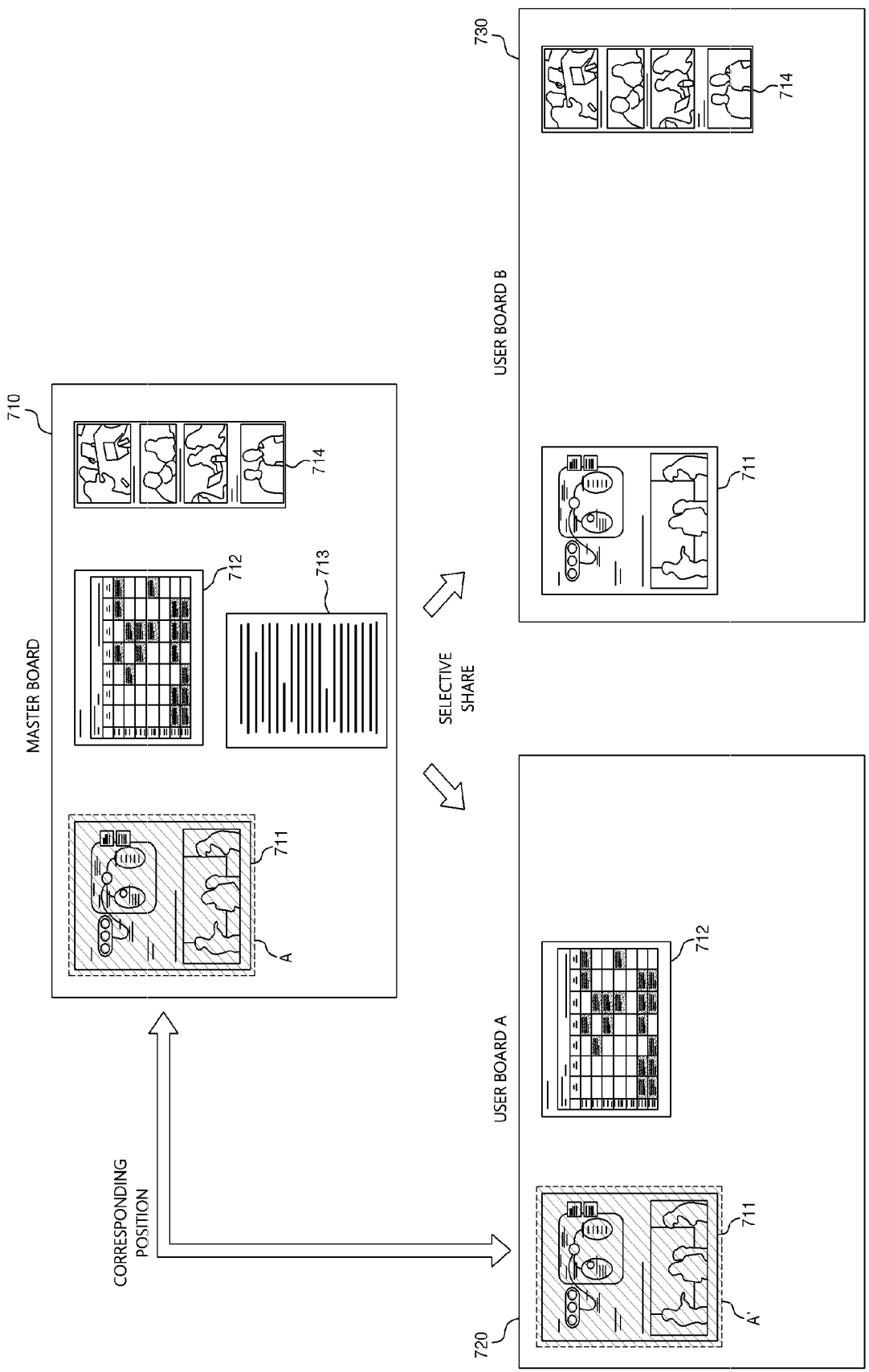
FIGS. 43 and 44 are diagrams for describing a method of determining an arrangement of content distributed through the content sharing method described with reference to FIG. 42 in a user board.
Figure 44:
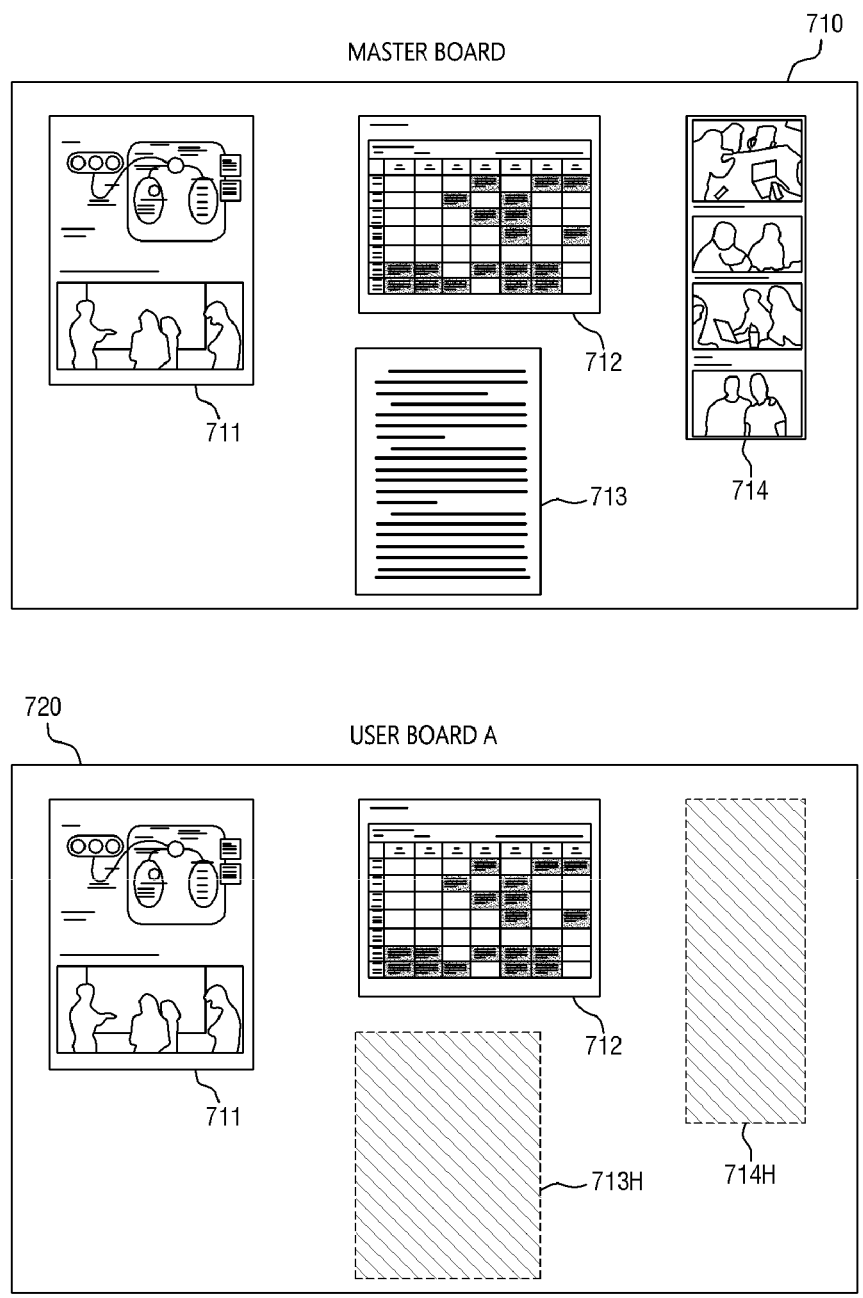

FIGS. 43 and 44 are diagrams exemplarily describing a method of determining an arrangement in a user board of content distributed through a content sharing method according to an embodiment of the inventive concept.

Referring to FIG. 43, the client devices 301 and 302, with which the service server 3100 shared a content, arrange and display the content at the position on the user boards 720, 703 corresponding to the position of the content displayed on the master board 710. Here, the meaning of the corresponding position may mean proportionally the same position.

For example, if the master board 710 and the user board 720 have the same size, the same coordinate position in the board as the corresponding position may be indicated. For example, it is assumed that the reference point coordinates (for example, the upper left corner coordinates) of the content arranged in the master board 710 are (10, 10) and the height is 20 and the width is 20.

At this time, if the size of the master board 710 and the user board 720 is the same as 1280*2460, respectively, the position on the user board 720 corresponding to the master board 710 has the reference point coordinates of (10, 10), the height of 20 and the width of 20, and may be the same position as in the master board 710.

On the other hand, if the size of the master board 710 is 1280*2460, but the size of the user board 720 is reduced by ½ to 640*1230, the position on the user board 720 corresponding to the master board 710 has the reference point coordinates of (5, 5), the height of 10 and the width of 10, and may be a position reduced by ½ magnification compared to the master board 710.

In a specific example, the first content 711 loaded on the master board 710 is shared to the first client device 301 from the service server 3100. And, when the first client device 301 displays the shared first content 711 on the user board A 720, the first content 711 is arranged and displayed at a position A' on the user board A 720 corresponding to the position 7A of the first content 711 on the master board 710. Similarly, when the first client device 301 displays the second content 712 shared from the service server 3100, the first content 712 is arranged and displayed at the position on the user board A 720 corresponding to the position of the second content 711 on the master board 710.

The same method is also applied when the second client device 302 arranges and displays the shared contents 711 and 714 on the user board B 730.

According to this method, although the contents 711, 712, 713, 714 of the master board 710 are only partially shared to the individual client devices 301, 302, at least the shared contents maintain the same position and arrangement as the master board 710. This helps each content shared to the individual client devices 301 and 302 to maintain the same context and flow even within the individual user boards 720 and 30 as within the master board 710. This will be further described with reference to FIG. 44.

In FIG. 44, it can be seen that the master board 710 is divided into a plurality of areas, and the marks of 'Day 1,' 'Day 2,' and 'Day 3' are marked on the areas. However, this is only for displaying divisions and markings for convenience in order to help a clear understanding of the present embodiment, and the scope of the inventive concept is not limited thereto.

Various contents 711, 712, 713, 714 are simultaneously displayed on the master board 710, but it is assumed that the content 711 in the area marked 'Day 1' is a content related to the topic derived on the first day, and the contents 712, 13 in the area marked 'Day 2' are contents related to the topic derived on the second day, and the content 714 in the area marked 'Day 3' is a content related to the topic derived on the third day.

In this case, the user can determine when the content is discussed by only looking at the position where the content is arranged on the user board A 720. For example, the user can know that the first content 711 is a content related to the topic discussed on the first day by looking at the arranged position of the first content 711 of the user board A 720, and can know that the second content 712 is a content related to the topic discussed on the second day by looking at the arranged position of the second content 712 of the user board A 720.

In this way, if the shared contents 711 and 12 are arranged at the position on the user board A 720 corresponding to the position on the master board 710, the context and flow of the entire contents within the master board 710 can be known on the user board A 720 as it is.

This can be an important feature of online collaboration. When the people participating in the online collaboration discuss with each other and say that 'let's take a look at together what we talked about on the first day,' each participant can easily know which content is related to the topic to be talked about by only looking at the arrangement position of the content displayed on their user board.

If, unlike the present embodiment, the shared contents 711, 12 are arranged at the position different from the position on the master board 710, each participant has a lot of inconvenience in designating and confirming the content that has started discussion. For example, it is assumed that the first content 711 shared to the first client device 301 is arranged in a position (e.g., B1 or B2 in FIG. 44) other than the position shown in FIGS. 5a to 5d. In this case, as before, when saying 'let's look at together what we talked about on the first day,' user A will have difficulty finding the corresponding content on his or her user board 720, and also have difficulty in online collaborating with other participants.

On the other hand, although the division and marking are illustrated on the master board 710 and the user board 720 to help clear understanding of the description, the scope of the inventive concept is not limited thereto. For example, even if there are no divisions and markings on the master board 710 and the user board 720, the arrangement position of each content in the boards 710 and 20 may have a contextual meaning. For example, it is assumed that a total of three projects are being discussed on the master board 710, and among them, the topic related to the first project displays and discusses the related content in the left side of the master board 710, and the topic related to the second project displays and discusses the related content in the center of the master board 710, and the topic related to the third project displays and discusses the related content in the right side of the master board 710. At this time, users who participate in all three projects can check all contents related to each project on their user board, but refer to the arrangement position, and refer to mainly the contents located in the left side of the user board when discussing related to the first project, refer to mainly the contents located in the center of the user board when discussing related to the second project, and refer to mainly the contents located in the right side of the user board when discussing related to the third project in order to effectively perform online collaboration.

Figure 45:
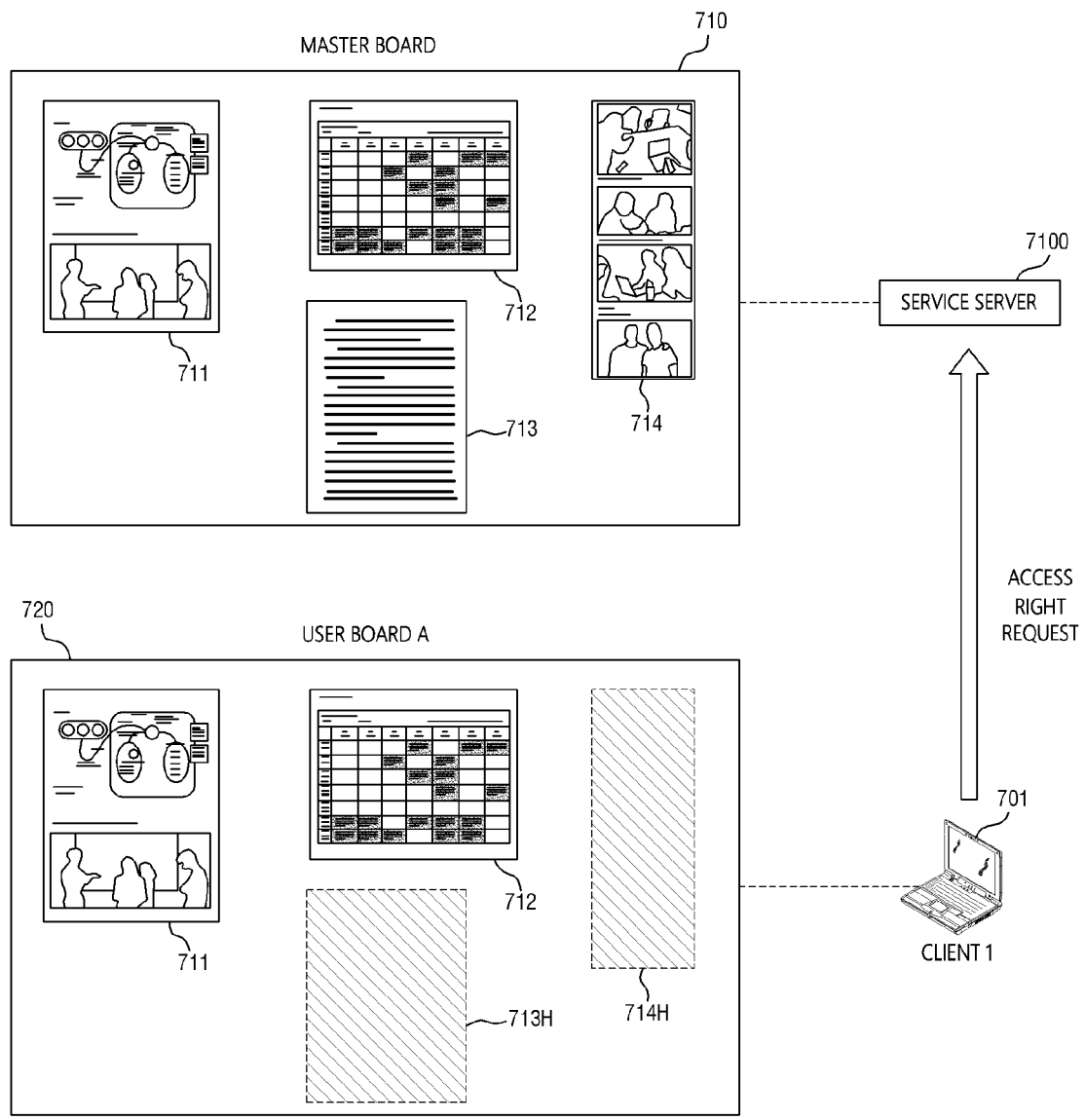
FIG. 45 is an extended embodiment of the inventive concept described with reference to FIG. 42, and a diagram for describing an embodiment of guiding a user to request an authority for a new content by displaying a UI capable of identifying an unshared content.

FIG. 45 is an extended embodiment of the inventive concept, and a diagram illustrating an embodiment of guiding a user to request an authority for a new content by displaying unshared content as an identifiable UI.

In the embodiment of FIG. 42 above, unshared content is not displayed on each user board 720, 30, and the position on the user board corresponding to the position on the master board 710 of the unshared content is left as a blank area.

On the other hand, in the embodiment of FIG. 45, even if the content is not shared with the client device, the position on the user board corresponding to the position on the master board 710 is displayed by an identifiable UI, although the content is displayed on the user board, the user is notified that content on the master board 710 that is not shared exists in the corresponding position. Hereinafter, a specific example will be described with reference to the drawing.

Referring to FIG. 45, only the first content 711 and the second content 712 are shared to the first client device 301 from the service server 3100. And, the first client device 301 arranges and displays the shared contents 711 and 712 at the position of the user board A 720 corresponding to the position on the master board 710.

In addition, the third content 713 and the fourth content 714 are not shared to the first client device 301 from the service server 3100, but information on the position of the third content 713 and the fourth content 714 on the master board 710 is delivered to the first client device 301, and identifiable UIs 713H and 714H are displayed at a position on the user board A 720 corresponding thereto. In this case, the identifiable UI may include various UIs such as a shade display, a highlight display, a silhouette of a content, or an icon.

A user can see the identifiable UIs 713H, 714H displayed on the user board A 720 and know that the content exists in the corresponding position of the master board 710, and if necessary, request the access right for the content to the service server 3100.

As an embodiment, when the mouse cursor is positioned on the identifiable UIs 713H and 14H, the first client device 301 displays an access right request button for the corresponding contents 713 and 14, and if the user selects the displayed access right request button, the access right to the contents 713 and 14 can be requested to service server 3100 in response thereto.

Through this method, the user can recognize the existence of content that is not shared with him or her, and request access right for it.

Figure 46:
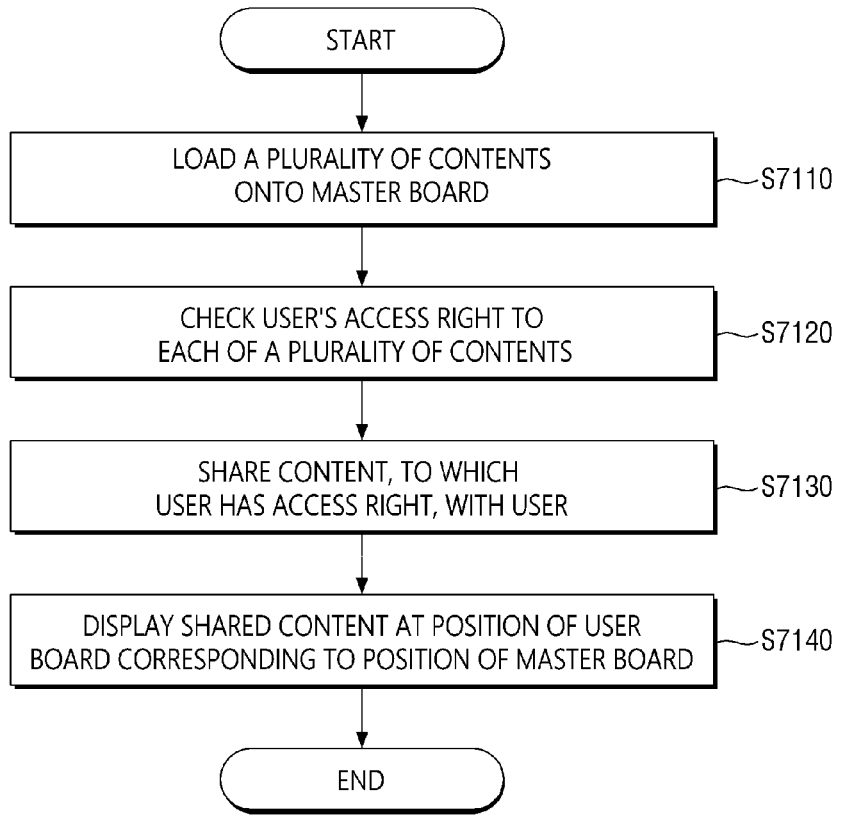
FIG. 46 is a flowchart of the content sharing method described with reference to FIG. 42.

FIG. 46 is a flowchart describing a content sharing method step by step according to an embodiment of the inventive concept. In FIG. 46, the content sharing method described above is explained in a flowchart.

In step S7110, the service server 3100 loads a plurality of contents 711, 12, 13, and 14 on the master board 710.

In step S7120, when the client devices 301 and 302 connect to the service server 3100, the service server 3100 checks the user's access rights to each of the loaded plurality of contents.

In step S7130, the service server 3100 checks what contents the user of each client device 301, 302 has access rights among the plurality of contents loaded on the master board 710 based on the access rights checked above, and selects only contents, to which each user has access rights, and shares them to the corresponding client devices 301 and 302.

In step S140, the content is shared to each client device 301, 302 from the service server 3100, the shared contents are displayed on the user board 720, 30 generated by the client devices 301, 302, and the content is displayed at a position on the user board corresponding to the position of each content on the master board 710.

Figure 47:
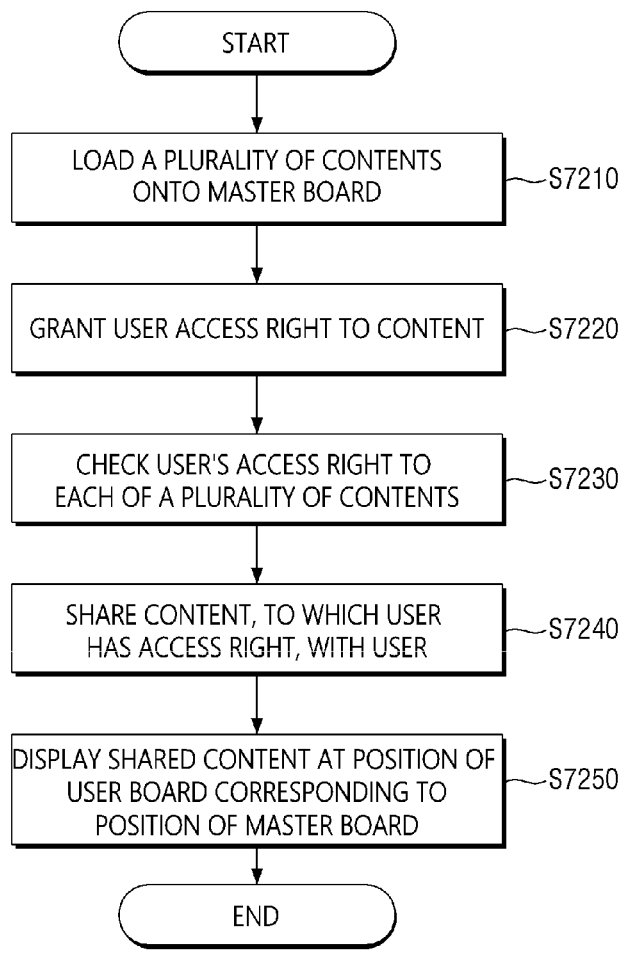
FIG. 47 is a flowchart of a content sharing method according to another embodiment of the inventive concept.

FIG. 47 is a flowchart for describing a content sharing method step by step according to another embodiment of the inventive concept. The embodiment of FIG. 47 is similar in many parts to the embodiment described with reference to FIG. 46. However, it is different in that the step of granting a user access right to a content is added.

In step S7210, the service server 3100 loads a plurality of contents 711, 12, 13, and 14 on the master board 710.

In step S7220, the service server 3100 grants access rights to at least some of the loaded plurality of contents 711, 12, 13, and 14 to a specific user.

As an embodiment, the service server 3100 may grant the user access right to the content by placing a symbol representing a user, to whom the right is to be granted, on the content displayed on the master board 710 by an administrator having management authority for the corresponding content.

Alternatively, the service server 3100 may analyze an attribute inherent in the content and automatically grant the access right to the content to a user matching the result. This will be described in more detail with reference to FIG. 48.

Figure 48:
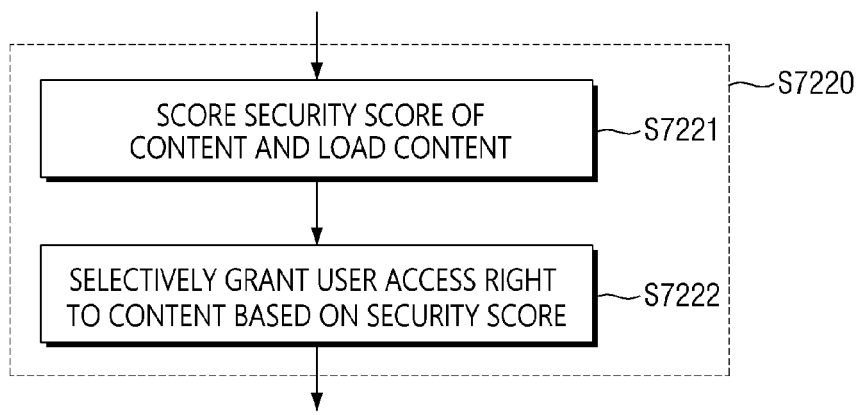
FIG. 48 is a detailed flowchart of some operations of the content sharing method described with reference to FIG. 47.

FIG. 48 is a flowchart showing an embodiment, in which step S220 of granting the access right to the content shown in FIG. 47 is further embodied, and describes an embodiment of automatically granting the access right to a content to a user by analyzing attributes inherent in the content.

In step S7221, the service server 3100 scores the security score of the content loaded on the master board 710. In this case, the security score may be scored based on the context analysis of the content.

Figure 49:
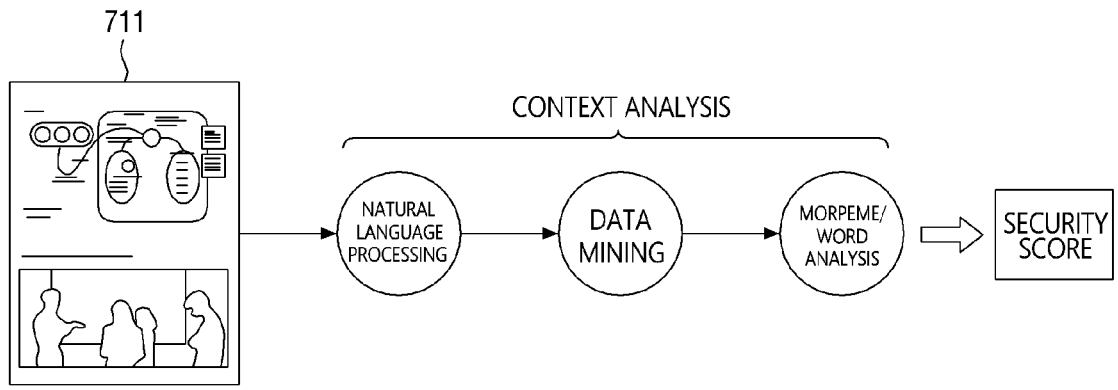
FIG. 49 is a diagram for further describing the step of scoring the security score described with reference to FIG. 48.

For this, referring to FIG. 49, the service server 710 extracts words and images from a content 711 (e.g., first content), processes them in natural language, and compares them with security-related data sets collected based on data mining to perform context analysis to determine the importance degree of each morpheme and words. And, as a result of the context analysis, a security score for the content is calculated.

On the other hand, a context analysis method for processing extracted words and images in natural language and analyzing morphemes and words through data mining is well known in the art with the exemplary methods, and thus a detailed description thereof will be omitted here.

Returning back to FIG. 48, in step S7222, the service server 3100 selectively grants the access right to the content to the user based on the previously calculated security score. This will be further described with reference to FIGS. 50 and 51.

Figure 50:
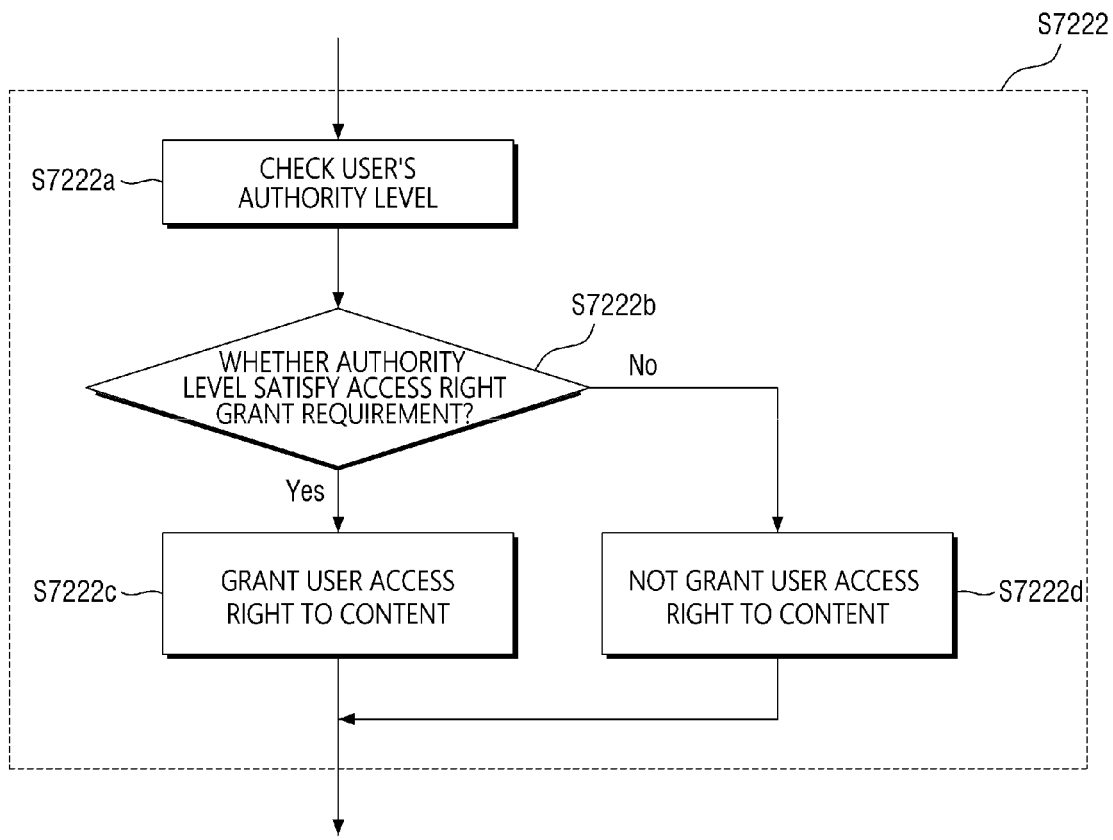
FIG. 50 is a detailed flowchart of some operations of the content sharing method described with reference to FIG. 47.

Referring to FIG. 50, in step S7222a, the service server 3100 checks the user's authority level.

In step S7222b, the service server 3100 determines whether the user's checked authority level satisfies the content access right grant requirement. In this case, the access right grant requirement may be determined based on the security score of the content calculated in step S7221 of FIG. 48.

Figures 51, 52:
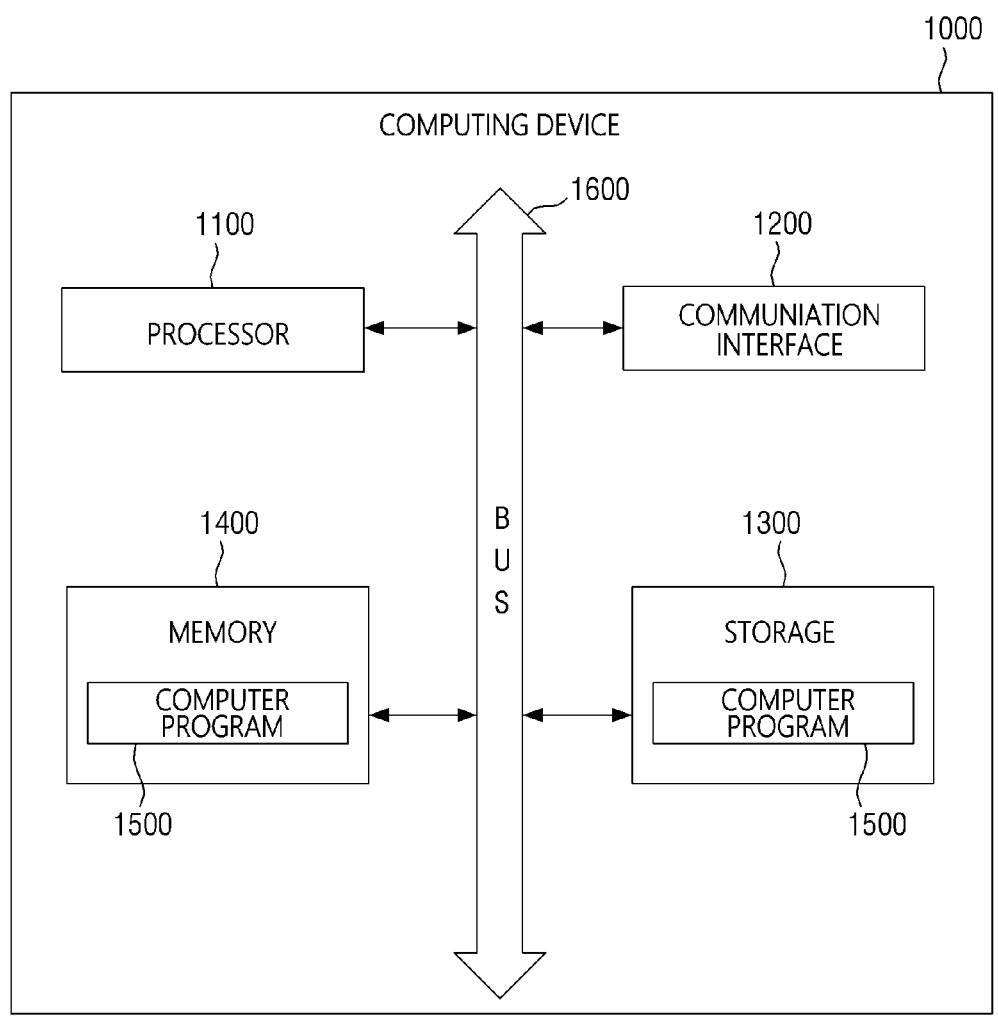
FIG. 51 is an example of a sharing range table for each content rating for describing some operations of FIG. 50 in detail.
FIG. 52 is a hardware configuration diagram of a computing device according to some embodiments of the inventive concept.

For example, referring to the table shown in FIG. 51, the content rating and sharing range according to the security score of the content are illustrated. If the content's security score is 80 or more, the rating of the content is 1st grade, and the sharing range of the content is limited to the owner. In this case, only the owner is granted the access right to the content.

On the other hand, if the security score of the content is less than 80 points and equal to or more than 50 points, the rating of the content is 2nd grade, and the sharing range of the content is limited to the owner and administrator. In this case, only the owner and administrator are granted the access right to the content. Similarly, if the security score of the content is less than 50 points, the rating of the content is 3rd grade, and the sharing range of the content extends to general participants in addition to the owner and administrator. In this case, the owner, administrator, and general participants are granted the access right to the content.

Returning back to FIG. 50, in step S7222b, the service server 3100 checks whether the user's authority level satisfies the access right grant requirement based on the previously calculated security score. For example, if the security score of the content is 70 points, only owner and the administrator can receive the access right to the content. At this time, if the user's authority level is the owner, the service server 3100 will determine that the user's authority level satisfies the access right grant requirement. On the other hand, if the user's authority level is general participant, the service server 3100 will determine that the user's authority level does not satisfy the access right grant requirement.

If the user's authority level satisfies the access right grant requirement, the present embodiment proceeds to step S7222c, and the service server 3100 grants the user the access right to the corresponding content.

Otherwise, if the user's authority level does not satisfy the access right grant requirement, the present embodiment proceeds to step S7222d, and the service server 3100 does not grant the user the access right to the corresponding content.

According to the embodiment of the inventive concept described above, it is possible to automatically grant/manage an access right to individual content through context analysis of the content.

Returning back to FIG. 47, in step S7230, when the client devices 301 and 302 connect to the service server 3100, the service server 3100 check the access rights of the entire users including access rights previously granted to each of the loaded plurality of contents.

Meanwhile, since steps S7240 to S7250 are substantially the same as steps S7130 and S7140 described in FIG. 46, descriptions thereof will be omitted here.

Hardware Configuration of Computing Devices, Etc.

Hereinafter, a hardware configuration of an exemplary computing device according to some embodiments of the inventive concept will be described with reference to FIG. 52. For example, at least one of the teleconference management server 10 described with reference to FIG. 1, the editor terminals 240-1 to 240-4 and the service server 230 described with reference to FIG. 11, the message queue management device 260 described with reference to FIG. 19a, the service server 3100 described with reference to FIG. 27, and the service server 7100 described with reference to FIG. 45 may be a computing device implemented based on the configuration illustrated in FIG. 52.

Hereinafter, an exemplary computing device 1000 that can implement an apparatus and a system, according to various embodiments of the present disclosure will be described with reference to FIG. 52.

FIG. 52 is an example hardware diagram illustrating a computing device 1000.

As shown in FIG. 52, the computing device 1000 may include one or more processors 1100, a bus 1600, a communication interface 1200, a memory 1400, which loads a computer program 1500 executed by the processors 1100, and a storage 1300 for storing the computer program 1500. However, FIG. 52 illustrates only the components related to the embodiment of the present disclosure. Therefore, it will be appreciated by those skilled in the art that the present disclosure may further include other general purpose components in addition to the components shown in FIG. 52.

The processor 1100 controls overall operations of each component of the computing device 1000. The processor 1100 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1100 may perform calculations on at least one application or program for executing a method/operation according to various embodiments of the present disclosure. The computing device 1000 may have one or more processors.

The memory 1400 stores various data, instructions and/or information. The memory 1400 may load one or more programs 1500 from the storage 1300 to execute methods/operations according to various embodiments of the present disclosure. For example, when the computer program 1500 is loaded into the memory 140, the logic (or the module) as shown in FIGS. 4a to 4c may be implemented on the memory 1400. An example of the memory 1400 may be a RAM, but is not limited thereto.

The bus 1600 provides communication between components of the computing device 1000. The bus 1600 may be implemented as various types of bus such as an address bus, a data bus and a control bus.

The communication interface 1200 supports wired and wireless internet communication of the computing device 1000. The communication interface 1200 may support various communication methods other than internet communication. To this end, the communication interface 1200 may be configured to comprise a communication module well known in the art of the present disclosure. The communication interface 1200 may connect one or more blockchain nodes 200 and one or more storage nodes 400.

The storage 1300 can non-temporarily store one or more computer programs 1500. The storage 1300 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1500 may include one or more instructions, on which the methods/operations according to various embodiments of the present disclosure are implemented. When the computer program 1500 is loaded on the memory 1400, the processor 1100 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD. Blu-ray disc, USB storage device, removable hard disk) or a fixed recording medium (ROM. RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for jointly editing a content comprising:
    configuring a peer-to-peer (p2p) network by at least some of a plurality of editor terminals of an editing target content;
    when a first editor terminal among editor terminals configuring the p2p network receives a user input for editing the editing target content, broadcasting editing information corresponding to the user input to the p2p network in a peer-to-peer manner; and
    automatically updating the editing target content by reflecting the editing information by a second editor terminal receiving the editing information as a result of the broadcasting among editor terminals configuring the p2p network,
    wherein the configuring of the p2p network comprises:
    grouping some of a plurality of editor terminals of the editing target content into one cluster by a service server of a content joint editing system;
    transmitting information on each editor terminal belonging to the cluster to editor terminals belonging to the cluster; and
    configuring the p2p network between editor terminals belonging to the cluster by using information on each editor terminal belonging to the cluster.

2. The method of claim 1, wherein broadcasting editing information corresponding to the user input to the p2p network in a peer-to-peer manner comprises:
    broadcasting the editing information to the p2p network; and
    updating the editing target content on a screen of the first editor terminal by reflecting the editing information after performing the broadcasting.

3. The method of claim 1, wherein grouping some of the plurality of editor terminals of the editing target content into one cluster comprises:
    when a requirement for leaving a cluster of a third editor terminal is satisfied according to a user input to the third editor terminal belonging to the cluster, automatically excluding the third editor terminal from the cluster; and
    when a requirement for joining a cluster of a fourth editor terminal is satisfied according to a user input to the fourth editor terminal not belonging to the cluster, dynamically and automatically including the fourth editor terminal into the cluster.

4. The method of claim 1, wherein grouping some of the plurality of editor terminals of the editing target content into one cluster comprises:
    grouping some of a plurality of editor terminals of the editing target content into one cluster only when the number of editor terminals of the editing target content exceeds a reference value,
    wherein configuring the p2p (peer-to-peer) network comprises:
    configuring the p2p network by all of the plurality of editor terminals of the editing target content when the number of editor terminals of the editing target content is equal to or less than the reference value.

5. The method of claim 1, wherein grouping some of a plurality of editor terminals of the editing target content into one cluster comprises:
    grouping editor terminals displaying the same part of the editing target content into one cluster.

6. The method of claim 5, wherein editor terminals displaying the same part of the editing target content are editor terminals belonging to the same cluster as a result of grouping based on a position of a cursor on a editing target content of each of the editor terminals.

7. The method of claim 1, wherein grouping some of a plurality of editor terminals of the editing target content into one cluster comprises:
    grouping editor terminals connected to the same region server into one cluster.

8. The method of claim 1, wherein broadcasting editing information corresponding to the user input to the p2p network in a peer-to-peer manner comprises:
    after broadcasting the editing information to the p2p network, in which the first editor terminal is included, further broadcasting the editing information to other p2p network, in which the first editor terminal is not included.

9. The method of claim 1, wherein broadcasting editing information corresponding to the user input to the p2p network in a peer-to-peer manner comprises:
    transmitting the editing information to a message queue management device so that the editing information is sequentially inserted into a database,
    wherein at least some of the editing information sequentially inserted into the database is, in order to prevent loss of editing contents due to abnormal termination of a joint editing application or network disconnection, provided to an editor terminal, in which the abnormal termination or network disconnection occurs.

10. The method of claim 9, wherein the message queue management device is a CDN (Contents Delivery Network) message queue management device of a first region corresponding to a geographic location of the first editor terminal; and
    the CDN message queue management device of the first region is one of a plurality of regional CDN message queue management devices that transmit the received editing information to the database.

11. The method of claim 1, wherein the second editor terminal is a terminal device that also serves as a message queue management device among editor terminals configuring the p2p network;
    automatically updating the editing target content by reflecting the editing information comprises:
    transmitting the editing information to a database management device by the second editor terminal so that editing information received from editor terminals configuring the p2p network and sequentially inputted in a message queue provided in the second editor terminal is inserted into a database, wherein at least some of the editing information inserted into the database is, in order to prevent loss of editing contents due to abnormal termination of a joint editing application or network disconnection, provided to an editor terminal, in which the abnormal termination or network disconnection occurs.

12. A method for editing a content performed by a computing device, the method comprising:

loading a first content and displaying it on a board;

displaying an additional object on the board so as to overlap with the first content; and embedding a portion overlapped with the first content of the additional object in the first content, wherein a second content is further displayed on the board; and when a first edit for the first content and a second edit for the second content are respectively performed on the board, the first edit can be undone or redone independently without affecting the second edit regardless of predecessor relationship between the first edit and the second edit.

13. The method of claim 12, wherein embedding in the first content comprises:

calculating coordinates representing a relative position between a reference point of the first content and the additional object; and associating the overlapped portion of the additional object with the first content based on the calculated coordinates.

14. The method of claim 13, wherein embedding in the first content further comprises:

updating the first content so that the first content includes an image of the overlapped portion of the additional object.

15. The method of claim 12, wherein embedding in the first content further comprises:

updating the first content so that the first content includes an image of the overlapped portion of the additional object.

16. The method of claim 12, wherein the additional object includes other part that does not overlap with the first content, and the other part is not embedded in the first content even when the overlapped part is embedded in the first content.

17. The method of claim 12, wherein loading the first content and displaying it on a board comprises:

converting a raw content into the first content of a first data format, wherein the raw content is a content of a second data format that can be driven by an external application program.

18. The method of claim 12, wherein an editing history indicating a history of edits made to the first content is stored.

19. The method of claim 17, wherein the editing history is displayed in a predetermined area of the board in response to a user manipulation to the first content.

* * * * *